US 12,175,457 B2

(12) United States Patent
Holland et al.

(10) Patent No.: US 12,175,457 B2
(45) Date of Patent: Dec. 24, 2024

(54) SYSTEMS AND METHODS FOR MANAGEMENT OF NON-FUNGIBLE TOKENS AND CORRESPONDING DIGITAL ASSETS

(71) Applicant: QUALCOMM Incorporated, San Diego, CA (US)

(72) Inventors: Wesley James Holland, Encinitas, CA (US); Jonathan Kies, Encinitas, CA (US); Brian Vogelsang, San Diego, CA (US); Abhijeet Bisain, San Diego, CA (US); William Whyte, Natick, MA (US); Michael Franco Taveira, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 306 days.

(21) Appl. No.: 17/832,368

(22) Filed: Jun. 3, 2022

(65) Prior Publication Data

US 2022/0393873 A1     Dec. 8, 2022

Related U.S. Application Data

(60) Provisional application No. 63/197,156, filed on Jun. 4, 2021.

(51) Int. Cl.
*H04L 9/32* (2006.01)
*G01S 19/01* (2010.01)
(Continued)

(52) U.S. Cl.
CPC .......... *G06Q 20/3678* (2013.01); *G01S 19/01* (2013.01); *G06K 19/06009* (2013.01);
(Continued)

(58) Field of Classification Search
CPC ..... H04L 9/3213; H04L 9/50; H04L 2209/50; G06K 19/06009
See application file for complete search history.

(56) References Cited

U.S. PATENT DOCUMENTS 8,977,296 B1    3/2015    Briggs et al.
9,135,580 B1    9/2015    Lyman et al.
(Continued)

FOREIGN PATENT DOCUMENTS

WO    2020092900 A2    5/2020

OTHER PUBLICATIONS

Entriken W., et al., "EIP 721: ERC-721 Non-Fungible Token Standard", Ethereum Improvement Proposals, No. 721, Jan. 24, 2018, XP055723345, pp. 1-12.
(Continued)

*Primary Examiner* — Matthew T Henning
(74) *Attorney, Agent, or Firm* — QUALCOMM Incorporated

(57) ABSTRACT

Systems and techniques are described for situational token-associated media output. A system receives sensor data captured by at least one sensor of a media device. The system identifies, based on the sensor data, a relationship between the media device and an anchor element that is associated with a token. The system identifies the token in a payload of at least one block of a distributed ledger. The token corresponds to media content according to the distributed ledger. The system generates a representation of the media content corresponding to the token. In response to identifying the relationship between the media device and the anchor element, the system outputs the representation of the media content.

30 Claims, 21 Drawing Sheets

(51) Int. Cl.
*G06K 19/06* (2006.01)
*G06Q 20/36* (2012.01)
*H04L 9/00* (2022.01)
*H04L 67/1097* (2022.01)
*H04W 4/021* (2018.01)
*H04W 4/38* (2018.01)

(52) U.S. Cl.
CPC .............. *H04L 9/3213* (2013.01); *H04L 9/50* (2022.05); *H04L 67/1097* (2013.01); *H04W 4/021* (2013.01); *H04W 4/38* (2018.02); *G06Q 2220/10* (2013.01); *H04L 2209/60* (2013.01)

(56) References Cited

U.S. PATENT DOCUMENTS

| | | |
|---|---|---|
| 9,697,518 B2 | 7/2017 | Mattsson et al. |
| 9,848,236 B2 | 12/2017 | Mlloria et al. |
| 2006/0262188 A1 | 11/2006 | Elyada et al. |
| 2011/0154200 A1 | 6/2011 | Davis et al. |
| 2014/0137209 A1* | 5/2014 | Eonnet .................... G06F 21/35 726/4 |
| 2015/0073901 A1 | 3/2015 | Arnold et al. |
| 2017/0214522 A1 | 7/2017 | Code et al. |
| 2018/0198617 A1 | 7/2018 | Drouin et al. |
| 2019/0311341 A1 | 10/2019 | Rice |
| 2019/0357049 A1 | 11/2019 | Tali et al. |
| 2020/0184706 A1 | 6/2020 | Speasl et al. |
| 2020/0186338 A1 | 6/2020 | Andon et al. |
| 2021/0073933 A1 | 3/2021 | Punnoose et al. |
| 2021/0256536 A1 | 8/2021 | Abdelsamie |
| 2021/0359996 A1* | 11/2021 | Brown ...................... G06T 7/73 |
| 2022/0337898 A1 | 10/2022 | Dorogusker et al. |
| 2022/0366022 A1 | 11/2022 | Goldston et al. |
| 2022/0391889 A1 | 12/2022 | Holland et al. |
| 2023/0004627 A1 | 1/2023 | Holland |

OTHER PUBLICATIONS

International Search Report and Written Opinion—PCT/US2022/032280—ISA/EPO—Sep. 27, 2022.

* cited by examiner

SYSTEMS AND METHODS FOR MANAGEMENT OF NON-FUNGIBLE TOKENS AND CORRESPONDING DIGITAL ASSETS

CROSS-REFERENCE TO RELATED APPLICATIONS

This application claims the benefit of U.S. Provisional Application No. 63/197,156, filed Jun. 4, 2021, and titled "Minting of Non-Fungible Tokens and Related Processing," which is hereby incorporated by reference in its entirety and for all purposes.

FIELD

The present application is related to management of digital assets. For example, aspects of the present application relate to various techniques for creating, modifying, tracking, authenticating, transferring, and/or management of non-fungible tokens and/or digital assets, which may be associated with a device.

BACKGROUND

Individuals often find it meaningful to own, use, or trade unique or rare physical items related to respected celebrities, activities, or locations. For example, individuals often seek to obtain signatures on clothing or music albums from well-known musicians at concerts to commemorate attending those concerts, turning the signed clothing or music albums into unique items. Similarly, individuals often seek to purchase outfits, props, animation stills, and other items that were used to create a movie or television show.

Digital assets can include, for example, images, videos, audio clips, three-dimensional models, and the like. Generally, digital assets are fungible, meaning that any one copy of a given digital asset is interchangeable with any other copy of the same digital asset.

An extended reality (XR) device is a device that displays an environment to a user, for example through a head-mounted display (HMD), glasses, a mobile handset, or other device. The environment is at least partially different from the real-world environment in which the user is located. The user can generally change their view of the environment interactively, for example by tilting or moving the HMD (e.g., by moving the user's head, etc.) or other device. Virtual reality (VR), augmented reality (AR), and mixed reality (MR) are examples of XR.

BRIEF SUMMARY

In some examples, systems and techniques are described for creating, modifying, tracking, authenticating, and/or transferring non-fungible digital assets associated with a device position. A media device may include sensors such as image sensors and/or positioning sensors. The media device may capture sensor data using its sensors. In some examples, a system receives media content that is based on sensor data captured by at least one sensor of a media device. The system determines a position of the media device (e.g., based on the sensor data). The system determines (e.g., based on the sensor data) that the position of the media device is within a geographic area. In response to determining that the position of the media device is within the geographic area, the system generates a token corresponding to the media content. A payload of at least one block of a distributed ledger identifies the token.

In some examples, A system receives sensor data captured by at least one sensor of a media device. The system identifies, based on the sensor data, an interaction between the media device and an anchor element that is associated with a token. The system identifies the token in a payload of at least one block of a distributed ledger. The token corresponds to media content according to the distributed ledger. The system generates a representation of the media content corresponding to the token. In response to identifying the interaction between the media device and the anchor element, the system outputs the representation of the media content.

In some examples, A system identifies, in a payload of at least one block of a distributed ledger, a token corresponding to media content. A parameter of the token in the distributed ledger indicates that the token is associated with a first user. The system identifies a device that is associated with the token and the media content. The device is also associated with the first user. The system identifies that the device has been relocated to an area associated with a second user. In response to identifying that the device has been relocated to the area, the system causes the parameter of the token in the distributed ledger to be modified from indicating that the token is associated with the first user to indicating that the token is associated with the second user.

In some examples, systems and techniques are described for token generation. Disclosed are systems, apparatuses, methods, and computer-readable media for token generation. According to at least one example, an apparatus for token generation is provided that includes at least one memory and at least one processor coupled to the at least one memory. The at least one processor is configured to: receive media content that is based on sensor data captured by at least one sensor of a media device; determine a position of the media device; determining that the position of the media device is within a geographic area; and in response to determining that the position of the media device is within the geographic area, generate a token corresponding to the media content, wherein a payload of at least one block of a distributed ledger identifies the token.

In another example, a method is provided for token generation. The method includes: receiving media content that is based on sensor data captured by at least one sensor of a media device; determining a position of the media device; determining that the position of the media device is within a geographic area; and in response to determining that the position of the media device is within the geographic area, generating a token corresponding to the media content, wherein a payload of at least one block of a distributed ledger identifies the token.

In another example, a non-transitory computer-readable medium is provided that has stored thereon instructions that, when executed by one or more processors, cause the one or more processors to: receive media content that is based on sensor data captured by at least one sensor of a media device; determine a position of the media device; determining that the position of the media device is within a geographic area; and in response to determining that the position of the media device is within the geographic area, generate a token corresponding to the media content, wherein a payload of at least one block of a distributed ledger identifies the token.

In another example, an apparatus for token generation is provided. The apparatus includes: means for receiving media content that is based on sensor data captured by at least one sensor of a media device; means for determining a position of the media device; determining that the position of the media device is within a geographic area; and means for, in response to determining that the position of the media device is within the geographic area, generating a token corresponding to the media content, wherein a payload of at least one block of a distributed ledger identifies the token.

In another example, an apparatus for situational token-associated media output is provided that includes at least one memory and at least one processor coupled to the at least one memory. The at least one processor is configured to: receive sensor data captured by at least one sensor of a media device; identify, based on the sensor data, a relationship between the media device and an anchor element that is associated with a token; identify the token in a payload of at least one block of a distributed ledger, wherein the token corresponds to media content according to the distributed ledger; generate a representation of the media content corresponding to the token; and in response to identifying the relationship between the media device and the anchor element, output the representation of the media content.

In another example, a method is provided for situational token-associated media output. The method includes: receiving sensor data captured by at least one sensor of a media device; identify, based on the sensor data, a relationship between the media device and an anchor element that is associated with a token; identifying the token in a payload of at least one block of a distributed ledger, wherein the token corresponds to media content according to the distributed ledger; generating a representation of the media content corresponding to the token; and in response to identifying the relationship between the media device and the anchor element, outputting the representation of the media content.

In another example, a non-transitory computer-readable medium is provided that has stored thereon instructions that, when executed by one or more processors, cause the one or more processors to: receive sensor data captured by at least one sensor of a media device; identify, based on the sensor data, a relationship between the media device and an anchor element that is associated with a token; identify the token in a payload of at least one block of a distributed ledger, wherein the token corresponds to media content according to the distributed ledger; generate a representation of the media content corresponding to the token; and in response to identifying the relationship between the media device and the anchor element, output the representation of the media content.

In another example, an apparatus for situational token-associated media output is provided. The apparatus includes: at least one memory; and at least one processor coupled to the at least one memory, the at least one processor configured to: means for receiving sensor data captured by at least one sensor of a media device; identify, based on the sensor data, a relationship between the media device and an anchor element that is associated with a token; means for identifying the token in a payload of at least one block of a distributed ledger, wherein the token corresponds to media content according to the distributed ledger; means for generating a representation of the media content corresponding to the token; and means for, in response to identifying the relationship between the media device and the anchor element, outputting the representation of the media content.

In another example, an apparatus for token device transfer management is provided that includes at least one memory and at least one processor coupled to the at least one memory. The at least one processor is configured to: identify, in a payload of at least one block of a distributed ledger, a token corresponding to media content, wherein a parameter of the token in the distributed ledger indicates that the token is associated with a first user; identify a device that is associated with the token and the media content, wherein the device is associated with the first user; identify that the device has been relocated to an area associated with a second user; and in response to identifying that the device has been relocated to the area, cause the parameter of the token in the distributed ledger to be modified from indicating that the token is associated with the first user to indicating that the token is associated with the second user.

In another example, method is provided for token device transfer management. The method includes: identifying, in a payload of at least one block of a distributed ledger, a token corresponding to media content, wherein a parameter of the token in the distributed ledger indicates that the token is associated with a first user; identifying a device that is associated with the token and the media content, wherein the device is associated with the first user; identifying that the device has been relocated to an area associated with a second user; and in response to identifying that the device has been relocated to the area, causing the parameter of the token in the distributed ledger to be modified from indicating that the token is associated with the first user to indicating that the token is associated with the second user.

In another example, a non-transitory computer-readable medium is provided that has stored thereon instructions that, when executed by one or more processors, cause the one or more processors to: identify, in a payload of at least one block of a distributed ledger, a token corresponding to media content, wherein a parameter of the token in the distributed ledger indicates that the token is associated with a first user; identify a device that is associated with the token and the media content, wherein the device is associated with the first user; identify that the device has been relocated to an area associated with a second user; and in response to identifying that the device has been relocated to the area, cause the parameter of the token in the distributed ledger to be modified from indicating that the token is associated with the first user to indicating that the token is associated with the second user.

In another example, an apparatus for token device transfer management is provided. The apparatus includes: means for identifying, in a payload of at least one block of a distributed ledger, a token corresponding to media content, wherein a parameter of the token in the distributed ledger indicates that the token is associated with a first user; identifying a device that is associated with the token and the media content, wherein the device is associated with the first user; identifying that the device has been relocated to an area associated with a second user; and means for causing, in response to identifying that the device has been relocated to the area, the parameter of the token in the distributed ledger to be modified from indicating that the token is associated with the first user to indicating that the token is associated with the second user.

In some aspects, the media content includes at least a portion of the sensor data. In some aspects, the media content includes a modified variant of at least a portion of the sensor data.

In some aspects, the sensor data includes at least one image captured by at least one image sensor of the at least one sensor of the media device, and wherein the media content is based on at least one of the at least one image. In some aspects, one or more of the methods, apparatuses, and computer-readable medium described above further comprise: detecting at least a portion of an environment in the at least one image, and determining the position of the media device based at least in part on detection of at least the portion of the environment in the at least one image. In some aspects, one or more of the methods, apparatuses, and computer-readable medium described above further comprise: detecting at least a portion of an environment in the at least one image, and determining that at least the portion of the environment is located within the geographic area. In some aspects, one or more of the methods, apparatuses, and computer-readable medium described above further comprise: detecting at least a portion of an individual in the at least one image; determining an identity of the individual; and setting a parameter of the token to indicate that the token is associated with the identity.

In some aspects, the sensor data includes positioning data that is based on receipt of at least one wireless signal by the at least one sensor, and wherein determining the position of the media device includes determine the position of the media device at least in part based on the positioning data. In some aspects, the at least one wireless signal includes a short-range wireless signal from a local device that is within a transmission range of the media device at least during receipt of the at least one wireless signal by the at least one sensor. In some aspects, the at least one wireless signal includes a global navigation satellite system (GNSS) signal from a GNSS satellite.

In some aspects, the media content includes a map of the geographic area.

In some aspects, determining that the position of the media device is within the geographic area includes determining that the position of the media device is within the geographic area based on at least one communication between the media device and a local device associated with the geographic area.

In some aspects, the method is performed using an apparatus that includes the local device. In some aspects, the method is performed using an apparatus that includes the media device. In some aspects, the method is performed using an apparatus that is in the geographic area.

In some aspects, one or more of the methods, apparatuses, and computer-readable medium described above further comprise: in response to determining that the position of the media device is within the geographic area, generating the at least one block; and causing the at least one block to be appended to the distributed ledger. In some aspects, the at least one block includes a hash of at least a portion of a prior block of the distributed ledger. In some aspects, one or more of the methods, apparatuses, and computer-readable medium described above further comprise: in response to determining that the position of the media device is within the geographic area, generating the distributed ledger. In some aspects, one or more of the methods, apparatuses, and computer-readable medium described above further comprise: in response to determining that the position of the media device is within the geographic area, transmitting a request to generate the at least one block to a computing device; receiving the at least one block; and appending the at least one block to the distributed ledger.

In some aspects, one or more of the methods, apparatuses, and computer-readable medium described above further comprise: setting a parameter of the token to indicate that the token is associated with a user, wherein the media device is associated with the user.

In some aspects, one or more of the methods, apparatuses, and computer-readable medium described above further comprise: determining that the geographic area includes at least a threshold amount of people, wherein generating the token corresponding to the media content is performed in response to determining that the geographic area includes at least the threshold amount of people.

In some aspects, the sensor data includes image data captured by at least one image sensor of the at least one sensor of the media device, wherein the anchor element includes an object, and wherein identifying the relationship between the media device and the anchor element includes identifying that the image data depicts the object. In some aspects, the object includes an optical glyph, wherein information indicative of the token is optically encoded based on the optical glyph. In some aspects, reference image data depicting the object is stored in a data store, and wherein identifying that the image data depicts the object includes comparing the image data to the reference image data.

In some aspects, the sensor data includes position data indicative of a position of the media device, wherein the anchor element includes an area, and wherein identifying the relationship between the media device and the anchor element includes identifying that the position of the media device is within the area. In some aspects, the sensor data includes position data indicative of a position of the media device, wherein the anchor element includes a location, and wherein identifying the relationship between the media device and the anchor element includes identifying that the position of the media device is within a threshold range of the location.

In some aspects, the sensor data includes audio data captured by at least one microphone of the at least one sensor of the media device, wherein the anchor element includes a sound, and wherein identifying the relationship between the media device and the anchor element includes identifying that the audio data includes the sound.

In some aspects, outputting the representation of the media content includes causing a display to display at least a portion of the media content.

In some aspects, one or more of the methods, apparatuses, and computer-readable medium described above further comprise: identifying a media device pose of the media device based on the sensor data; and determining a media content pose for the media content based on the media device pose of the media device, wherein outputting the representation of the media content includes outputting the representation of the media content posed according to the media content pose.

In some aspects, one or more of the methods, apparatuses, and computer-readable medium described above further comprise: identifying, based on the distributed ledger, that a parameter of the token indicates that the token is associated with a first user; determining a visual effect for the media content based on parameter of the token indicating that the token is associated with the first user; and applying the visual effect to the media content, wherein outputting the representation of the media content includes outputting the representation of the media content with the visual effect applied.

In some aspects, one or more of the methods, apparatuses, and computer-readable medium described above further comprise: determining, based on a data store, that the first user and a second user are associated according to a relationship type, wherein the media device is associated with the second user, and wherein the visual effect for the media content corresponds to the relationship type. In some aspects, one or more of the methods, apparatuses, and computer-readable medium described above further comprise: determining that the media device is associated with the first user, and wherein the visual effect for the media content corresponds the first user. In some aspects, one or more of the methods, apparatuses, and computer-readable medium described above further comprise: determining, based on a data store, that the first user is a famous person, and wherein the visual effect for the media content corresponds the first user being the famous person. In some aspects, one or more of the methods, apparatuses, and computer-readable medium described above further comprise: determining, based on a data store, a rating associated with the media content, and wherein the visual effect for the media content corresponds the rating.

In some aspects, one or more of the methods, apparatuses, and computer-readable medium described above further comprise: determining that the token is identified in a data store, and wherein the visual effect for the media content corresponds to the data store. In some aspects, one or more of the methods, apparatuses, and computer-readable medium described above further comprise: retrieving information about the token from the distributed ledger; and outputting the information about the token. In some aspects, one or more of the methods, apparatuses, and computer-readable medium described above further comprise: outputting the information about the token includes causing a display to display at least a portion of the information.

In some aspects, one or more of the methods, apparatuses, and computer-readable medium described above further comprise: identifying, based on the distributed ledger, that a parameter of the token indicates that the token is associated with a first user, wherein the information identifies the first user. In some aspects, the information identifies the distributed ledger. In some aspects, one or more of the methods, apparatuses, and computer-readable medium described above further comprise: identifying, based on the distributed ledger, that a parameter of the token indicates that the token is associated with a smart contract, wherein the information identifies the smart contract. In some aspects, one or more of the methods, apparatuses, and computer-readable medium described above further comprise: identifying, based on the distributed ledger, wherein the information identifies the amount of instances of the token. In some aspects, one or more of the methods, apparatuses, and computer-readable medium described above further comprise: identifying a transfer platform that is configured for token transfer; and outputting an interface element corresponding to the media content, wherein the interface element is configured to initiate a transfer of the token using the transfer platform upon interaction with the interface element.

In some aspects, the device is configured to present the media content.

In some aspects, an identifier of the device is stored in the distributed ledger, and wherein identifying the device is based on the identifier.

In some aspects, the device includes an interactive element that is indicative of the token, and wherein identifying the token is based on an interaction with the interactive element. In some aspects, the interaction includes an optical glyph, and wherein an identifier of the token is optically encoded based on the optical glyph.

In some aspects, receiving image data; detecting that the device is represented in the image data; and identifying the token based on detecting that the device is represented in the image data.

In some aspects, identifying that the device has been relocated to the area associated with the second user includes identifying that the device has been relocated from a first area associated with the first user. In some aspects, identifying that the device has been relocated to the area associated with the second user includes identifying that one or more additional devices located in the area are associated with the second user. In some aspects, identifying that the device has been relocated to the area associated with the second user includes identifying that a wireless local area network (WLAN) in the area is associated with the second user. In some aspects, identifying that the device has been relocated to the area associated with the second user includes determining that position data from at least one position sensor of the device indicates that the device is located in the area, and wherein the area is a geographic area. In some aspects, identifying that the device has been relocated to the area associated with the second user includes determining that position data from at least one position sensor of the device indicates that the device is located within a range of a location of the second user, wherein the area associated with the second user is within the range of the location of the second user.

In some aspects, one or more of the methods, apparatuses, and computer-readable medium described above further comprise: causing the parameter of the token in the distributed ledger to be modified includes causing a new block to be appended to the distributed ledger, wherein the parameter of the token in the distributed ledger is modified based on a payload of the new block.

In some aspects, causing the new block to be appended to the distributed ledger includes generating the new block.

In some aspects, one or more of the methods, apparatuses, and computer-readable medium described above further comprise: sending, to a first user device associated with the first user, a request for authorization to modify the parameter of the token in the distributed ledger from indicating that the token is associated with the first user to indicating that the token is associated with the second user; and receiving the authorization from the first user device. In some aspects, one or more of the methods, apparatuses, and computer-readable medium described above further comprise: sending, to a second user device associated with the second user, a request for authorization to modify the parameter of the token in the distributed ledger from indicating that the token is associated with the first user to indicating that the token is associated with the second user; and receiving the authorization from the second user device.

In some aspects, one or more of the methods, apparatuses, and computer-readable medium described above further comprise: identifying, in the distributed ledger, a smart contract associated with the token, wherein the smart contract indicates that the parameter of the token is to be modified responsive a condition, wherein causing the parameter of the token in the distributed ledger to be modified includes executing the smart contract in response to identifying the condition, wherein identifying the condition is based on identifying that the device has been relocated to the area associated with the second user.

In some aspects, the apparatus includes a head-mounted display. In some aspects, the apparatus includes a mobile handset. In some aspects, the apparatus includes a wireless communication device. In some aspects, the apparatus includes a wearable device. In some aspects, the apparatus includes a server. In some aspects, the apparatus is in the geographic area.

In some aspects, the apparatus is, is part of, and/or includes a wearable device, an extended reality device (e.g., a virtual reality (VR) device, an augmented reality (AR) device, or a mixed reality (MR) device), a mobile device (e.g., a mobile telephone or so-called "smart phone" or other mobile device), a camera, a personal computer, a laptop computer, a server computer, a vehicle or a computing device or component of a vehicle, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures.

DETAILED DESCRIPTION

Figure 1:
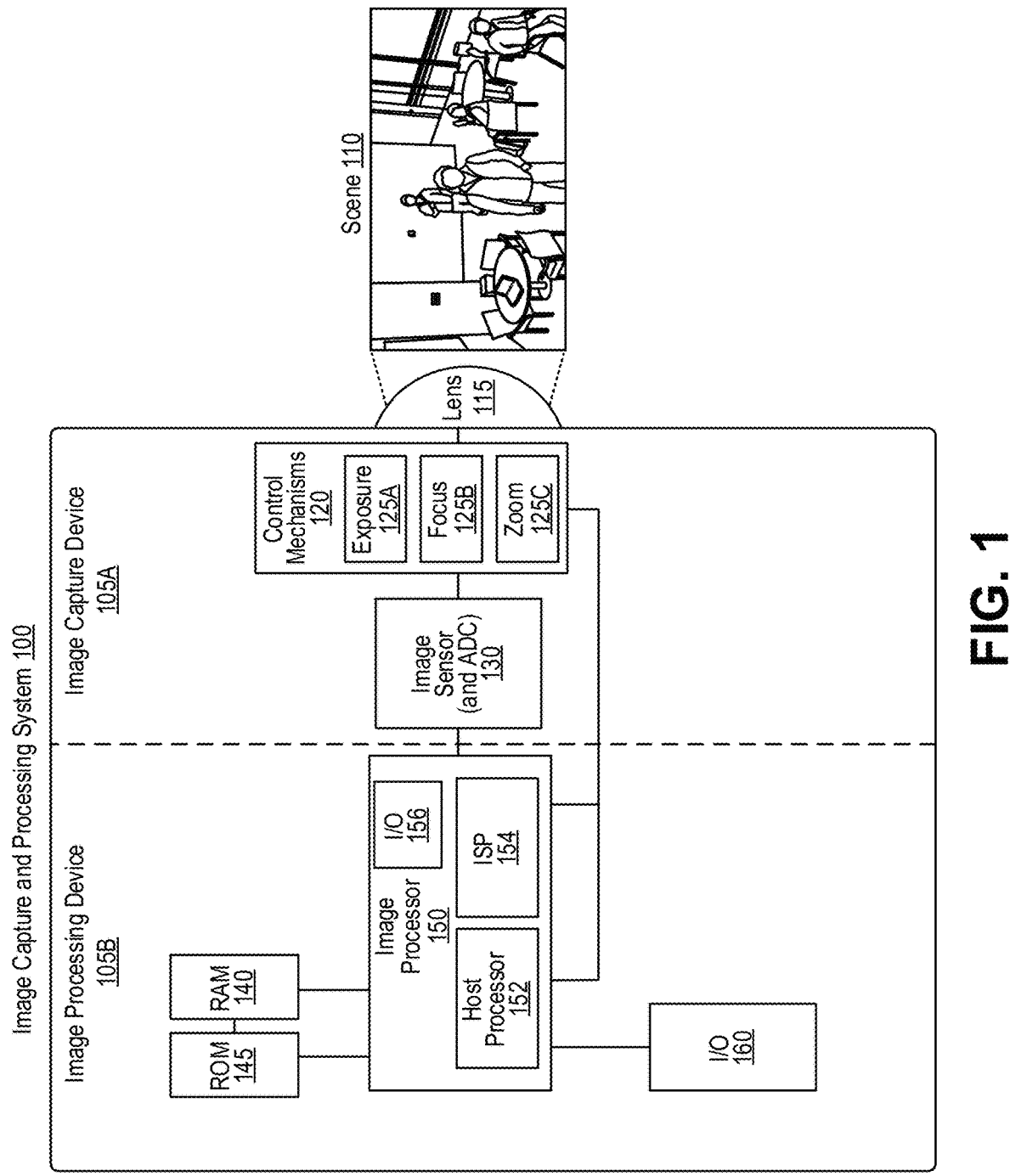
FIG. 1 is a block diagram illustrating an example architecture of an image capture and processing system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Individuals often find it meaningful to own, use, or trade unique or rare physical items related to respected celebrities, activities, or locations. For example, individuals often seek to get their clothing or music albums signed by well-known musicians at concerts to commemorate attending those concerts, turning the signed clothing or music albums into unique items. Similarly, individuals often seek to purchase outfits, props, animation stills, and other items that were used to create a movie or television show.

A camera is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

Digital assets can include, for example, images or videos captured by a camera, audio clips captured by a microphone, three-dimensional point clouds and/or models from a range sensor, and the like. Generally, digital assets are fungible, meaning that any one copy of a given digital asset is interchangeable with any other copy of the same digital asset.

In some examples, systems and techniques are described herein for creating, modifying, tracking, authenticating, and/or transferring non-fungible digital assets associated with a device position. A media device may include sensors, such as image sensors, positioning sensors (e.g., accelerometers, gyroscopes, inertial measurement units (IMUs), global navigation satellite system (GNSS) receivers), range sensors (e.g., light detection and ranging (LIDAR) sensors, radio detection and ranging (RADAR) sensors, sound detection and ranging (SODAR) sensors, sound navigation and ranging (SONAR) sensors, time-of-flight (ToF) sensors, structured light sensors), microphones, other sensors described herein, or combinations thereof. The media device may capture sensor data using its sensors. The media device may generate and/or obtain media data based on its sensor data. The media data may include the sensor data. In some examples, the media data may include processed and/or modified variants of the sensor data. For example, the media data may include virtual content (e.g., virtual objects) generated for XR output. The media data may include maps generated based on positioning data from positioning sensors. The media data may include high dynamic range (HDR) images generated by merging multiple images.

Positioning data indicating a pose of the media device during capture of the sensor data may be obtained from the media device, for instance from the positioning sensors of the media device and/or based on one or more short-range wireless communications between the media device and a local device. Positioning data indicating the pose of the media device during capture of the sensor data may be obtained from a local device that communicates with the media device using one or more short-range wireless communications. The media device can send the media data to a network device. Based on the positioning data, a network device can verify that the media device was in a predetermined geographic area during capture of the sensor data. The geographic area can be, for example, a museum, a sports venue, a concert venue, and the like. In some cases, the geographic area can be defined by the range of the range of the local device's short-range wireless communications, and verification of the media device's position can be based on verifying that communications transmitted between the media device and the local device were accurately received by the media device and/or the local device. In response to verifying that the media device was in the predetermined geographic area during capture of the sensor data, the network device can generate a token for the media data. The network device can enter the token into a distributed ledger, such as a blockchain ledger, by generating a block with the token in its payload and appending the block to the distributed ledger, or by requesting that a block-generating device generate the block with the token in its payload and appending the block to the distributed ledger. The token may be associated with smart contracts stored in the distributed ledger that control transfer of the token associated with the media data. The network device may in some cases be part of the media device.

In some examples, the media device may be an extended reality (XR) device. An XR device is a device that displays an environment to a user, and can include, for example, a head-mounted display (HMD), glasses (e.g., augmented reality (AR) glasses), a mobile handset, or other device. The environment is at least partially different from the real-world environment in which the user and the device are located, and may for instance include virtual content. In some examples, the environment that the XR device displays to the user can be at least partially virtual. In some cases, the user can interactively change their view of the environment that the XR device displays, for example by tilting the XR device and/or or moving the XR device laterally. Tilting the XR device can include tilts or rotations along the pitch axis, the yaw axis, the roll axis, or a combination thereof. Lateral movements of the XR device can include lateral movements along paths charted within a 3-dimensional volume having 3 perpendicular axes, such as an X, a Y axis, and a Z axis. XR devices that only track rotation of the XR device can be referred to XR devices with three degrees of freedom (3DoF). XR devices that track both tilting and lateral movement of the XR device can be referred to XR devices with six degrees of freedom (6DoF). Extended reality (XR) can include virtual reality (VR), augmented reality (AR), mixed reality (MR), or combinations thereof.

Generating a token corresponding to the media data and entering the token into a distributed ledger can provide technical advantages over ordinary transfers of images or other digital assets. The token transforms the media data from a fungible state into a non-fungible state, allowing individual copies or instances of the media data to be securely, efficiently, and automatically tracked, owned, transferred, rented, licensed, and the like. Having generation of the token be based on verification that the position of the media device during capture of the sensor data is in the geographic area can provide additional security and verification as to the authenticity that a representation of an object, environment, or individual in the media data is authentic.

Various aspects of the application will be described with respect to the figures. FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo, thereby adjusting focus. In some cases, additional lenses may be included in the system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 1019 discussed with respect to the computing system 0019. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140 and/or 2019, read-only memory (ROM) 145 and/or 2519, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 3519, any other input devices 4519, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the system 100 and one or more peripheral devices, over which the system 100 may receive data from the one or more peripheral device and/or transmit data to the one or more peripheral devices. The I/O 160 may include one or more wireless transceivers that enable a wireless connection between the system 100 and one or more peripheral devices, over which the system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2:
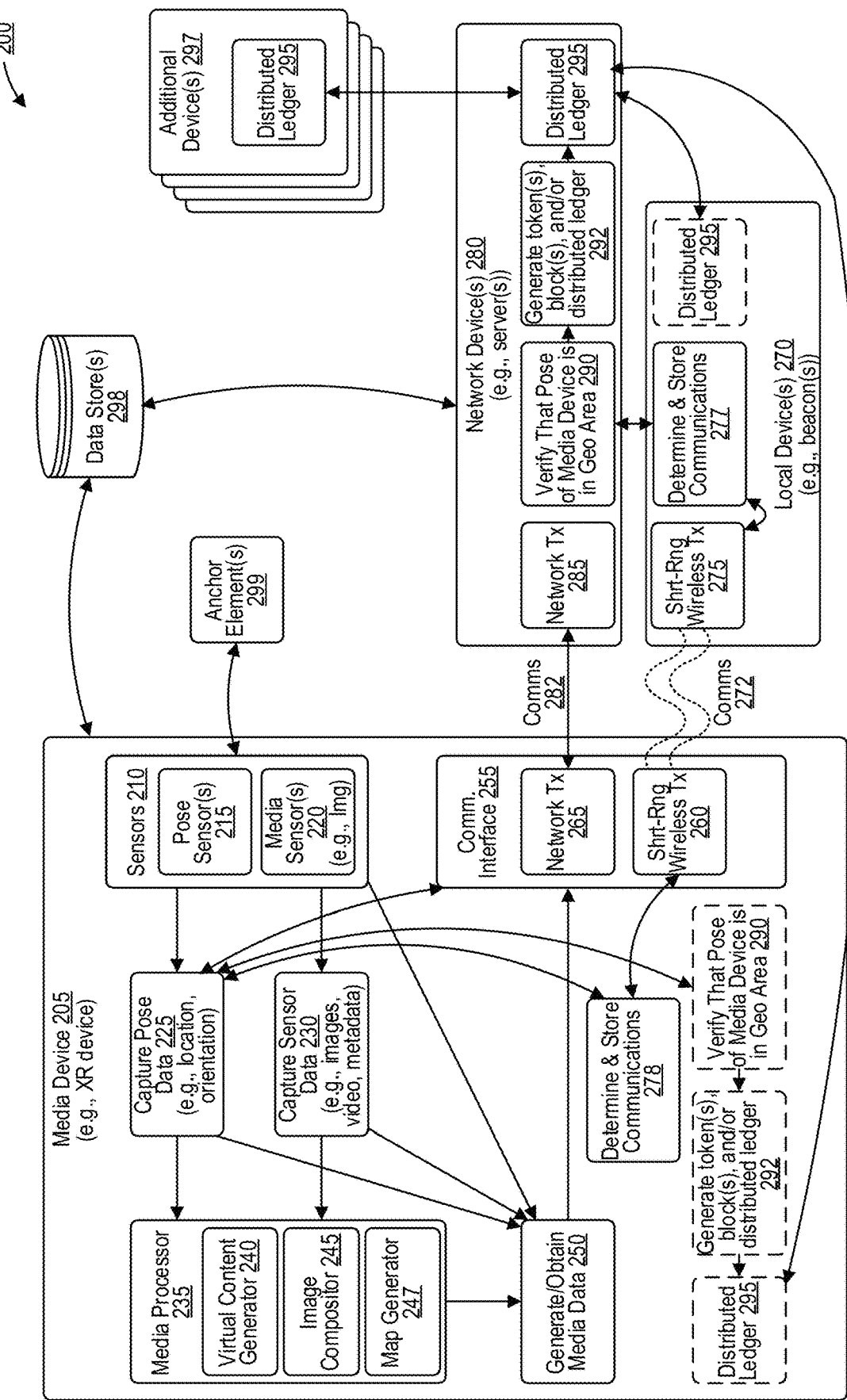
FIG. 2 is a block diagram illustrating an example architecture of a digital asset tracking system that may be used to track a digital asset associated with a location, in accordance with some examples.

FIG. 2 is a block diagram illustrating an example architecture of a digital asset tracking system 200 that may be used to track a digital asset associated with a location, in accordance with some examples. The digital asset tracking system 200 includes a media device 205. The media device 205 may be a computing system 0019. The media device 205 may be an image capture device 105A, an image processing device 105B, and/or an image capture and processing system 100. In some aspects, the media device 205 may be an extended reality (XR) device. In some examples, the media device 205 may be a mobile handset 410, a smartphone, a media player device, a camera, a head-mounted display (HMD) 310, a fitness tracker device, a smartwatch, a wearable device, or a combination thereof.

The media device 205 includes one or more sensors 210. The sensors 210 may include, for example, one or more pose sensors 215 and one or more media sensors 220. The one or more pose sensors 215 may include, for example, one or more accelerometers, gyroscopes, inertial measurement units (IMUs), global navigation satellite system (GNSS) receivers, or combinations thereof. The one or more media sensors 220 may include, for example, one or more image sensors, range sensors, microphones, other sensors described herein, or combinations thereof. Range sensors may include light detection and ranging (LIDAR) sensors, radio detection and ranging (RADAR) sensors, sound detection and ranging (SODAR) sensors, sound navigation and ranging (SONAR) sensors, time-of-flight (ToF) sensors, structured light sensors, or combinations thereof.

The media device 205 may use the sensors 210 to capture pose data 225 identifying the pose of the media device 205. In some cases, the pose data 225 may be referred to as position data or positioning data. The pose data 225 of the media device may include the location of the media device 205 (e.g., latitude, longitude, and altitude, or another form of coordinates in 3D space), the orientation of the media device (e.g., pitch, yaw, and/or roll), or a combination thereof. In some examples, the media device 205 may use data captured by the pose sensors 215 to capture the pose data 225 at least in part by identifying movements of the media device 205 based on outputs of the pose sensors 215 that indicate movements of the media device 205. In some examples, the media device 205 may use data captured by the media sensors 220 (e.g., images captured by an image sensor) to capture the pose data 225 and/or positioning data at least in part by identifying movements of the media device 205 based on a field of view (FOV) of the media sensors 220 (e.g., the FOV of the environment depicted in data captured by the media sensors 220) changing or shifting in a way that indicates movements of the media device 205. In some examples, data captured by the media sensors 220 (e.g., camera data by an image sensor) may be, and/or may be a basis of, pose data 225 and/or positioning data. In some examples, the media device 205 can identify 3D coordinates of features depicted in one or more images or other data captured by the media sensors 220, for example through feature detection, feature extraction, feature tracking, feature mapping, stereo mapping, environment mapping, visual localization, localization, or a combination thereof. In some examples, the media device 205 can generate a map of the environment based on one or more features detected, extracted, tracked, and/or mapped by the media device 205.

The media device 205 may capture sensor data 230 using the sensors 210. In some examples, the sensor data 230 may include images, videos, depth map images, depth map videos, audio clips, or combinations thereof captured by the media sensors 220. The sensor data 230 may in some cases identify metadata, for example identifying timestamp of capture and/or image capture settings such as aperture speed, aperture size, exposure time, ISO, focal length, focus, flash, zoom, analog gain, digital gain, auto-white-balance (AWB) setting, or combinations thereof. The media device 205 may capture pose data 225 at a time contemporaneous with capture of the sensor data 230. The media device 205 may capture sensor data 230 at a time contemporaneous with capture of the pose data 225. The media device 205 may capture pose data 225 at a time during capture of the sensor data 230. The media device 205 may capture sensor data 230 at a time during capture of the pose data 225.

The media device 205 may include a media processor 235. Using the media processor 235, the sensor data 230, and/or the pose data 225, the media device 205 may generate and/or obtain media data 250. In some examples, the media data may be, or may include, the sensor data 230, the pose data 225, or both. In such examples, the media device 205 may obtain the media data 250 directly from the sensors 210 and/or indirectly through the media processor 235, which may append additional data (e.g., a header), place the data 225-230 from the sensors 210 into a one or more container files (e.g., an ISO container format or an ISO-based container format), merge the pose data 225 with the sensor data 230 and/or with metadata (corresponding to the sensor data 230 and/or the pose data 225), or a combination thereof. In some example, the media processor 235 may process the sensor data 230 and/or the pose data 225, for example by performing any of the processing operations discussed with respect to the image processing device 105B or the image capture and processing system 100 generally. For instance, the media processor 235 may perform demosaicking, noise reduction, sharpening, saturation adjustment, brightness adjustment, contrast adjustment, hue adjustment, tone adjustment, gain, other processing tasks discussed herein, or combinations thereof. In some examples, the media processor 235 may include an image processor 150, an ISP 154, a host processor 152, a processor 1910, or a combination thereof. In some examples, the media processor 235 may combine multiple pieces of sensor data 230, for example by merging multiple images into a high dynamic range (HDR) image that is at least part of the media data 250. In some examples, the media processor 235 may apply one or more filters to the sensor data 230 as part of generating the media data 250.

The media processor 235 may also include specialized elements related to extended reality (XR) operations, for example if the media device 205 is an XR device. For instance, the media processor 235 may include a virtual content generator 240 that may generate virtual content, such as virtual objects, virtual characters, virtual environments, virtual outfits, virtual costumes, virtual items, virtual sports equipment, virtual weapons, and the like. Virtual content may include virtual objects, characters, environments, outfits, costumes, items, sports equipment, weapons, and/or other content related to one or more video games or other XR experiences. An example of virtual content generated by the virtual content generator 240 includes the virtual object 1045 (the virtual dog) of FIGS. 10A-10B. The media processor 235 may include an image compositor 245, which may generate the media data 250 by merging the virtual content generated by the virtual content generator 240 with the sensor data 230. For example, the image compositor 245 may overlay the virtual content generated by the virtual content generator 240 over portions of the sensor data 230. In some examples, the image compositor 245 may adjust a pose (e.g., location and/or orientation) of the virtual content to match an environment depicted in the sensor data 230 and/or based on the pose data 225 (e.g., to make the virtual content appear to be resting on a surface in the real environment depicted in the sensor data 230). In some examples, the image compositor 245 may adjust lighting and/or coloring of the virtual content to match an environment depicted in the sensor data 230 and/or based on the pose data 225 (e.g., to make the lighting and/or coloring of the virtual object match the real lighting of the real environment depicted in the sensor data 230). In some examples, the image compositor 245 may at least partially occlude the virtual content with real-world objects depicted in the sensor data 230 if the image compositor 245 determines that the real-world objects depicted in the sensor data 230 are in front of (from the FOV of the sensors 210 of the media device 205) a position in the real environment depicted in the sensor data 230 at which the virtual content is positioned by the image compositor 245. For example, a person can appear to walk "in front of" the virtual content, and the image compositor 245 can realistically have the person occlude the view of the virtual content in the media data 250. An example of media data 250 that includes virtual content includes the digital asset 1040 of FIGS. 10A-10B, which depicts the virtual object 1045 (the virtual dog) overlaid over a real environment.

Figure 11A:
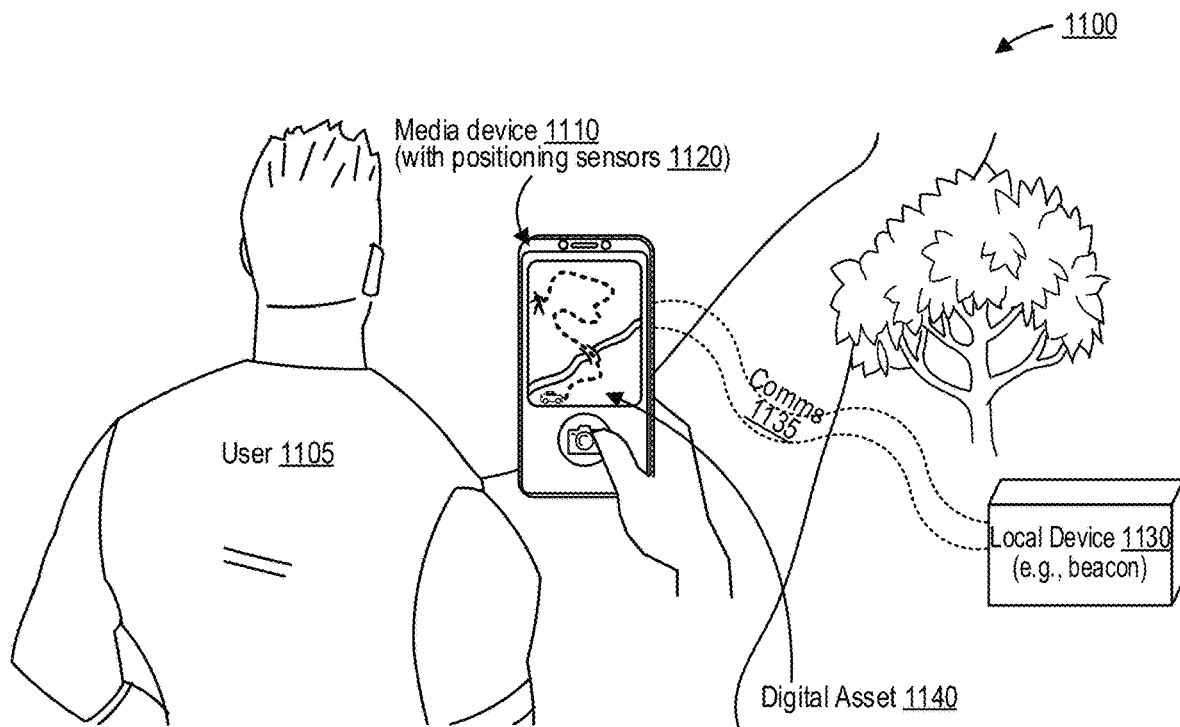
FIG. 11A is a perspective diagram illustrating a user using a media device to generate a digital asset (a map) of a hiking path, in accordance with some examples.
Figure 11B:
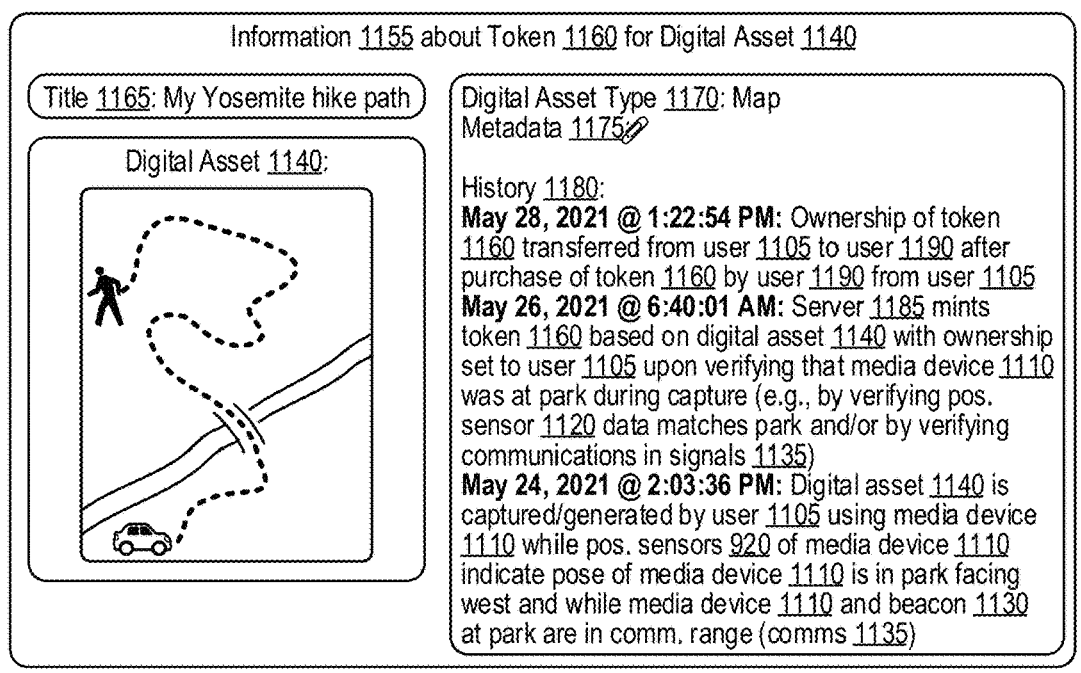
FIG. 11B is a conceptual diagram illustrating information about a token associated with the digital asset of FIG. 11A, in accordance with some examples.

The media processor 235 can also include a map generator 247 that can generate one or more maps based on the pose data 225 and/or the sensor data 230. Such a map may identify one or more routes along which the media device 205 moved across one or more periods of time. In some examples, a map may illustrate route taken by a user carrying the media device 205, such as a hiking route, a walking route, a jogging route, a running route, a biking route, a skateboarding route, a transit route, a driving route, a route moved during a sports activity, and the like. The media data 250 generated by the media processor 235 can include the map. For example, the digital asset 1140 of FIGS. 11A-11B is an example of media data 250 that includes a map generated by the map generator 247.

The media device 205 may include a communication interface 255, which may include one or more communication interfaces 1940. The communication interface 255 may include a short-range wireless transceiver 260. The short-range wireless transceiver 260 may receive and/or transmit communications 272 with a short-range wireless transceiver 275 of a local device 270 over one or more short-range communication signals following a short-range communication protocol. Either or both of the short-range wireless transceivers 260 and 275 may include, for example, Bluetooth® transceivers, Bluetooth® Low Energy (BLE) transceivers, iBeacon® transceivers, near field communication (NFC) transceivers, radio frequency identification (RFID) transceivers, radio transceivers, microwave transceivers, visible light communication (VLC) transceivers, Wi-Fi transceivers, personal area network (PAN) transceivers, wireless local area network (WLAN) transceivers, wide area network (WAN) transceivers, cellular network transceivers, ultrasonic transceivers, infrasonic transceivers, sonic transceivers, any type of transceivers identified with respect to the network transceivers 265 and 285, and other types of transceivers, or combinations thereof. In some examples, the media device 205 may receive and/or transmit one or more of the communications 272 with the local device 270 as part of capturing pose data 225. For example, the local device 270 may have a verified location, and may for example be a local device 270 set up and managed by a venue, such as a museum, a concert venue, a movie theater, a sports venue, and the like. If the media device 205 and the local device 270 are within short-range wireless communication signal range of one another (e.g., within range to successfully send and receive the one or more communications 272), then the media device 205 is in the proximity of the local device 270.

The local device 270 may determine and/or store the communications 272 (block 277). For instance, the local device 270 may determine the content of any of the communications 272 that the local device 270 sends to the media device 205, and may store that content. Likewise, the local device 270 may determine the content of any of the communications 272 that the local device 270 receives from the media device 205, and may store that content. The media device 205 may determine and/or store the communications 272 (block 278). For instance, the media device 205 may determine the content of any of the communications 272 that the media device 205 sends to the local device 270, and may store that content. Likewise, the media device 205 may determine the content of any of the communications 272 that the media device 205 receives from the local device 270, and may store that content. Ensuring that the stored content of these communications 272 matches as stored at the media device 205 and at the local device 270 may be used to verify that the pose of the media device 205 is in a geographic area associated with the local device 270 (block 290). In some examples, the media device 205 may send communications 272 with multiple local devices 270. In some examples, a local device 270 may be a beacon device with a known location. In some examples, a local device 270 may be a wireless network access point (e.g., Wi-Fi, WLAN) with a known location. In some examples, a local device 270 may be a cellular network access point (e.g., a cell tower) with a known location.

The communication interface 255 of the media device 205 may include a network transceiver 265. The network transceiver 265 may receive and/or transmit communications 282 along a network to and/or from one or more network transceivers 285 of one or more network devices 280. Either or both of the network transceivers 265 and/or 285 may include one or more wired transceivers, one or more wireless transceivers, or a combination thereof. Either or both of the network transceivers 265 and/or 285 may include, for example, one or more Ethernet transceivers, Wi-Fi transceivers, wireless local area network (WLAN) transceivers, wide area network (WAN) transceivers, cellular network transceivers, any type of transceivers identified with respect to the short-range wireless transceivers 260 and 275, and other types of transceivers, or combinations thereof. The media device 205 may send the media data 250 and/or pose data 225 to the network device(s) 280 over the communications 282. The network device(s) 280 may verify that the pose of the media device 205 is in a geographic area (block 290). In some aspects, the geographic area may be associated with the local device 270. For example, the local device 270 may be located in the geographic area or in the proximity of the geographic area. At least a portion of the geographic area may include the short-range wireless signal transmission and/or receipt range of each of one or more local devices 270. In some examples, verifying that the pose of the media device 205 is in a geographic area associated with the local device 270 (block 290) may include verifying that the content of the communications 272, as stored at the local device 270 (block 277) and as stored at the media device 205 (block 278), match. For example, content of communications 272 transmitted from the local device 270 to the media device 205 match as stored on both devices (blocks 277 and 278), and/or content of communications 272 transmitted from the media device 205 to the local device 270 match as stored on both devices (blocks 277 and 278). In some examples, network device(s) 280 may verify that the pose of the media device 205 is in a geographic area (block 290) at least in part by verifying that a location of the media device 205 indicated by the pose data 225 is within a predetermined boundary or geofence of the geographic area. In some examples, the geographic area may correspond to the interior of one or more structures corresponding to a museum, a movie theater, a shopping mall, or another indoor venue. In some examples, the geographic area may correspond to the interior of an outdoor venue (e.g., an outdoor concert venue, an outdoor sports venue), for example within a fence, wall, seating layout, or other boundary marker of the venue. In some examples, the geographic area may correspond to an outdoor area that includes one or more indoor areas, such as an outdoor food court area with multiple restaurants, or an outdoor theme park with multiple attractions, some of which may be indoor attractions.

In some examples, a time of transmission and a time of receipt of one or more of the communications 272 may be identified and/or stored (e.g., in the stored communications of block 277 and/or the stored communications of block 278). In some examples, a time of transmission and a time of receipt of one or more of the communications 272 may be used to identify the position of the media device 205 (e.g., may be used as positioning data) and/or may be used to verify that the pose of the media device 205 is in a geographic area (block 290). For example, time of transmission and a time of receipt of one or more of the communications 272 may be subtracted to identify a time duration over which the communications 272 traveled, which may be used to determine a distance between the media device 205 and the local device 270.

In some examples, a signal frequency of transmission and a signal frequency of receipt of one or more of the communications 272 may be identified and/or stored (e.g., in the stored communications of block 277 and/or the stored communications of block 278). In some examples, a signal frequency of transmission and a signal frequency of receipt of one or more of the communications 272 may be used to identify the position of the media device 205 (e.g., may be used as positioning data) and/or may be used to verify that the pose of the media device 205 is in a geographic area (block 290). For example, signal frequency of transmission and a signal frequency of receipt of one or more of the communications 272 may be subtracted to identify a difference in signal frequency as the communications 272 traveled, which may be used to determine a distance between the media device 205 and the local device 270.

The location of the media device 205 may be identified as being along a circle drawn around the local device 270 having a radius the length of the distance identified (e.g., based on the time of transmission and the time of receipt, and/or based on the signal frequency of transmission and the signal frequency of receipt). The location of the media device 205 may be identified more precisely the more local devices 270 are used based on the point(s) at which the resulting circles intersect. If three or more local devices 270 are used, the location of the media device 205 may be narrowed to a single point, which may be referred to as triangulation. Thus, triangulation based on signals from multiple local device 270 may be used to identify the position of the media device 205 (e.g., may be used as positioning data) and/or may be used to verify that the pose of the media device 205 is in a geographic area (block 290).

In response to verifying that the pose of the media device 205 is in the geographic area (block 290), the network device(s) 280 may generate one or more tokens corresponding to the media data 250, may generate one or more blocks in a distributed ledger 295 to store the tokens within, and/or may generate the distributed ledger 295 itself (block 292). Examples of the token may include the token 600, the token 860, the token 960, the token 1060, the token 1160, and the token 1260. Examples of the distributed ledger 295 may include the blockchain ledger 500 and/or the distributed acyclic graph (DAG) ledger 700. The network device(s) 280 may store a copy of the distributed ledger 295. In some examples, a distributed network of other devices (in addition to the network device(s) 280) may also store copies of the distributed ledger 295, such as the media device 205, the local device(s) 270, and/or the additional devices 297. In some examples, other devices in the distributed network may also verify that the pose of the media device 205 is in the geographic area (block 290), may verify that the token is proper, verifying that the block is proper (e.g., the Merkle root accurately reflects the payload and the hash accurately reflects the prior block), or a combination thereof. Generating the block and verifying that the block is proper may be followed by appending the block to the distributed ledger 295, and sending the block to other devices in the distributed network to append the block to all copies of the distributed ledger 295.

In some examples, verification that the pose of the media device 205 is in the geographic area (block 290) may also include receipt of recorded audio information recorded by one or more microphones of the media device 205, and comparison of the recorded audio information to trusted audio information known to be from the geographic area. In some examples, the trusted audio information may be recorded by one or more microphones of the local device 270. In some examples, the trusted audio information may be generated by and/or output by one or more speakers of the local device 270. In an illustrative example, the media device 205 can capture an image (an example of the sensor data 230) at a concert venue during a concert and record an audio clip of the audio at the concert contemporaneously. The network device 280 can receive the recorded audio clip from the media device 205 along with media data 250 that includes and/or is based on the image. The network device 280 can also receive a trusted audio clip from the concert and/or from a local device 270 at the concert venue. The trusted audio clip may include audio from the same period of time as the recorded audio clip. The trusted audio clip may have been recorded by one or more microphones of the local device 270 at the concert venue. The trusted audio clip may have been output by speakers coupled to the local device 270 at the concert venue. The network device 280, to perform the verification that the pose of the media device 205 is in the geographic area (block 290), can compare the recorded audio clip from the media device 205 to the trusted audio clip from the local device 270. If at least a portion of the recorded audio clip matches at least a portion of the trusted audio clip (e.g., the same song is playing at the concert in both audio clips), then the verification that the pose of the media device 205 is in the geographic area (block 290) is successful, in that the pose of the media device 205 is verified to be in the geographic area. If no portion (or less than a threshold portion) of the recorded audio clip matches at least any portion of the trusted audio clip (e.g., no overlapping audio in the audio clips), then the verification that the pose of the media device 205 is in the geographic area (block 290) fails, in that the pose of the media device 205 is not verified to be in the geographic area, and/or in some cases the pose of the media device 205 may be verified to not be in the geographic area.

In some aspects, certain devices that are illustrated in the digital asset tracking system 200 as separate devices may be combined. In some examples, the local device 270 and the network device(s) 280 may be combined. For instance, some of the communications 272 may include some of the communications 282, and/or some of the communications 282 may include some of the communications 272. In some examples, the media device 205 and the network device(s) 280 may be combined. For example, the communications 282 may be internal to the media device 205. The media device 205 may, by itself, verify that the pose of the media device 205 is in the geographic area (block 290). The media device 205 may, by itself, generate one or more tokens corresponding to the media data 250, may generate one or more blocks in a distributed ledger 295 to store the tokens within, and/or may generate the distributed ledger 295 itself (block 292). In some examples, the media device 205 and the local device(s) 270 may be combined. For example, the media device 205 may be a kiosk device with sensors that may have a known location in the geographic area and/or in the proximity of the geographic area, and/or that may be associated with the geographic area (e.g., owned or rented or used by a venue corresponding to the geographic area), and be able to self-verify that its location is in the geographic area (block 290).

In some aspects, certain devices that are illustrated in the digital asset tracking system 200 as a single device may be separated into multiple devices. In some examples, these multiple devices may operate together, for instance by sending data between one another. For example, the media device 205 may include more than one device. In an illustrative example, the media device 205 may include a mobile handset (e.g., mobile handset 410), a head-mounted display (HMD) (e.g., HMD 310), a smartwatch, a pair of wireless headphones, a fitness tracker, another wearable device, or a combination thereof.

In some examples, the digital asset tracking system 200 may include a token device (not pictured as a separate element). The token device may be an example of a local device 270, a network device 280, a media device 205, one of the additional devices 297, the data store(s) 298, the anchor element(s) 299, the token device 1405, a computing system 1900, or a combination thereof. A token device may be associated with a token (e.g., token 600) that is associated with a digital asset (e.g., digital asset 605). The token device may include output device(s), such as display(s) and/or speaker(s). The token device may output the digital asset associated with the token, for example by displaying visual content (e.g., image(s), video(s)) of the digital asset using the display(s) of the token device, and/or by playing audio content (e.g., sound(s), music) of the digital asset using speaker(s) of the token device. In some examples, the token device can be a physical representation of the token that the token device is associated with. An example of a token device includes the token device 1405 of FIG. 14.

In some examples, the digital asset tracking system 200 may include data store(s) 298. The data store(s) 298 may include any type of data structure(s), for instance including the data structure(s) 650. In some examples, the data store(s) 298 include customizations, personalizations, and/or modifications to a digital asset (e.g., digital asset 605) associated with a token (e.g., token 600). For instance, in some examples, the digital asset may be immutable, while customizations, personalizations, and/or modifications to the digital asset may be applied, removed, and/or modified. An example of the data store(s) 298 used for customizations, personalizations, and/or modifications to a digital asset is illustrated with respect to the data store(s) 1370 of FIG. 13.

In some examples, the digital asset tracking system 200 may include anchor element(s) 299. In some examples, anchor element(s) 299 may include objects in the real-world environment that are associated with a token. For instance, detection of the anchor element(s) 299 by the media device 205 using the sensors 210 can cause the media device 205 to output (e.g., display and/or play) the digital asset (e.g., digital asset 605) corresponding to the token (e.g., token 600) corresponding to the anchor element(s) 299 that were detected by the media device 205. In some examples, the anchor element(s) 299 include optical glyph(s), such as quick response (QR) codes, bar codes, Aztec codes, dot codes, data matrices, shotcodes, or combinations thereof. In some examples, the anchor element(s) 299 may include a specified area, and detection by the media device 205 using the sensors 210 that the media device 205 is located in the specified area can cause the media device 205 to output the digital asset corresponding to the token corresponding to the anchor element(s) 299. In some examples, the anchor element(s) 299 may include a specified location, and detection by the media device 205 using the sensors 210 that the media device 205 is located within a threshold range of the specified location can cause the media device 205 to output the digital asset corresponding to the token corresponding to the anchor element(s) 299. In some examples, a token device may be an anchor element 299.

Figure 3A:
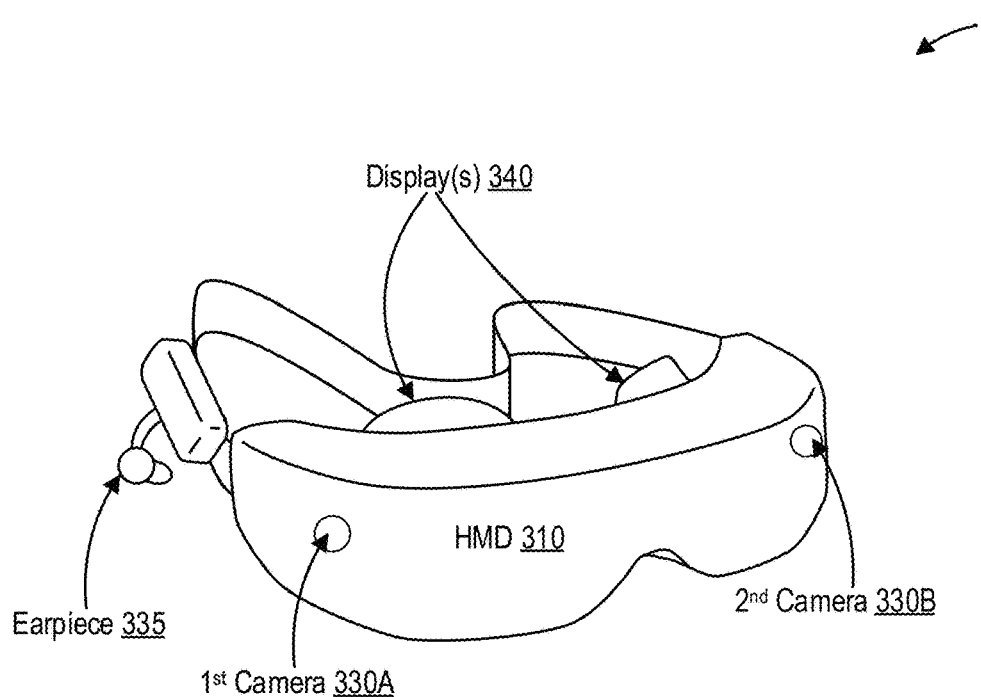
FIG. 3A is a perspective diagram illustrating a head-mounted display (HMD) that is used as a media device that is part of a digital asset tracking system, in accordance with some examples.

FIG. 3A is a perspective diagram 300 illustrating a head-mounted display (HMD) 310 that is used as a media device 205 that is part of a digital asset tracking system 200. The HMD 310 may be, for example, an augmented reality (AR) headset, a virtual reality (VR) headset, a mixed reality (MR) headset, an extended reality (XR) headset, or some combination thereof. The HMD 310 includes a first camera 330A and a second camera 330B along a front portion of the HMD 310. The first camera 330A and the second camera 330B (and/or the image sensors thereof) may be examples of the media sensors 220 of the media device 205. In some examples, the HMD 310 may only have a single camera with a single image sensor. In some examples, the HMD 310 may include one or more additional cameras in addition to the first camera 330A and the second camera 330B. The one or more additional cameras (and/or the image sensors thereof) may also be examples of media sensors 220 of the media device 205. In some examples, the HMD 310 may include one or more additional sensors in addition to the first camera 330A and the second camera 330B, which may include other types of media sensors 220, pose sensors 215 of the media device 205 and/or other sensors of the media device 205 described herein.

The HMD 310 may include one or more displays 340 that are visible to a user 320 wearing the HMD 310 on the user 320's head. In some examples, the HMD 310 may include one display 340 and two viewfinders. The two viewfinders can include a left viewfinder for the user 320's left eye and a right viewfinder for the user 320's right eye. The left viewfinder can be oriented so that the left eye of the user 320 sees a left side of the display. The right viewfinder can be oriented so that the left eye of the user 320 sees a right side of the display. In some examples, the HMD 310 may include two displays 340, including a left display that displays content to the user 320's left eye and a right display that displays content to a user 320's right eye.

Figure 3B:
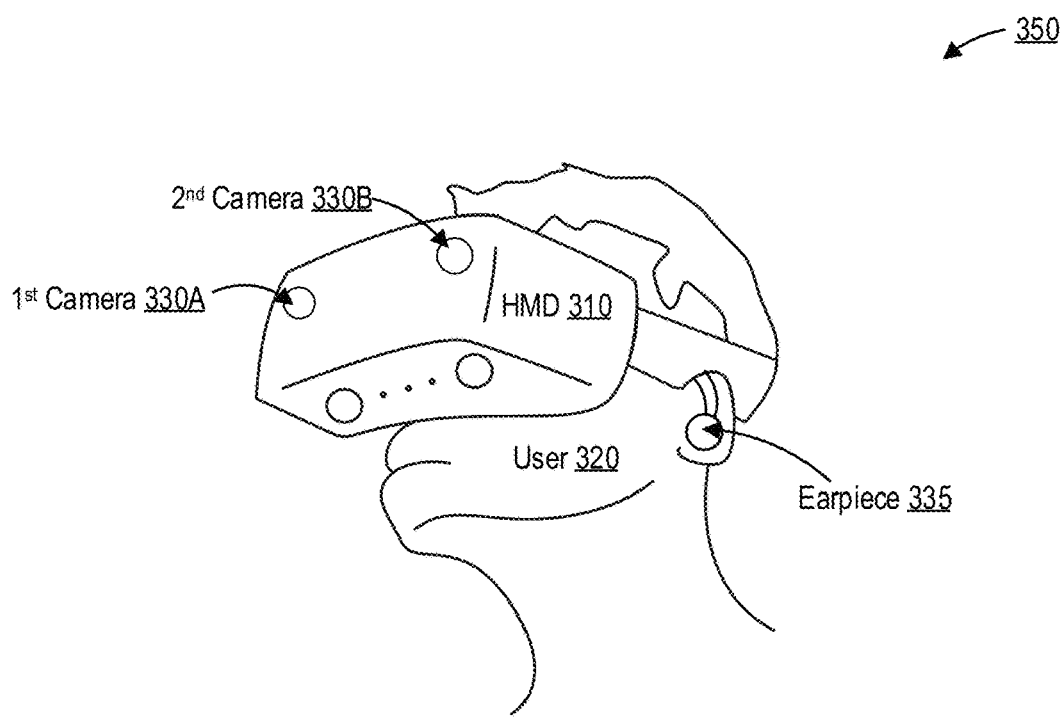
FIG. 3B is a perspective diagram illustrating the head-mounted display (HMD) of FIG. 3A being worn by a user, in accordance with some examples.

The HMD 310 may include one or more earpieces 335, which may function as speakers and/or headphones that output audio to one or more ears of a user of the HMD 310. One earpiece 335 is illustrated in FIGS. 3A and 3B, but it should be understood that the HMD 310 can include two earpieces, with one earpiece for each ear (left ear and right ear) of the user. In some examples, the HMD 310 can also include one or more microphones (not pictured). In some examples, the audio output by the HMD 310 to the user through the one or more earpieces 335 may include, or be based on, audio recorded using the one or more microphones.

FIG. 3B is a perspective diagram 350 illustrating the head-mounted display (HMD) of FIG. 3A being worn by a user 320. The user 320 wears the HMD 310 on the user 320's head over the user 320's eyes. The HMD 310 can capture images with the first camera 330A and the second camera 330B. In some examples, the HMD 310 displays one or more output images toward the user 320's eyes. The output images may, for example, include the sensor data 230, the media data 250, or both. The output images can be based on the images captured by the first camera 330A and the second camera 330B. The output images may provide a stereoscopic view of the environment, in some cases with information overlaid and/or with other modifications. For example, the HMD 310 can display a first display image to the user 320's right eye, the first display image based on an image captured by the first camera 330A. The HMD 310 can display a second display image to the user 320's left eye, the second display image based on an image captured by the second camera 330B. For instance, the HMD 310 may provide overlaid information in the display images overlaid over the images captured by the first camera 330A and the second camera 330B. An earpiece 335 of the HMD 310 is illustrated in an ear of the user 320. The HMD 310 may be outputting audio to the user 320 through the earpiece 335 and/or through another earpiece (not pictured) of the HMD 310 that is in the other ear (not pictured) of the user 320.

Figure 4A:
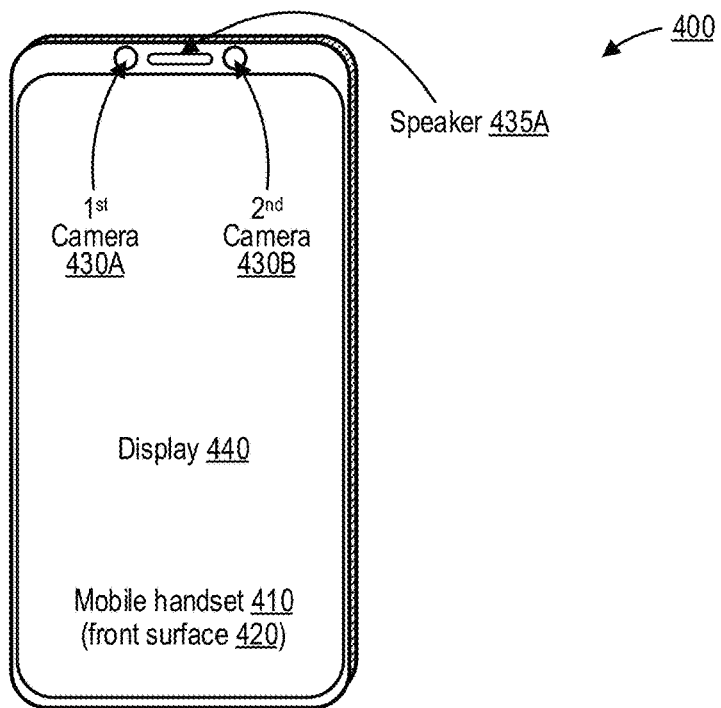
FIG. 4A is a perspective diagram illustrating a front surface of a mobile handset that includes front-facing cameras and that can be used as a media device that is part of a digital asset tracking system, in accordance with some examples.

FIG. 4A is a perspective diagram 400 illustrating a front surface of a mobile handset 410 that includes front-facing cameras and can be used as a media device 205 that is part of a digital asset tracking system 200. The mobile handset 410 may be an example of a media device 205. The mobile handset 410 may be, for example, a cellular telephone, a satellite phone, a portable gaming console, a music player, a health tracking device, a wearable device, a wireless communication device, a laptop, a mobile device, any other type of computing device or computing system discussed herein, or a combination thereof.

The front surface 420 of the mobile handset 410 includes a display 440. In some examples, the display 440 may display the sensor data 230, the media data 250, or both. The front surface 420 of the mobile handset 410 includes a first camera 430A and a second camera 430B. The first camera 430A and the second camera 430B (and/or the image sensors thereof) may be examples of the media sensors 220 of the media device 205. The first camera 430A and the second camera 430B are illustrated in a bezel around the display 440 on the front surface 420 of the mobile handset 410. In some examples, the first camera 430A and the second camera 430B can be positioned in a notch or cutout that is cut out from the display 440 on the front surface 420 of the mobile handset 410. In some examples, the first camera 430A and the second camera 430B can be under-display cameras that are positioned between the display 440 and the rest of the mobile handset 410, so that light passes through a portion of the display 440 before reaching the first camera 430A and the second camera 430B. The first camera 430A and the second camera 430B of the perspective diagram 400 are front-facing cameras. The first camera 430A and the second camera 430B face a direction perpendicular to a planar surface of the front surface 420 of the mobile handset 410. The first camera 430A and the second camera 430B may be two of the one or more cameras of the mobile handset 410. The first camera 430A and the second camera 430B may be an example of media sensors 220 of the media device 205. In some examples, the front surface 420 of the mobile handset 410 may only have a single camera. In some examples, the mobile handset 410 may include one or more additional cameras in addition to the first camera 430A and the second camera 430B. The one or more additional cameras (and/or the image sensors thereof) may also be examples of media sensors 220 of the media device 205. In some examples, the mobile handset 410 may include one or more additional sensors in addition to the first camera 430A and the second camera 430B. The one or more additional sensors may also be examples of other types of media sensors 220 and/or the pose sensors 215 of the media device 205. The front surface 420 of the mobile handset 410 also includes a display 440. In some cases, the front surface 420 of the mobile handset 410 includes more than one display 440.

The mobile handset 410 may include one or more speakers 435A and/or other audio output devices (e.g., earphones or headphones or connectors thereto), which can output audio to one or more ears of a user of the mobile handset 410. One speaker 435A is illustrated in FIG. 4A, but it should be understood that the mobile handset 410 can include more than one speaker and/or other audio device. In some examples, the mobile handset 410 can also include one or more microphones (not pictured). In some examples, the audio output by the mobile handset 410 to the user through the one or more speakers 435A and/or other audio output devices may include, or be based on, audio recorded using the one or more microphones.

Figure 4B:
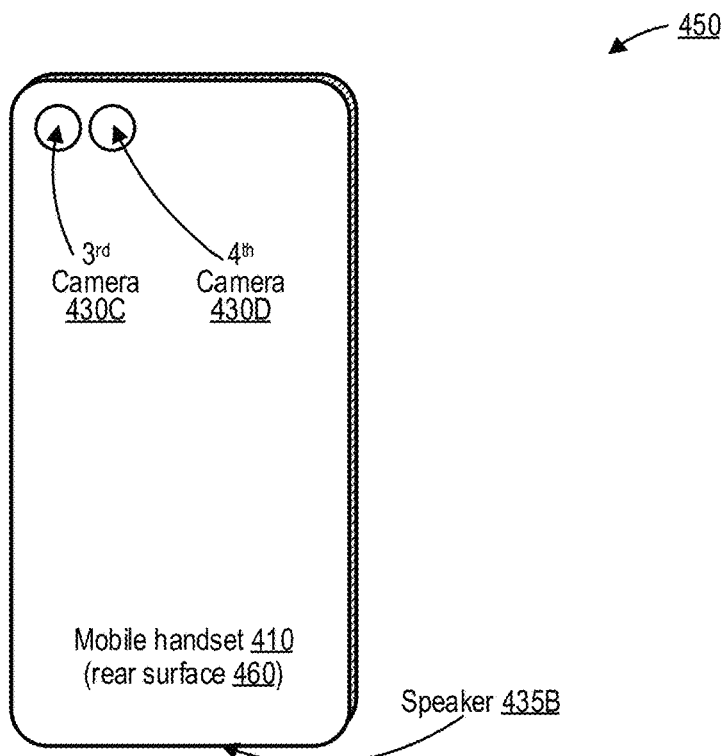
FIG. 4B is a perspective diagram illustrating a rear surface of a mobile handset that includes read-facing cameras and can be used as a media device that is part of a digital asset tracking system, in accordance with some examples.

FIG. 4B is a perspective diagram 450 illustrating a rear surface 460 of a mobile handset that includes read-facing cameras and can be used as a media device 205 that is part of a digital asset tracking system 200. The mobile handset 410 includes a third camera 430C and a fourth camera 430D on the rear surface 460 of the mobile handset 410. The third camera 430C and the fourth camera 430D of the perspective diagram 450 are rear-facing. The third camera 430C and the fourth camera 430D (and/or the image sensors thereof) may be examples of the media sensors 220 of the media device 205. The third camera 430C and the fourth camera 430D face a direction perpendicular to a planar surface of the rear surface 460 of the mobile handset 410. While the rear surface 460 of the mobile handset 410 does not have a display 440 as illustrated in the perspective diagram 450, in some examples, the rear surface 460 of the mobile handset 410 may include one or more rear displays. In some examples, the one or more rear displays may display the sensor data 230, the media data 250, or both. If the rear surface 460 of the mobile handset 410 includes one or more rear displays, any positioning layouts of the third camera 430C and the fourth camera 430D relative to the one or more rear displays may be used as discussed with respect to the first camera 430A and the second camera 430B relative to the display 440 of the front surface 420 of the mobile handset 410.

The third camera 430C and the fourth camera 430D may be two of the one or more cameras of the mobile handset 410. In some examples, the rear surface 460 of the mobile handset 410 may only have a single camera. In some examples, the mobile handset 410 may include one or more additional cameras in addition to the first camera 430A, the second camera 430B, the third camera 430C, and the fourth camera 430D. The one or more additional cameras (and/or the image sensors thereof) may also be examples of media sensors 220 of the media device 205. In some examples, the mobile handset 410 may include one or more additional sensors in addition to the first camera 430A, the second camera 430B, the third camera 430C, and the fourth camera 430D. The one or more additional sensors may also be examples of other types of media sensors 220 and/or pose sensors 215 of the media device 205.

The mobile handset 410 may include one or more speakers 435B and/or other audio output devices (e.g., earphones or headphones or connectors thereto), which can output audio to one or more ears of a user of the mobile handset 410. One speaker 435B is illustrated in FIG. 4B, but it should be understood that the mobile handset 410 can include more than one speaker and/or other audio device. In some examples, the mobile handset 410 can also include one or more microphones (not pictured). In some examples, the audio output by the mobile handset 410 to the user through the one or more speakers 435B and/or other audio output devices may include, or be based on, audio recorded using the one or more microphones.

Figure 5:
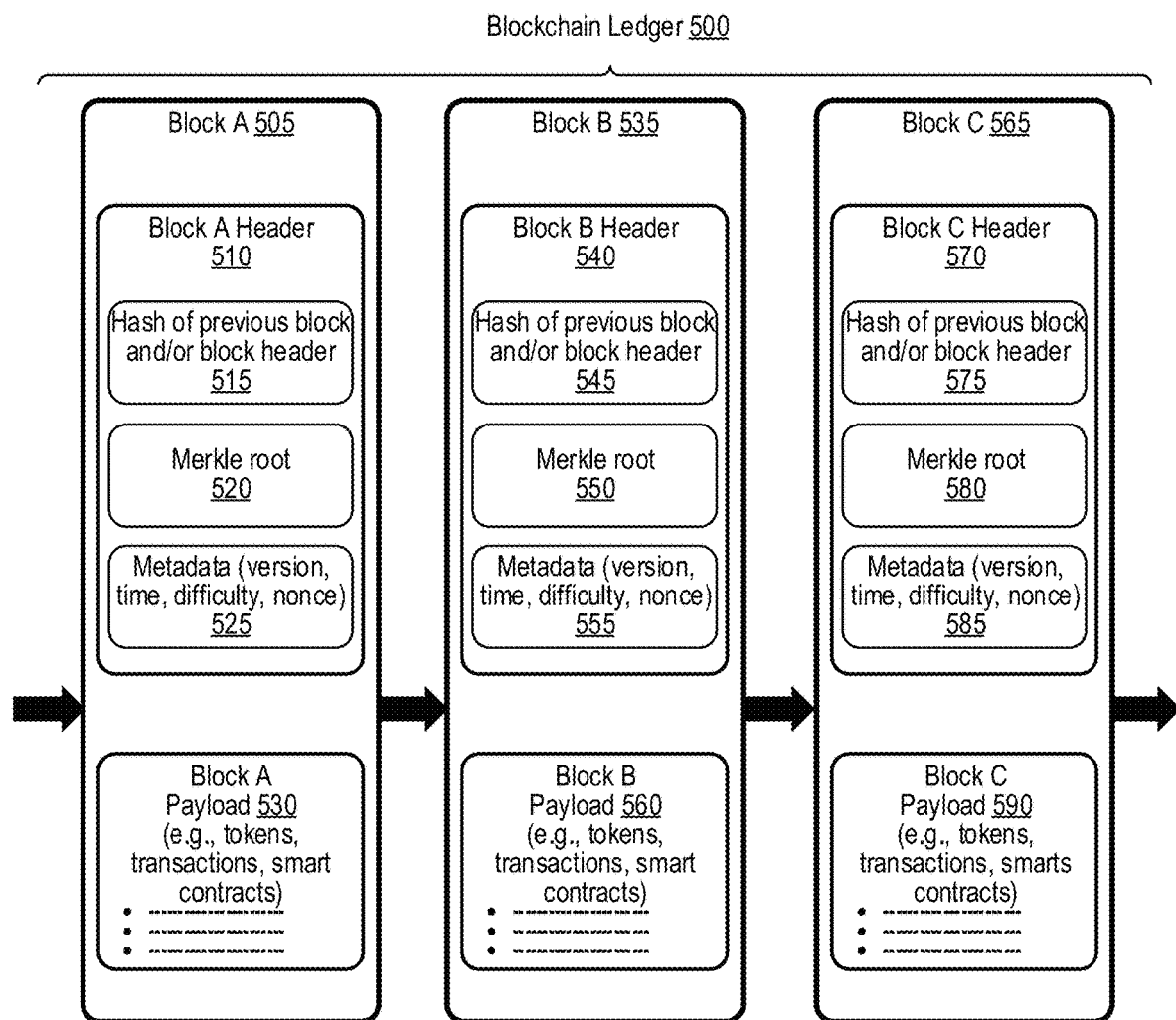
FIG. 5 is a block diagram illustrating three consecutive blocks of a blockchain ledger that may be used to track a digital asset associated with a position in a geographic area, in accordance with some examples.

FIG. 5 is a block diagram illustrating three consecutive blocks of a blockchain ledger 500 that may be used to track a digital asset associated with a position in a geographic area, according to an aspect of the present disclosure. Three blocks of the blockchain ledger 500 are illustrated in FIG. 5, including Block A 505, Block B 535, and Block C 565.

Each block includes a block header 510/540/570 and a list of one or more payloads 530/560/590. In some examples, block header 510/540/570 includes a hash 515/545/575 of the previous block and/or a hash 510/540/570 of the block header of the previous block. For instance, the header 570 of block C 565 includes a hash 575 of the header 540 of block B 535. The header 540 of block B 535 likewise includes a hash 545 of the header 510 of block A 505. The header 510 of block A 505 likewise includes a hash 515 of a header (not pictured) of previous block (not pictured) that is before block A 505 in the blockchain ledger 500. Including the hash of the previous block's header secures the blockchain ledger 500 by preventing modification of any block of the blockchain ledger 500 after the block has been entered into the blockchain ledger 500, as any change to a particular block would cause that block header's hash 515/545/575 in the next block to be incorrect. Further, modification of that block header's hash in the next block would make the next block's header's hash 515/545/575 in the block after the next block incorrect, and so forth. A verifying device can verify that a block has not been modified by computing the hash of block and/or of the block header, then comparing the computed hash to the stored hash 515/545/575 that is stored in the next block. In some distributed ledgers, a block header 510/540/570 can include hashes of multiple previous blocks and/or hashes of block headers of multiple previous blocks, as in the distributed acyclic graph (DAG) ledger 700 of FIG. 7.

Each block's block header 510/540/570 can include a Merkle root 520/550/580. The Merkle root 520/550/580 can be is generated based on hashes of each of the tokens, transactions, smart contracts, and/or other elements identified in the payload 530/560/590 for that block. Any attempt to modify a payload after the block has been entered would change the Merkle root. A verifying device can verify that the payload(s) 530/560/590 have not been modified by computing the Merkle root, then comparing the computed Merkle root to the stored Merkle root 520/550/580 that is stored in the block header 510/540/570. Changes to the payload 530/560/590 and/or to the Merkle root 520/550/580 would also change the hash for the block and/or for the block header, for which a value is stored in the next block as the hash 515/545/575. Each payload of each block may include one or more tokens, one or more transactions, one or more smart contracts, other content, or combinations thereof.

Each block's block header 510/540/570 may also include various elements of metadata, such as a version number for the blockchain ledger platform, a version number for the block itself, a timestamp for verification of each payload, a timestamp for generation of the block, a timestamp for entry of the block into the blockchain ledger 500, a timestamp for request of generation of the block, a difficulty target value (e.g., adjusting difficulty of mining), one or more randomized nonce values, a counter identifying how many nonces have been tried, a title of the blockchain ledger 500, an identifier as to what the blockchain ledger 500 is tracking (e.g., a history of a digital asset 605 associated with a device position in a geographic area), or a combination thereof. Each individual element added can further serve as information that can be verified by a verifying device to identify if the block, and the payload within, is accurate and authorized. The one or more randomized nonce values can serve to further complicate the hashes, improving security.

Each block 505/535/565 of the blockchain ledger 500 also includes a payload 530/560/590. The payload 530/560/590 for each block 505/535/565 can include one or more tokens, one or more transactions, one or more smart contracts, one or more other elements, metadata related to any of the previously-listed elements, or combinations thereof. A token may be, for example, a non-fungible token. The token 600 may be an example of a token that is stored in the payload 530/560/590 for a block 505/535/565. As discussed with respect to the token 600, certain parts of the token 600 are stored within the payload 530/560/590 of the blockchain ledger 500, and are thus stored "on-chain." As discussed with respect to the token 600, certain parts of the token 600 include on-chain pointers that point to data outside of the blockchain ledger 500, with such data being stored "off-chain." The payload 530/560/590 of the blockchain ledger 500 may store hashes of off-chain data, so that a verifying device can compute a hash of the off-chain data and compare the computed hash to the stored hash that is stored on-chain to verify that the off-chain data is accurate. In some examples, the payload 530/560/590 includes one or more smart contracts. The block may include the code of the smart contract stored within the payload 530/560/590 of the blockchain ledger 500, thus storing the code on-chain. If the payload 530/560/590 includes a smart contract, the block may include a hash of the code of the smart contract and/or a pointer to an off-chain data structure storing the code of the smart contract, thus storing the code off-chain. In some examples, some of the smart contract's code may be stored on-chain, while some of the smart contract's code may be stored off-chain. In some examples, smart contracts can be used to create, modify, transfer, or otherwise manage tokens. In some examples, the payload 530/560/590 includes transactions. In some examples, transactions may include transfers of tokens from one account to another account. In some examples, transactions may include changes to certain properties of tokens or the associated digital assets, such as changes to ownership, attributes, authorship, licenses to use, rentals, or combinations thereof.

While FIG. 5 only illustrates three blocks 505/535/565 of the blockchain ledger 500, it should be understood that any blockchain ledger or distributed ledger discussed herein may be longer or shorter, and may have more than three blocks or fewer than three blocks.

In one illustrative example, a first computing device can store a blockchain ledger including a plurality of blocks. Each of a plurality of computing devices (e.g., in a distributed architecture) also stores a copy of the blockchain ledger. The first computing device can receive a message identifying an intended payload element (e.g., token and/or transaction and/or smart contract). For example, the intended payload element may be a token related to a digital asset (e.g., media data 250) associated with a position as described herein. The first computing device can verify that the intended payload element is valid. In some blockchain ledger 500 implementations, the first computing device can verify that sufficient funds are allocated in order to pay for execution fee charges for the intended payload element, for instance in the form of gas on an Ethereum blockchain ledger. For a transaction such as a transfer of the token, the first computing device can verify whether the transferor has a sufficient quantity of an asset (e.g., whether the transferor owns the token to be transferred) for the transaction to take place. For a smart contract, the first computing device can verify that the smart contract refers to valid accounts that include sufficient quantity of an asset (e.g., token) to execute the smart contract (e.g., to transfer the token), verify that the code of the smart contract can be executed (e.g., does not include syntax errors or other errors), verify that all parties involved in the smart contract have submitted agreement(s) to the terms of the smart contract, or a combination thereof. For a token, the first computing device can verify that the token refers to a valid digital asset, for instance a valid type of digital asset with a URI or other pointer that validly points to the digital asset.

The first computing device can generate a hash of a most recent block or block header of the blockchain ledger 500. The first computing device can generate a new block header for a new block. The new block header can include at least the hash of the most recent block or block header of the blockchain ledger 500. The first computing device can generate the new block, the new block including the new block header and a payload with one or more payload elements. The one or more payload elements include at least the intended payload element discussed above (e.g., token, smart contract, transaction). The first computing device can generate a Merkle root based on the payload elements, and include the Merkle root in the new block header. The first computing device can generate a metadata and a nonce value based on the payload elements, and include the metadata and the nonce value in the new block header. The first computing device can append the new block to the plurality of blocks of the blockchain ledger 500 in response to verifying the intended payload element. The first computing device can transmit the new block to the plurality of computing devices that each store the blockchain ledger 500 in response to verifying the intended payload element. Each of the plurality of computing devices also appends the new block to their respective copy of the blockchain ledger 500.

In another illustrative example, a first computing device can store a blockchain ledger 500 including a plurality of blocks. Each of a plurality of computing devices (e.g., in a distributed architecture) also stores a copy of the blockchain ledger 500. The first computing device can receive a UI input identifying an intended payload element (e.g., transaction and/or smart contract). The first computing device can generate a message identifying the intended payload element. The first computing device can retrieve a private key associated with an account corresponding to the first computing device. The first computing device can modify the message by encrypting at least a portion of the message with the private key. The first computing device can transmit the message to the plurality of computing devices other than the first computing device. A second computing device of the plurality of computing devices verifies that the intended payload element is valid, for instance as described in the previous paragraph. The first computing device receives a new block from the second computing device. The new block identifies and/or includes the intended payload element (e.g., in its payload). The first computing device appends the new block to the plurality of blocks of the blockchain ledger 500 at the first computing device.

Figure 6:
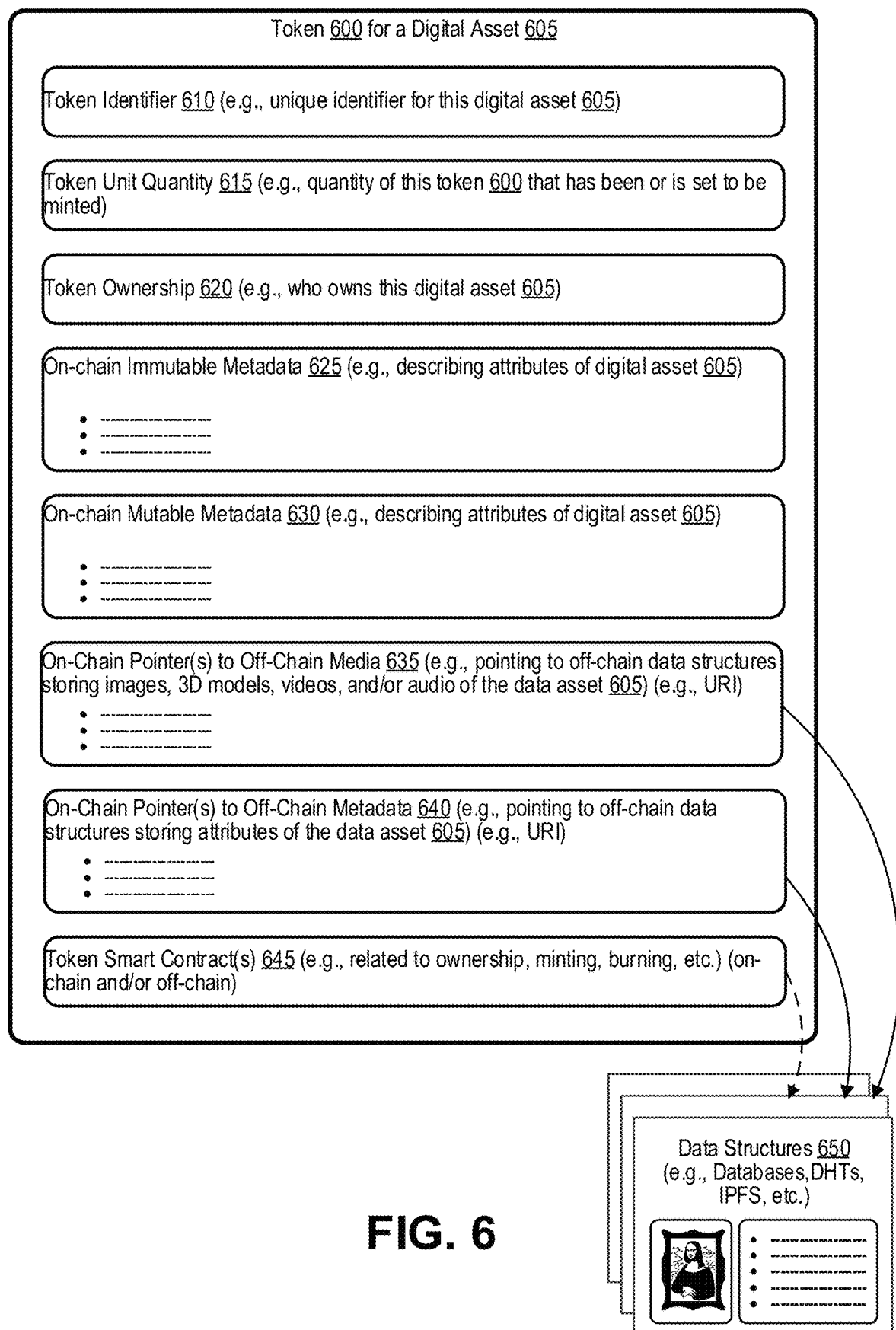
FIG. 6 is a block diagram illustrating an example token that can be non-fungible and that can represent a digital asset associated with a position in a geographic area as tracked in a distributed ledger, in accordance with some examples.

FIG. 6 is a block diagram illustrating an example token 600 that can be non-fungible and that can represent a digital asset 605 associated with a position in a geographic area as tracked in a distributed ledger. In some examples, the token 600 is a non-fungible token (NFT). In some examples, the token 600 is an ERC721 token, an ERC1155 token, an ERC-20 token, or a combination thereof. In some examples, the token 600 is tracked in a blockchain ledger 500. In some examples, the token 600 is tracked in an Ethereum-based blockchain ledger 500. In some examples, the token 600 is tracked in a directed acyclic graph (DAG) ledger 700.

The digital asset 605 that the token 600 represents can be an example of the media data 250 from the media device 205 of the digital asset tracking system 200 of FIG. 2. As discussed with respect to the digital asset tracking system 200 of FIG. 2, the media data 250—and therefore the digital asset 605, may include one or more images, videos, audio clips, 3D point clouds, 3D models, sensor data 230, pose data 225, metadata associated with the sensor data 230, metadata associated with the pose data 225, virtual content generated by the virtual content generator 240, image or videos with virtual content incorporated via the image compositor 245, maps generated by the map generator 247, or combinations thereof 3D models can include, for example 3D reconstructions based on 3D point clouds, such as 3D reconstructions of a portion of a forest, a portion of a celebrity's home, a historic location, a national park, and the like.

One or more token smart contracts 645 can be associated with the token 600. For instance, the one or more token smart contracts 645 manage creation (or "minting") of the token 600. The one or more token smart contracts 645 can pay miner devices that create ("mint") a token 600, or batches of tokens, for computing time and resources taken to mint the token 600. The one or more token smart contracts 645 can include conditions that must be met before the token 600 can be successfully created (minted). For example, one such condition may require that verification that the media device 205 was in the geographic area at a time contemporaneous with, and/or during, capture of the sensor data 230 corresponding to the media data 250 of the digital asset 605 (e.g., block 290 of FIG. 2) must be successfully performed by one or more verifying devices (e.g., at least a threshold number of verifying devices, such as a quorum as in FIGS. 15A-15B) in order to permit creation (minting) of the token 600. The one or more token smart contracts 645 can control how ownership of the token 600 is decided and/or transferred. For instance, the one or more token smart contracts 645 can indicate an initial owner of the token 600 and/or can identify conditions under which ownership automatically transfers, for instance an offer meeting or exceeding an owner-mutable threshold amount. The one or more token smart contracts 645 can indicate conditions under which the token 600 can be rented out or licensed out for temporary use or ownership by licensee users, for instance an offer meeting or exceeding an owner-mutable threshold amount. The one or more token smart contracts 645 can control conditions under which the token 600 can be burnt (e.g., irreversibly destroyed and/or unlisted). The elements identified as part of the token 600 in FIG. 6—including the token identifier 610, the token unit quantity 615, the token ownership 620, the on-chain immutable metadata 625, the on-chain mutable metadata 630, the on-chain pointers to off-chain media 635, the on-chain pointers to off-chain metadata 640—can be stored as part of the token 600, can be part of the token smart contracts 645, or both. In some examples, the code of the token smart contracts 645 is stored at least partly on-chain. In some examples, the code of the token smart contracts 645 is stored at least partly off-chain at off-chain location(s) such as the data structures 650, with the off-chain location(s) identified by on-chain pointers to the off-chain location(s).

The token 600 includes a token identifier 610, which may be referred to as a tokenID. The token identifier 610 can be a unique identifier for the token 600 and/or for the digital asset 605. The token identifier 610 can be used to distinguish the particular instance of the digital asset 605 that the token 600 corresponds to from any other instance of the digital asset 605. In some examples, token identifiers can be created by a computing system creating (or "minting") the token 600 by incremented sequentially compared to token identifiers of previously-created tokens, to ensure that each token identifier is unique.

The token 600 can include a token unit quantity 615. The token unit quantity 615 can identify a quantity of the token 600 that has been or is set to be minted. In some examples, the token unit quantity 615 is one, in which case a single token 600 exists for a given digital asset 605. In some examples the token unit quantity 615 is greater than one. For example, if the token unit quantity 615 is 5, then there are effectively 5 copies of this token 600 representing this unique digital asset 605 that can be owned and/or transferred separately. In some examples, those 5 copies may each correspond to a separate token. In some examples, all 5 copies may be represented by a single token. In some examples, those 5 copies may be fungible between one another, or indistinguishable from one another. However, those 5 copies are still non-fungible, unique, distinct, and/or distinguishable relative to any other instance or version or variant of the digital asset 605. In some examples, those 5 copies are still distinguishable from one another, for example with the corresponding token 600 for each copy including an identifier (on-chain or off-chain) indicating which of the 5 copies that copy is (e.g., the $1^{st}$, the $2^{nd}$, the $3^{rd}$, the $4^{th}$, or the $5^{th}$). The token unit quantity 615 can control how rare the token 600, and by extension the digital asset 605, is. If the token unit quantity 615 is one, then the token 600 and corresponding digital asset 605 is unique. If the token unit quantity 615 is more than one but less than a rarity threshold, then the token 600 and corresponding digital asset 605 is rare. If the token unit quantity 615 is more than one but more than a rarity threshold, then the token 600 and corresponding digital asset 605 is common. In some examples, there may be any number of ranges of rarity, in addition to or instead of unique, rare, and common—such as legendary, very rare, slightly rare, uncommon, and other categories of rarity. In some cases, the token unit quantity 615 can be decided as part of the minting process and/or identified in one of the token smart contracts 645 that manages the minting process.

The token 600 may identify a token ownership 620, which may identify who owns the token 600, and by extension, the corresponding digital asset 605. In some examples, the token ownership 620 may initially be assigned to an account associated with creator of the digital asset 605, such as a user associated with the media device 205 that captured, obtained, or generated the media data 250 of the digital asset 605. The user associated with the media device 205 may be a user that owns the media device 205. The user associated with the media device 205 may be a user that was using the media device 205 at the time when the media device 205 captured the sensor data 230 and/or pose data 225 associated with the digital asset 605, at the time when the media device 205 captured, obtained, or generated the media data 250 of the digital asset 605, or a combination thereof. In some examples, the token ownership 620 may initially be assigned to an account associated with an individual who is depicted or represented in the media data 250 of the digital asset 605, as in the user Bob 945 of FIGS. 9A-9B. The token smart contracts 645 can control rules for transfer of token ownership 620. Token ownership 620 can be transferred as a transaction that is recorded as a payload element in a payload of a block of a blockchain ledger or other distributed ledger.

The token 600 may include on-chain immutable metadata 625. The on-chain immutable metadata 625 can include, for example, a description of the token 600, a description of the digital asset 605 that the token 600 represents, some immutable attributes or properties of the digital asset 605 and/or the token 600, or some combination thereof. The on-chain immutable metadata 625 can use properties of the distributed ledger and/or of the token smart contracts 645 to ensure that the on-chain immutable metadata 625 remains unchanged. In some examples, the on-chain immutable metadata 625 can identify the media device 205 that captured, obtained, or generated the media data 250 of the digital asset 605. In some examples, the on-chain immutable metadata 625 can identify a category of media that the digital asset 605 includes (e.g., image, video, audio clip, 3D point cloud, 3D model, map, etc.). In some examples, the on-chain immutable metadata 625 can identify a position or pose of the media device 205 at a time contemporaneous with, and/or during, the capture of the sensor data 230 associated with the digital asset 605. In some examples, the on-chain immutable metadata 625 can identify the geographic area.

The token 600 may include on-chain mutable metadata 630. The on-chain mutable metadata 630 can include, for example, a description of the token 600, a description of the digital asset 605 that the token 600 represents, some immutable attributes or properties of the digital asset 605 and/or the token 600, or some combination thereof. The on-chain mutable metadata 630 can be mutable or changeable. In some examples, a change to the on-chain mutable metadata 630 can be recorded as a transaction that is recorded as a payload element in a payload of a block of a blockchain ledger or other distributed ledger. In some examples, the on-chain immutable metadata 625 can identify how many times the digital asset 605 has been viewed, played, accessed, or used in a specified manner.

The token 600 may include on-chain pointers to off-chain media 635. The off-chain media can include the digital asset 605 and/or one or more representations of the digital asset 605. For example, the off-chain media can include one or more images, 3D point clouds, 3D models, video clips, audio clips, maps, or combinations thereof. These types of media can require a lot of storage space to store, and can thus be expensive to store on-chain in terms of execution fee charges (such as gas on an Ethereum blockchain ledger). Thus, it may be more efficient to store this media off-chain in one or more off-chain locations, such as the data structures 650. The on-chain pointer can include a uniform resource identifier (URI), such as a uniform resource locator (URL), that points to the one or more network locations of the one or more off-chain locations. In some examples, hashes can be stored of the off-chain media, so that a verifying device can compute a hash of the off-chain media and compare the computed hash to the stored hash that is stored on-chain to verify that the off-chain media is accurate. In some examples, the off-chain media may be immutable. In some examples, the off-chain media may be mutable. In some examples, the pointer may be immutable. In some examples, the pointer may be mutable.

The token 600 may include on-chain pointers to off-chain metadata 640. The off-chain metadata 630 can include, for example, a description of the token 600, a description of the digital asset 605 that the token 600 represents, some immutable attributes or properties of the digital asset 605 and/or the token 600, or some combination thereof. Some digital assets 605 and/or tokens 600 may require significant quantities of metadata, which can require a lot of storage space to store, and can thus be expensive to store on-chain in terms of execution fee charges (such as gas on an Ethereum blockchain ledger). Thus, it may be more efficient to store this metadata off-chain in one or more off-chain locations, such as the data structures 650. The on-chain pointer can include a uniform resource identifier (URI), such as a uniform resource locator (URL), that points to the one or more network locations of the one or more off-chain locations. In some examples, hashes can be stored of the off-chain metadata, so that a verifying device can compute a hash of the off-chain metadata and compare the computed hash to the stored hash that is stored on-chain to verify that the off-chain metadata is accurate. In some examples, the off-chain metadata may be immutable. In some examples, the off-chain metadata may be mutable. In some examples, the pointer may be immutable. In some examples, the pointer may be mutable.

Figure 7:
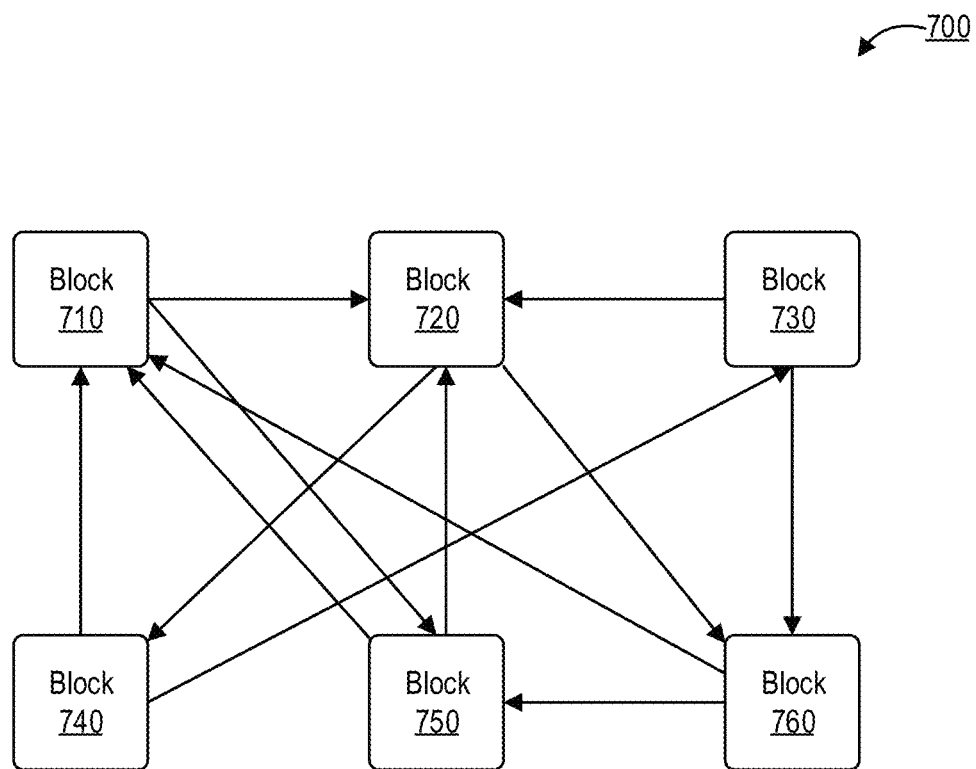
FIG. 7 is a block diagram illustrating a directed acyclic graph (DAG) ledger configured to track a digital asset associated with a position in a geographic area, in accordance with some examples.

FIG. 7 is a block diagram illustrating a directed acyclic graph (DAG) ledger 700 configured to track a digital asset associated with a position in a geographic area, according to an aspect of the present disclosure. While FIG. 5 discusses use of a blockchain ledger 500, it should be understood that a non-linear ledger structure, such as the directed acyclic graph (DAG) ledger structure of FIG. 7, may be used instead of or in addition to the blockchain ledger 500 discussed herein. The term "distributed ledger" as used herein should be understood to refer to at least one of a blockchain ledger 500 (as in FIG. 5), a DAG ledger 700 (as in FIG. 7), or a combination thereof. In a DAG ledger, each block header includes the hashes of blocks, or block headers, of a predetermined number of other "parent" blocks in the DAG ledger selected either at random or in some other non-linear manner, rather than the hash of a single previous block in the blockchain. Where each block header includes multiple hashes corresponding to different parent blocks or their headers, these hashes can be combined together (e.g., using a Merkle root).

For example, in the DAG ledger of FIG. 7, the predetermined number is two, at least after the first two blocks are generated. In the web DAG ledger of FIG. 7, the parent blocks are indicated using arrows. Block 710 includes hashes of the block headers of parent blocks 720 and 750. Block 720 includes hashes of the block headers of parent blocks 740 and 760. Block 730 includes hashes of the block headers of parent blocks 720 and 760. Block 740 includes hashes of the block headers of parent blocks 710 and 730. Block 750 includes hashes of the block headers of parent blocks 710 and 720. Block 760 includes hashes of the block headers of parent blocks 710 and 750. The resulting structure is a directed acyclic graph (DAG) of blocks, where each vertex block includes a hash of its parent vertex block(s), rather than a linear stream of blocks as in a blockchain. A DAG ledger may sometimes be referred to as a "web," a "tangle," or a "hashgraph."

In some examples, the number of parent blocks of a given block in a DAG ledger is not predetermined, but there may be a predetermined minimum number of parent blocks, such as a two-parent minimum or a one-parent minimum, meaning that each block has at least the predetermined minimum number of parent blocks. In some cases, each block in a DAG ledger may only identify only a single payload element (e.g., a token 600) rather than multiple payload elements, and may therefore forego a Merkle root 520/350/380 of payload elements and/or replace it with a hash of the single payload element. In other implementations, each block may identify multiple payload elements associated with a predetermined time period, and/or may include a Merkle root 520/350/380 of the payload elements. In some examples, DAG ledgers 700 may provide benefits over blockchain ledgers 500 by providing parallelized validation, which may provide higher throughput.

Figure 8A:
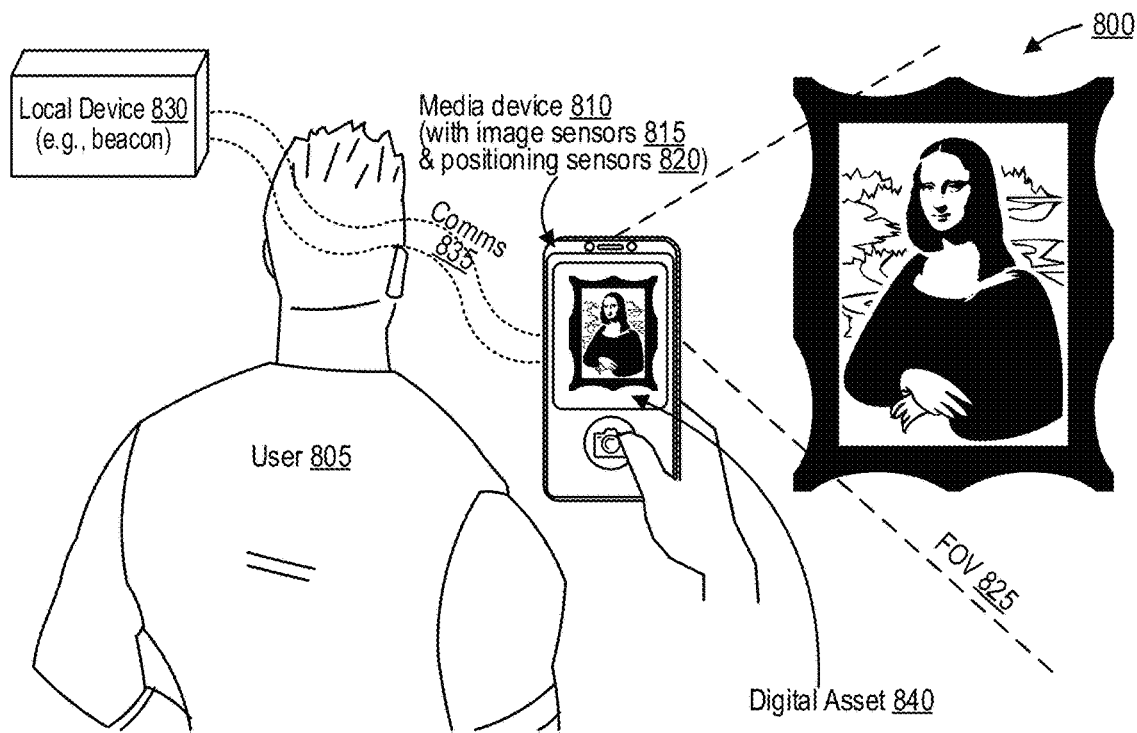
FIG. 8A is a perspective diagram illustrating a user using a media device to capture a digital asset (an image) of a portrait in a museum, in accordance with some examples.

FIG. 8A is a perspective diagram 800 illustrating a user 805 using a media device 810 to capture a digital asset 840 (an image) of a portrait in a museum. The media device 810 captures the digital asset 840 using image sensors 815 of the media device 810 while the portrait (the Mona Lisa) in the museum (the Louvre museum) is in the field of view (FOV) 825 of the image sensors 815 of the media device 810. The media device 810 may be an example of the media device 205. The image sensors 815 of the media device 810 may be examples of the media sensors 220 of the media device 205. The media device 810 may generate positioning data using its positioning sensors 820 at a time contemporaneous with, and/or during, capture of the image corresponding to the digital asset 840 by the image sensors 815. The positioning sensors 820 may be examples of the pose sensors 215. The positioning data may be examples of the pose data 225. The media device 810 may communicate with a local device 830 in the geographic area (e.g., in the museum) or in the proximity of the geographic area (e.g., near the museum). The media device 810 may send and/or receive one or more communications 835 to and/or from the local device 830. The local device 830 may be an example of the local device 270. The communications 835 may be an example of the communications 272. In some examples, the local device 830 may be a beacon.

While the media device 810 of FIG. 8A is illustrated as a mobile handset 410, in some examples the media device 810 may be a media device 810 with and/or geographicly locked to the geographic area. For example, the media device 810 may be a kiosk device that is geographicly locked to the Louvre Museum that the user 805 can approach and capture the digital asset 840 using. In this case, such a media device 810 can self-verify that it is located in the geographic area, for instance because the media device 810 is geographicly locked to the geographic area.

Figure 8B:
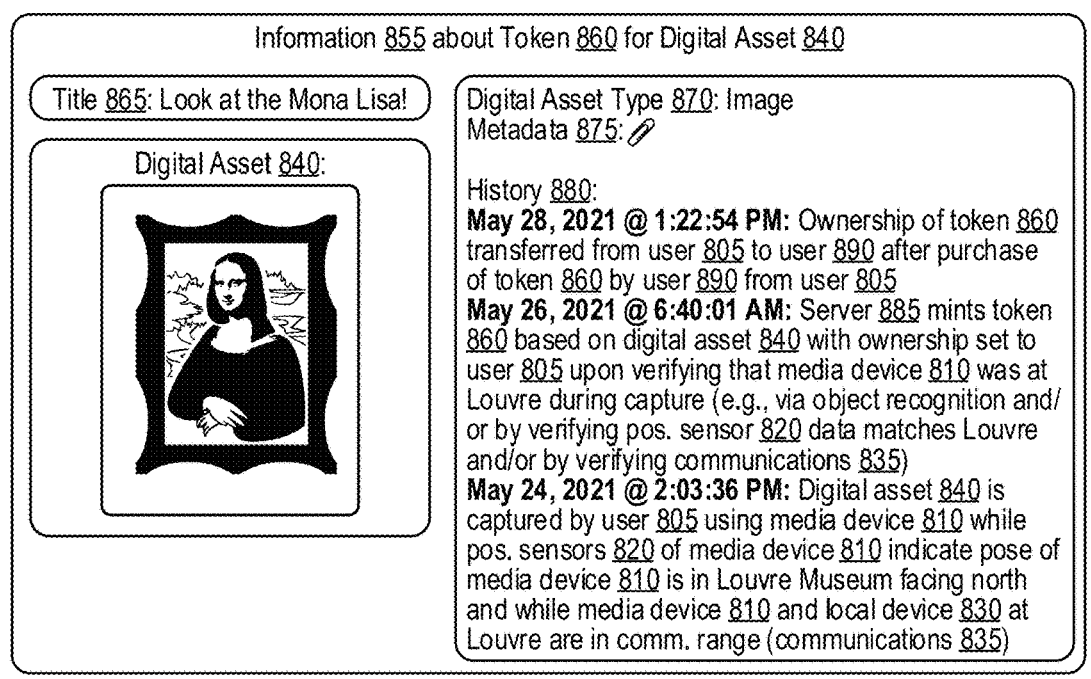
FIG. 8B is a conceptual diagram illustrating information about a token associated with the digital asset of FIG. 8A, in accordance with some examples.

FIG. 8B is a conceptual diagram 850 illustrating information 855 about a token 860 associated with the digital asset 840 of FIG. 8A. The token 860 can be an example of a token 600. The information 855 can be partially identified in the token 860 itself (e.g., as token identifiers 610, on-chain immutable metadata 625, on-chain mutable metadata 630, off-chain media 635, off-chain metadata 640, rules of one or more smart contracts 645, or a combination thereof). The information 855 about the token 860 includes a title 865, indicated as "Look at the Mona Lisa!" The information 855 about the token 860 includes a copy of the digital asset 840 (e.g., retrieved using an on-chain pointer to off-chain media 635 from the token 860). The information 855 about the token 860 identifies the digital asset type 870 of the digital asset 840 as being an image. The information 855 about the token 860 includes metadata 875 associated with capture of the digital asset 840, which is a paperclip icon (indicating that the metadata 875 is viewable upon clicking the paperclip icon).

The information 855 about the token 860 includes history 880. In some examples, each element of the history 880 is identified as a payload element in a block of the distributed ledger that stores the token 860. The history 880 indicates that, on May 24, 2021 at 2:03:36 PM, the digital asset 840 is captured by user 805 using media device 810 while positioning sensors 920 of media device 810 indicate a pose of the media device 810 is in the Louvre Museum facing north and while media device 810 and local device 830 at the Louvre Museum are in communication range (based on communications 835). The history 880 indicates that, on May 26, 2021 at 6:40:01 AM, a server 885 mints token 860 based on digital asset 840 with ownership set to user 805 upon verifying that media device 810 was at the Louvre Museum during capture (e.g., via object recognition and/or by verifying positioning sensor 820 data matches the Louvre Museum's known geographic area and/or by verifying communications in communications 835). The server 885 may be an example of the network device 280. The history 880 indicates that, on May 28, 2021 @ 1:22:54 PM, ownership of token 860 is transferred from user 805 to user 890 after purchase of token 860 by user 890 from user 805.

In some examples, a venue may permit venue attendees to capture a limited amount of digital assets for which a network device 280 associated with the venue can mint tokens 600. For example, a venue attendee can purchase a token "pass" from the venue indicating that the network device 280 associated with the venue will generate one or more tokens for, a certain number of images (or other digital assets) captured by the user within the venue (e.g., tokens to be generated by 5 of the user's images in the venue). Generating tokens for such images can use the reputation of the token minter (the venue and the network device 280 associated with the venue) to help prove that the user was really at the venue on a given day and time, for example allowing the user to prove that they were at a particular concert, sports game, film showing, and the like. Generating tokens for such images can use the reputation of the token minter (the venue and the network device 280 associated with the venue) to help prove that the user was at a particular section of the venue (e.g., a particular seat). In some cases, verification that the media device 205 was in the geographic area (e.g., in the venue) at a time contemporaneous with, and/or during, capture of the sensor data 230 associated with the media data 250 of the digital asset may include cross-referencing the identity of the user with tickets to the venue and/or to particular sections of the venue (e.g. particular seats or seating sections). In some examples, tokens for images (or other media) captured from certain seats or positions within the venue (e.g., front-row seats) may be more valuable than tokens for images (or other media) captured from other seats or positions within the venue (e.g., the faraway seats or "nosebleed" seats). In some examples, the geographic area may be a particular portion of a venue, such as a particular seat or seating section.

Figure 9A:
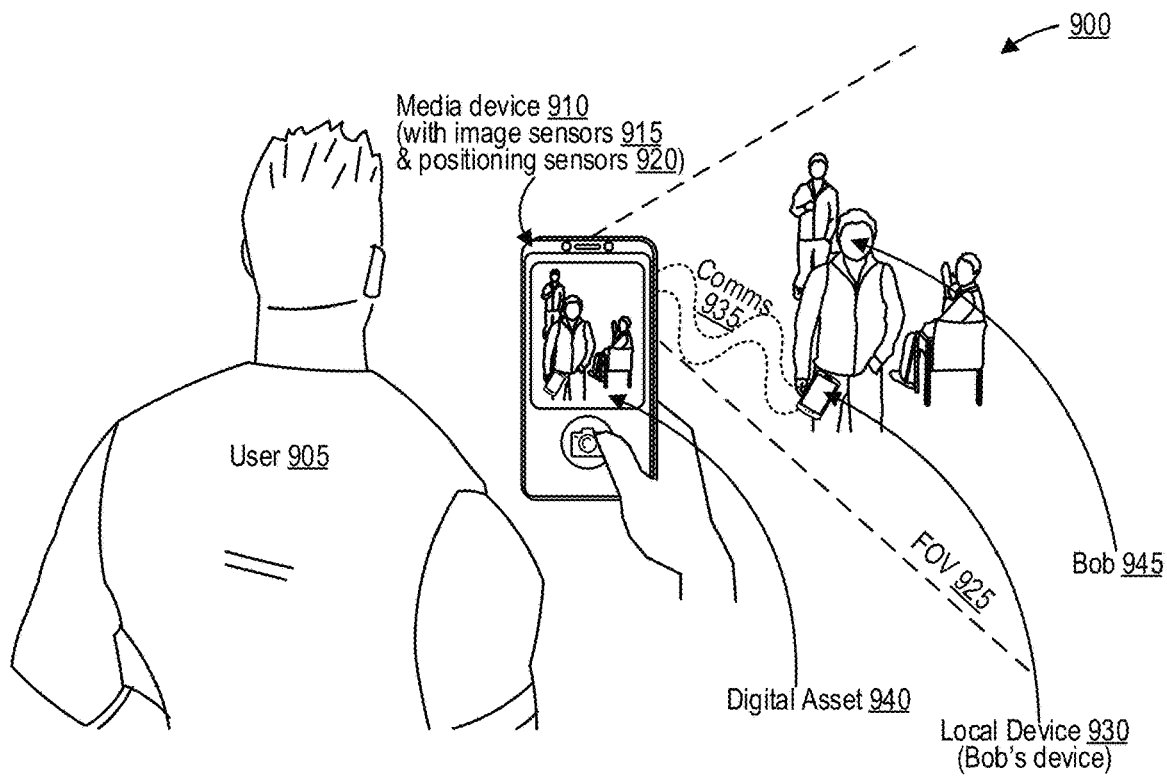
FIG. 9A is a perspective diagram illustrating a user using a media device to capture a digital asset (an image) of several people including an individual identified as Bob, in accordance with some examples.
Figure 9B:
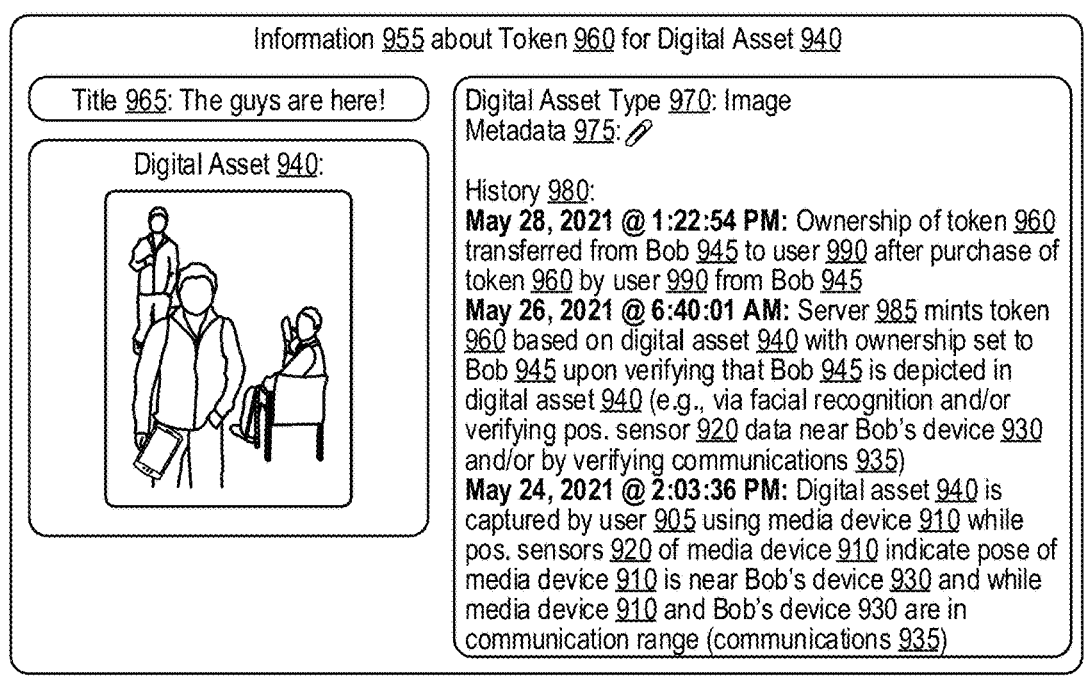
FIG. 9B is a conceptual diagram illustrating information about a token associated with the digital asset of FIG. 9A, in accordance with some examples.

FIG. 9A is a perspective diagram 900 illustrating a user 905 using a media device 910 to capture a digital asset 940 (an image) of several people including an individual identified as Bob 945. The media device 910 captures the digital asset 940 using image sensors 915 of the media device 910 while the people, including Bob 945, are in the field of view (FOV) 925 of the image sensors 915 of the media device 910. The media device 910 may be an example of the media device 205. The image sensors 915 of the media device 910 may be examples of the media sensors 220 of the media device 205. The media device 910 may generate positioning data using its positioning sensors 920 at a time contemporaneous with, and/or during, capture of the image corresponding to the digital asset 940 by the image sensors 915. The positioning sensors 920 may be examples of the pose sensors 215. The positioning data may be examples of the pose data 225. The media device 910 may communicate with a local device 930 in the geographic area or in the proximity of the geographic area. The local device 930 may be, for example, Bob's device. In the context of FIGS. 9A-9B, the geographic area may be the vicinity of the people depicted in the digital asset 940, including Bob 945. Verification that the media device 910 is in the geographic area may help verify that the people depicted in the digital asset 940 are, in fact, Bob 845 and the other depicted people. The media device 910 may send and/or receive one or more communications 935 to and/or from the local device 930. The local device 930 may be an example of the local device 270. The communications 935 may be an example of the communications 272.

FIG. 9B is a conceptual diagram 950 illustrating information 955 about a token 960 associated with the digital asset 940 of FIG. 9A. The token 960 can be an example of a token 600. The information 955 can be partially identified in the token 960 itself (e.g., as token identifiers 610, on-chain immutable metadata 625, on-chain mutable metadata 630, off-chain media 635, off-chain metadata 640, rules of one or more smart contracts 645, or a combination thereof). The information 955 about the token 960 includes a title 965, indicated as "The guys are here!" The information 955 about the token 960 includes a copy of the digital asset 940 (e.g., retrieved using an on-chain pointer to off-chain media 635 from the token 960). The information 955 about the token 960 identifies the digital asset type 970 of the digital asset 940 as being an image. The information 955 about the token 960 includes metadata 975 associated with capture of the digital asset 940. The metadata 975 is shown as a paperclip icon (indicating that the metadata 975 is viewable upon clicking the paperclip icon).

The information 955 about the token 960 includes history 980. In some examples, each element of the history 980 is identified as a payload element in a block of the distributed ledger that stores the token 960. The history 980 indicates that, on May 24, 2021 at 2:03:36 PM, the digital asset 940 is captured by user 905 using media device 910 while positioning sensors 920 of media device 910 indicate that a pose of the media device 910 is near Bob's device 930 and while media device 910 and Bob's device 930 are in communication range (communications 935). The history 980 indicates that, on May 26, 2021 at 6:40:01 AM, a server 985 mints token 960 based on digital asset 940 with ownership set to Bob 945 upon verifying that Bob 945 is depicted in digital asset 940 (e.g., via facial recognition and/or verifying positioning sensor 920 data near Bob's device 930 and/or by verifying communications 935). The server 985 may be an example of the network device 280. The history 980 indicates that, on May 28, 2021 @ 1:22:54 PM, ownership of token 960 transferred from Bob 945 to user 990 after purchase of token 960 by user 990 from Bob 945.

In some examples, one or more tokens 960 may be minted by the server 985 corresponding to the digital asset 940. For example, the server 985 may mint the one or more tokens 960 so that the user 905 that captured the digital asset 940 can own one of the tokens 960, and so that each of the people identified in the digital asset 940 (including Bob 945 as identified in the information 955) can own one of the tokens 960.

Figure 10A:
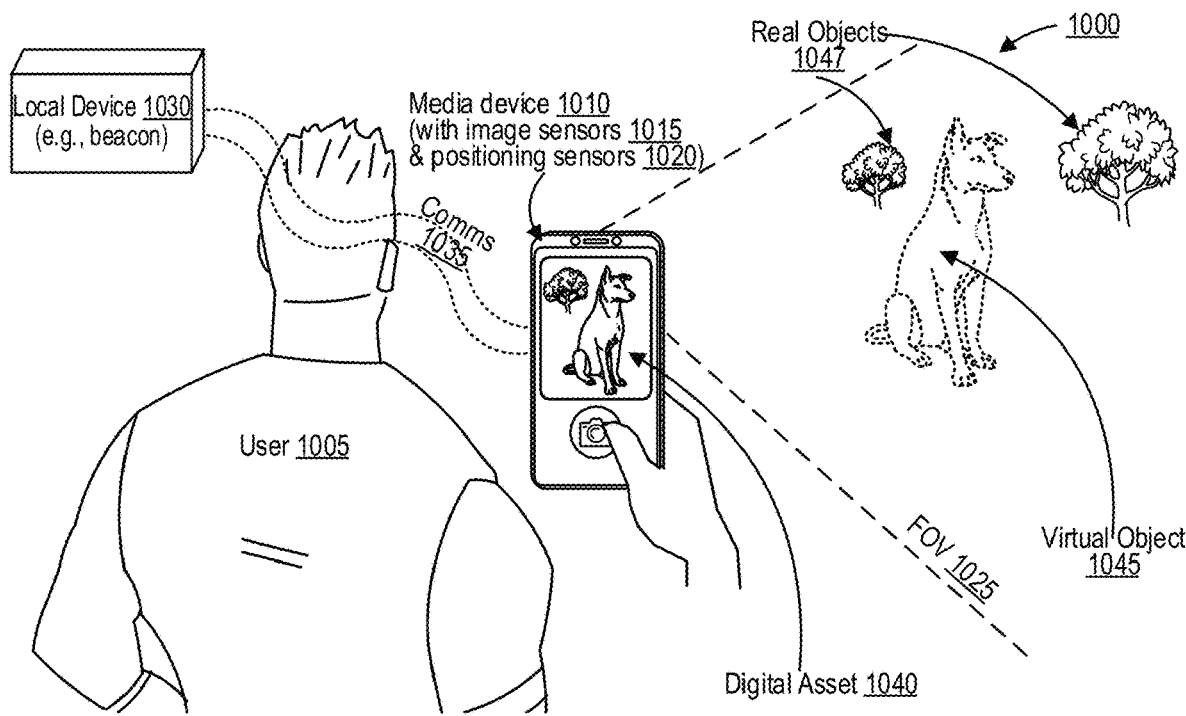
FIG. 10A is a perspective diagram illustrating a user using a media device to generate a digital asset (an image) of that includes a virtual object composited into a real scene, in accordance with some examples.

FIG. 10A is a perspective diagram 1000 illustrating a user 1005 using a media device 1010 to generate a digital asset 1040 (an image) of that includes a virtual object 1045 composited into a real scene. The media device 1010 captures the digital asset 1040 using image sensors 1015 of the media device 1010 while the virtual object 1045 (a virtual dog) in the geographic area (a park) is in the field of view (FOV) 1025 of the image sensors 1015 of the media device 1010. In some examples, the virtual object 1045 may be associated with the geographic area, for example being part of a video game in which different virtual objects appear in different geographic areas, so that the user 1005 might wander to different geographic areas in order to "catch," meet, or otherwise encounter different virtual objects 1045 (e.g., different virtual pets). The media device 1010 may be an example of the media device 205. The image sensors 1015 of the media device 1010 may be examples of the media sensors 220 of the media device 205. The media device 1010 may generate positioning data using the positioning sensors 1020 at a time contemporaneous with, and/or during, capture of the image of the park corresponding to the digital asset 1040 by the image sensors 1015. The virtual object 1045 may be generated (e.g., via a virtual content generator 240) added into the image of the park (e.g., via an image compositor 245). The positioning sensors 1020 may be examples of the pose sensors 215. The positioning data may be examples of the pose data 225. The media device 1010 may communicate with a local device 1030 in the geographic area (e.g., in the museum) or in the proximity of the geographic area (e.g., near the museum). The media device 1010 may send and/or receive one or more communications 1035 to and/or from the local device 1030. The local device 1030 may be an example of the local device 270. The communications 1035 may be an example of the communications 272.

Figure 10B:
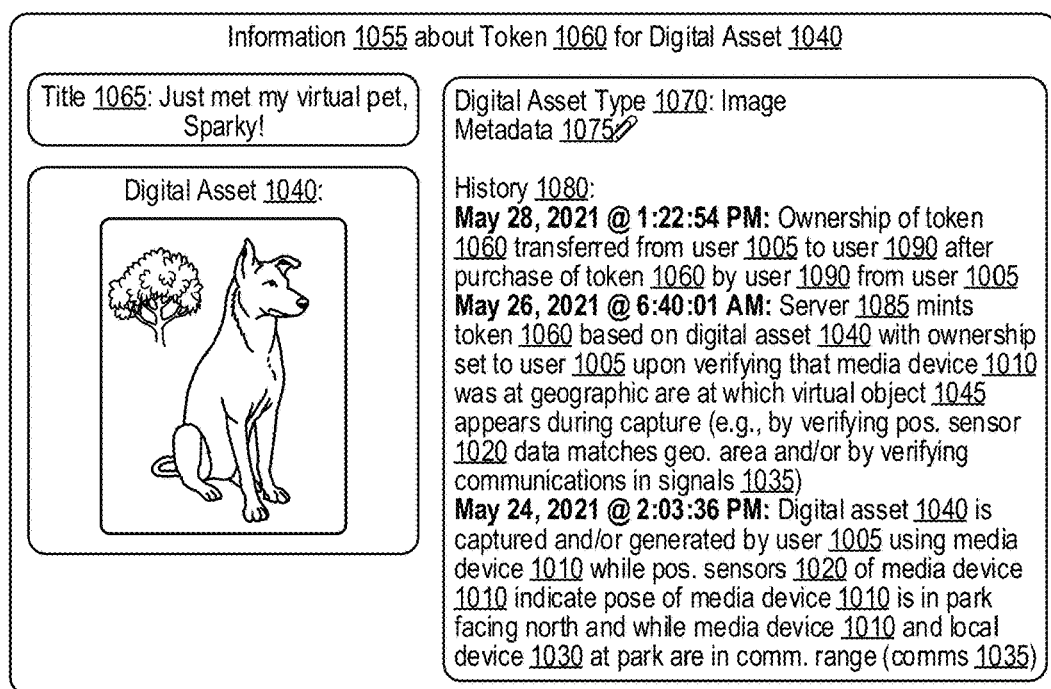
FIG. 10B is a conceptual diagram illustrating information about a token associated with the digital asset of FIG. 10A, in accordance with some examples.

FIG. 10B is a conceptual diagram 1050 illustrating information 1055 about a token 1060 associated with the digital asset 1040 of FIG. 10A. The token 1060 can be an example of a token 600. The information 1055 can be partially identified in the token 1060 itself (e.g., as token identifiers 610, on-chain immutable metadata 625, on-chain mutable metadata 630, off-chain media 635, off-chain metadata 640, rules of one or more smart contracts 645, or a combination thereof). The information 1055 about the token 1060 includes a title 1065, indicated as "Just met my virtual pet, Sparky!" The information 1055 about the token 1060 includes a copy of the digital asset 1040 (e.g., retrieved using an on-chain pointer to off-chain media 635 of the token 1060). The information 1055 about the token 1060 identifies the digital asset type 1070 of the digital asset 1040 as being an image. The information 1055 about the token 1060 includes metadata 1075 associated with capture of the digital asset 1040, which is a paperclip icon (indicating that the metadata 1075 is viewable upon clicking the paperclip icon).

The information 1055 about the token 1060 includes history 1080. In some examples, each element of the history 1080 is identified as a payload element in a block of the distributed ledger that stores the token 1060. The history 1080 indicates that, on May 24, 2021 at 2:03:36 PM, the digital asset 1040 is captured and/or generated by user 1005 using media device 1010 while positioning sensors 1020 of media device 1010 indicate the pose of the media device 1010 is in a park facing north and while the media device 1010 and the local device 1030 at the park are in communication range (communications 1035). As shown, the park includes real objects 1047 (e.g., trees and/or other objects). The history 1080 indicates that, on May 26, 2021 at 6:40:01 AM, a server 1085 mints token 1060 based on digital asset 1040 with ownership set to user 1005 upon verifying that media device 1010 was at geographic are at which virtual object 1045 appears during capture (e.g., by verifying positioning sensors 1020 data matches the geographic area and/or by verifying communications 1035). The server 1085 may be an example of the network device 280. The history 1080 indicates that, on May 28, 2021 @ 1:22:54 PM, ownership of token 1060 is transferred from user 1005 to user 1090 after purchase of token 1060 by user 1090 from user 1005.

In some examples, generation of the virtual object 1045 and/or the token 1060 associated therewith may be part of a video game, and may be driven by a scarcity function that considers factors such as user volume (number of users of the video game), user locations (geographic distribution of the users of the video game), market transaction history (recent transfers of virtual objects 1045 and/or tokens 1060 associated therewith (indicating interests of user base)), user engagement (hours in the video game per user), or a combination thereof.

FIG. 11A is a perspective diagram 1100 illustrating a user 1105 using a media device 1110 to generate a digital asset 1140 (a map) of a hiking path. The media device 1110 captures sensor data using its positioning sensors 1120. The sensor data may be examples of the pose data 225 and/or of the sensor data 230. The positioning sensors 1120 may be examples of the pose sensors 215 and/or of the media sensors 220. The media device 1110 may generate the digital asset 1140 (the map) of the hiking path using a map generator 247. At least some of the sensor data may be captured by the positioning sensors 1120 while the media device 1110 is in the geographic area (e.g., the park within which the hiking trail is).

The media device 1110 may communicate with a local device 1130 in the geographic area (e.g., in the museum) or in the proximity of the geographic area (e.g., near the museum). The media device 1110 may send and/or receive one or more communications 1135 to and/or from the local device 1130. The local device 1130 may be an example of the local device 270. The communications 1135 may be an example of the communications 272.

FIG. 11B is a conceptual diagram 1150 illustrating information 1155 about a token 1160 associated with the digital asset 1140 of FIG. 11A. The token 1160 can be an example of a token 600. The information 1155 can be partially identified in the token 1160 itself (e.g., as token identifiers 610, on-chain immutable metadata 625, on-chain mutable metadata 630, off-chain media 635, off-chain metadata 640, rules of one or more smart contracts 645, or a combination thereof). The information 1155 about the token 1160 includes a title 1165, indicated as "Look at the Mona Lisa!" The information 1155 about the token 1160 includes a copy of the digital asset 1140 (e.g., retrieved using an on-chain pointer to off-chain media 635 of the token 1160). The information 1155 about the token 1160 identifies the digital asset type 1170 of the digital asset 1140 as being an image. The information 1155 about the token 1160 includes metadata 1175 associated with capture of the digital asset 1140, which is a paperclip icon (indicating that the metadata 1175 is viewable upon clicking the paperclip icon).

The information 1155 about the token 1160 includes history 1180. In some examples, each element of the history 1180 is identified as a payload element in a block of the distributed ledger that stores the token 1160. The history 1180 indicates that, on May 24, 2021 at 2:03:36 PM, the digital asset 1140 is captured/generated by user 1105 using media device 1110 while positioning sensors 920 of media device 1110 indicate that a pose of media device 1110 is in the park facing west and while media device 1110 and local device 1130 (e.g., beacon) at park are in communication range (communications 1135). The history 1180 indicates that, on May 26, 2021 at 6:40:01 AM, a server 1185 mints token 1160 based on digital asset 1140 with ownership set to user 1105 upon verifying that media device 1110 was at park during capture (e.g., by verifying positioning sensor 1120 data matches park and/or by verifying communications 1135). The server 1185 may be an example of the network device 280. The history 1180 indicates that, on May 28, 2021 @ 1:22:54 PM, ownership of token 1160 is transferred from user 1105 to user 1190 after purchase of token 1160 by user 1190 from user 1105.

In some examples, additional information may be required (e.g., by one or more smart contracts 645) to be verified (e.g., by a network device 280) before the network device 280 can mint a token corresponding to a particular digital asset. For example, in addition to verifying that the media device was in the geographic location, the additional information that may be required to be verified may include fitness or activity accomplishments (step counts, calories burned, first runner on new trail, etc.), a difficulty level of accomplishment (e.g., steps on a steep mountain vs. steps on a flat surface), a personal record, a local record, a world record, or a combination thereof. This information may be based on pose data 225, positioning data, fitness app data, health app data, fitness tracker data, wearable device data, and the like.

Figure 12A:
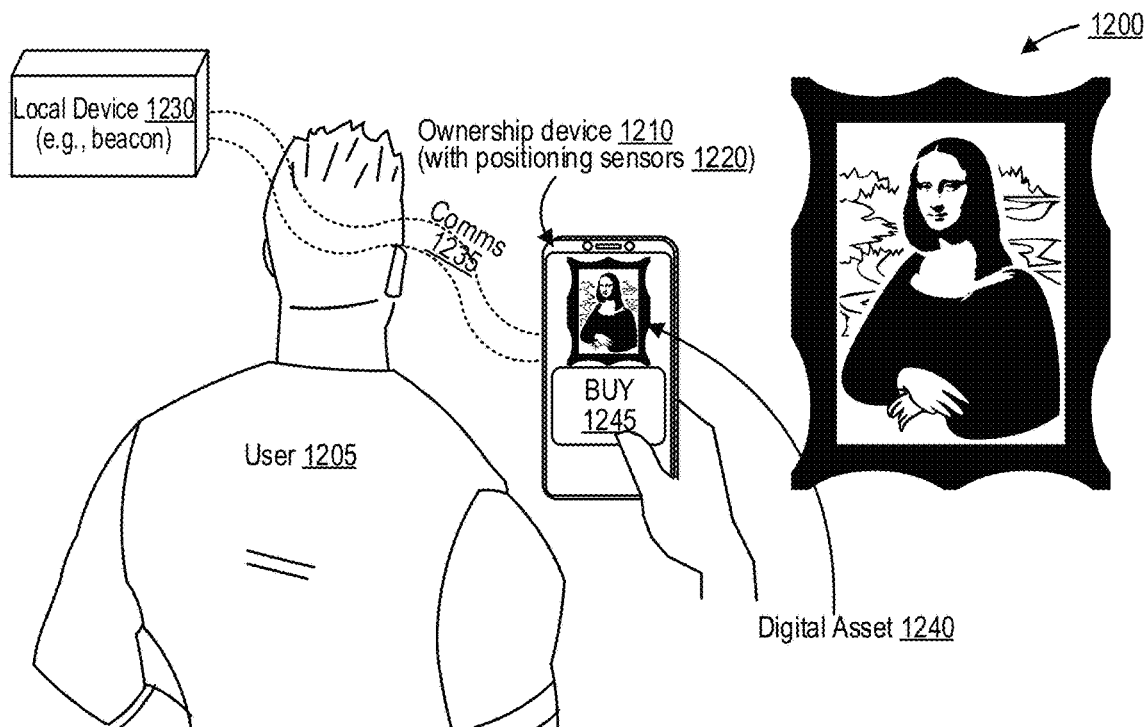
FIG. 12A is a perspective diagram illustrating a user using an ownership device to purchase a digital asset (an image) of a portrait in a museum, in accordance with some examples.

FIG. 12A is a perspective diagram 1200 illustrating a user 1205 using an ownership device 1210 to purchase a digital asset 1240 (an image) of a portrait in a museum. The ownership device 1210 displays a purchase user interface with a "buy" button 1245. Pressing the buy button 1245 allows the ownership device 1210 to either purchase an existing token 1260 for the digital asset 1240, or to request creation (minting) of a new token 1260 for the digital asset 1240. The digital asset 1240 may be captured by one or more sensors of a media device (e.g., as in the media device 205). In some examples, the ownership device 1210 may be the media device that captures the digital asset 1240. In some examples, the ownership device 1210 may be distinct from the media device that captures the digital asset 1240. For instance, the media device that captures the digital asset 1240 may be the media device 810 of FIG. 8A. The ownership device 1210 may include positioning sensors 1220. The ownership device 1210 may generate positioning data using its positioning sensors 1220. The positioning sensors 1220 may be examples of the pose sensors 215. The positioning data may be examples of the pose data 225. The ownership device 1210 may communicate with a local device 1230 in the geographic area (e.g., in the museum) or in the proximity of the geographic area (e.g., near the museum). The ownership device 1210 may send and/or receive one or more communications 1235 to and/or from the local device 1230. The local device 1230 may be an example of the local device 270. The communications 1235 may be an example of the communications 272. In some examples, the ownership device 1210 may only be offered to purchase ownership of (and/or creation/minting of) the token 1260 if the ownership device 1210 is verified as being in the geographic area (e.g., in the Louvre Museum). In some examples, the ownership device 1210 may only be able to become the owner of (and/or cause creation/minting of) the token 1260 if the ownership device 1210 is verified as being in the geographic area (e.g., in the Louvre Museum).

Figure 12B:
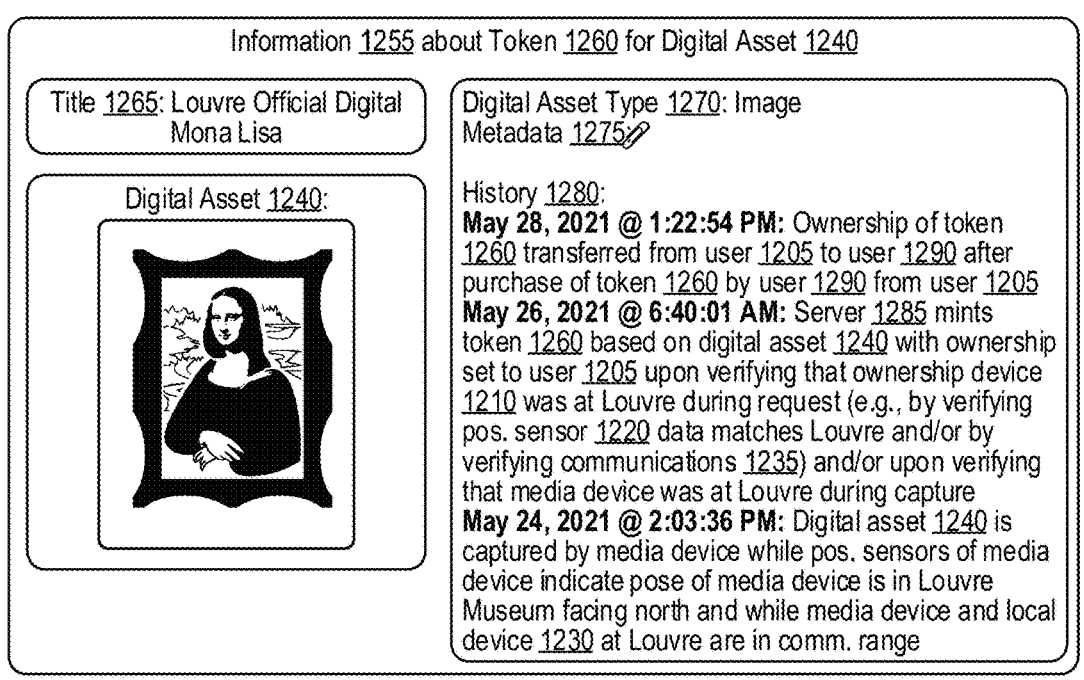
FIG. 12B is a conceptual diagram illustrating information about a token associated with the digital asset of FIG. 12A, in accordance with some examples.

FIG. 12B is a conceptual diagram 1250 illustrating information 1255 about a token 1260 associated with the digital asset 1240 of FIG. 12A. The token 1260 can be an example of a token 600. The information 1255 can be partially identified in the token 1260 itself (e.g., as token identifiers 610, on-chain immutable metadata 625, on-chain mutable metadata 630, off-chain media 635, off-chain metadata 640, rules of one or more smart contracts 645, or a combination thereof). The information 1255 about the token 1260 includes a title 1265, indicated as "Louvre Official Digital Mona Lisa" The information 1255 about the token 1260 includes a copy of the digital asset 1240 (e.g., retrieved using an on-chain pointer to off-chain media 635 of the token 1260). The information 1255 about the token 1260 identifies the digital asset type 1270 of the digital asset 1240 as being an image. The information 1255 about the token 1260 includes metadata 1275 associated with capture of the digital asset 1240. The metadata 1275 is shown as a paperclip icon (indicating that the metadata 1275 is viewable upon clicking the paperclip icon).

The information 1255 about the token 1260 includes history 1280. In some examples, each element of the history 1280 is identified as a payload element in a block of the distributed ledger that stores the token 1260. The history 1280 indicates that, on May 24, 2021 at 2:03:36 PM, the digital asset 1240 is captured by media device while positioning sensors of the media device indicate the pose of the media device is in Louvre Museum facing north and while media device and local device 1230 at the Louvre Museum are in communication range. The history 1280 indicates that, on May 26, 2021 at 6:40:01 AM, a server 1285 mints token 1260 based on digital asset 1240 with ownership set to user 1205 upon verifying that the ownership device 1210 was at the Louvre during request of the digital asset 1240 (e.g., by verifying positioning sensor 1220 data matches the Louvre Museum and/or upon verifying communications 1235) and/or verifying that the media device was at the Louvre Museum during capture of the digital asset 1240. The server 1285 may be an example of the network device 280. The history 1280 indicates that, on May 28, 2021 @ 1:22:54 PM, ownership of token 1260 is transferred from user 1205 to user 1290 after purchase of token 1260 by user 1290 from user 1205.

In some examples, the user interface (with the buy button 1245) for the ownership device 1210 may filter which digital assets 1240 and/or tokens 1260 associated therewith are available for same, for example based on factors such as credentialing (using a specific app to look for specific content based on scene information or designating NFT content for viewing or purchase by select users), user selection, user filtering, crowdsourced feedback (number of views, likes, comments, requests, etc.), and/or learned user behavior (e.g., behavior learning using a machine learning algorithm).

In some examples, tracked histories of tokens, such as the histories 880, 980, 1080, 1180, and 1280, may track chain of custody of a token corresponding to a digital asset, such as token 860 corresponding to digital asset 840, token 960 corresponding to digital asset 940, token 1060 corresponding to digital asset 1040, token 1160 corresponding to digital asset 1140, or token 1260 corresponding to digital asset 1240. In some examples, users may view the histories and/or chains of custody of certain tokens. For example, visitors to a museum (e.g., the Louvre Museum) may be interested in viewing the history and/or chain of custody of an official token for a digital copy of a particular work of art in the museum (e.g., the official digital copy of the Mona Lisa portrait that was produced by the museum's staff).

Figure 13:
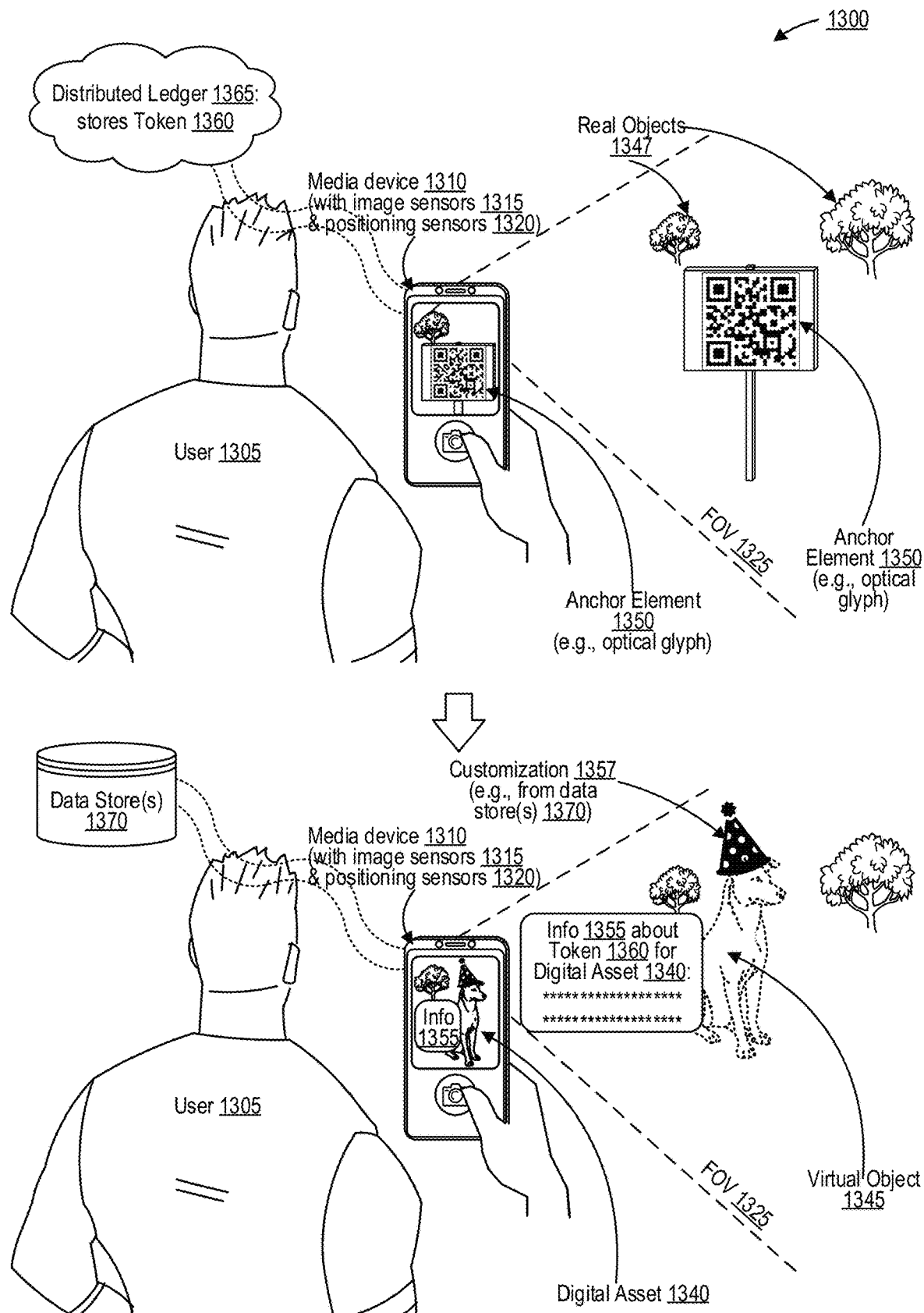
FIG. 13 is a conceptual diagram illustrating an anchor element that is associated with a token, and detection of the anchor element by a media device triggering display of a digital asset corresponding to the token on the media device, in accordance with some examples.

FIG. 13 is a conceptual diagram 1300 illustrating an anchor element 1350 that is associated with a token 1360, and detection of the anchor element 1350 by a media device 1310 triggering display of a digital asset 1340 corresponding to the token on the media device 1310. The anchor element 1350 may be an example of the anchor element(s) 299 of FIG. 2. The anchor element 1350 is illustrated as an optical glyph, specifically a QR code. In some examples, the optical glyph of the anchor element 1350 can include QR codes, bar codes, Aztec codes, dot codes, data matrices, shotcodes, or combinations thereof. Other real objects 1347 (e.g., trees) are also illustrated. In some examples, optical glyph may optically encode information identifying the token 1360, information about the token 1360, information indicative of the token 1360, or a combination thereof. The media device 1310 detects the optical glyph of the anchor element 1350 using the image sensors 1315 of the media device 1310. In some examples, the media device 1310 scans the optical glyph of the anchor element 1350 using the image sensors 1315 of the media device 1310 to decode the information that is optically encoded in the optical glyph of the anchor element 1350. Based on the information, the media device 1310 determines that the anchor element 1350 is associated with a token 1360 (e.g., token 600) stored in a distributed ledger 1365 (e.g., blockchain ledger 500 and/or DAG ledger 700).

The media device 1310 determines, based on the information that the media device 1310 has decoded about the token 1360 from the anchor element 1350 and/or based on information that the media device 1310 has read about the token 1360 in the distributed ledger 1365, that the token 1360 is associated with a digital asset 1340. In the example illustrated in FIG. 13, the digital asset 1340 is a virtual object 1345 illustrated as a virtual dog, similar to the virtual object 1045 of FIG. 10A. The media device 1310 displays the digital asset 1340 (e.g., the virtual object 1345) on the display of the media device 1310. The media device 1310 can also display information 1355 about the token 1360 that is associated with the digital asset 1340. For instance, the information 1355 can include ownership of the token 1360 (e.g., name of the owner of the token 1360 or some other identifier of the owner), an identifier and/or type of the distributed ledger 1365 on which the token 1360 is minted (e.g., Ethereum®, Cardano®, distributed ledger 295, blockchain ledger 500, DAG ledger 700, distributed ledger 1365, distributed ledger 1415, etc.), information about smart contract(s) associated with the token 1360 (e.g., third-party security audits of the contract, when the token 1360 was minted, when the smart contract was launched, when the smart contract was updated, when the conditions of the smart contract were met), when the token 1360 was generated and/or minted, a token identifier 610, a token unit quantity 615 (e.g., how many instances of the token 1360 exist, which instance is this specific token 1360) a token ownership 620, any on-chain immutable metadata 625, on-chain mutable metadata 630, off-chain media 635, on-chain media, off-chain metadata 640, token smart contracts 645, any information about any other parameters of the token 1360, or a combination thereof. In some examples, the information 1355 may include an interface element (e.g., a button, a link, a URL, a pointer) to a transfer platform that can allow the token 1360 to be transferred (e.g., bought, sold, rented, licensed, or some combination thereof). If the user 1305 is the current owner of the token 1360, the interface element may direct the media device 1310 to sell the token 1360 using the transfer platform. If the user 1305 is not the current owner of the token 1360, the interface element may direct the media device 1310 to buy the token 1360 using the transfer platform.

The media device 1310 may also communicate with data store(s) 1370 to obtain information about the token 1360, the digital asset 1340, and/or any modifications, customizations, and/or personalizations. The data store(s) 1370 may be examples of the data store(s) 298 and/or the data structure(s) 650. In some examples, some of the information 1355 may be obtained by the media device 1310 from the data store(s) 1370. In some examples, the data store(s) 1370 may store modifications, customizations, and/or personalizations to the digital asset 1340 (e.g., to the virtual object 1345). For example, in FIG. 13, one such customization 1357 stored in the data store(s) 1370 is illustrated as a hat (e.g., a party hat) for the virtual object 1345 (e.g., the virtual dog). The modifications, customizations, and/or personalizations to the digital asset 1340 may be added by an owner of the token 1360, in some examples. The modifications, customizations, and/or personalizations to the digital asset 1340 may be added by previous owner(s) of the token 1360, in some examples. The modifications, customizations, and/or personalizations to the digital asset 1340 may be added by viewer(s) of the digital asset 1340 corresponding to the token 1360, in some examples. Different users and/or owners of the token 1360 can set different settings identifying who can and cannot add modifications, customizations, and/or personalizations to the digital asset 1340.

In some examples, certain modifications, customizations, and/or personalizations to the digital asset 1340 may be automatically applied to a digital asset 1340 to help the user 1305 know certain information about a digital asset 1340 and/or the associated token 1360. For example, if the user 1305 owns the token 1360, a first effect (e.g., one or more modifications, customizations, and/or personalizations) may be applied to the digital asset 1340 as displayed by the media device 1310. If a person who the user 1305 knows (e.g., a friend, a family member, a co-worker, a contact, or an acquaintance of another relationship type) owns the token 1360, a second effect (e.g., one or more modifications, customizations, and/or personalizations) may be applied to the digital asset 1340 as displayed by the media device 1310. If a famous person (e.g., a celebrity) owns the token 1360, a third effect (e.g., one or more modifications, customizations, and/or personalizations) may be applied to the digital asset 1340 as displayed by the media device 1310. In some examples, different relationship types (e.g., friends vs. family vs. co-workers) can be associated with different effects (e.g., one or more modifications, customizations, and/or personalizations). In some examples, different types of famous people (e.g., politicians, sports stars, musicians, movie stars, TV stars, famous scientists, etc.) can be associated with different effects (e.g., one or more modifications, customizations, and/or personalizations).

While the media device 1310 is illustrated as initially showing a depiction of the anchor element 1350 on its display, it should be understood that this is intended to illustrate that the image sensors 1315 of the media device 1310 have captured image(s) of the anchor element 1350. In some examples, the anchor element 1350 itself is displayed by the media device 1310, for instance in an image preview window corresponding to the image sensors 1315. In some examples, the anchor element 1350 itself is never displayed by the media device 1310, and the media device 1310 instead displays the virtual object 1345 (e.g., with information 1355 and/or customization 1357) in its place.

In some examples, the anchor element 1350 may be a different type of anchor element than an optical glyph. For instance, in some examples, the anchor element 1350 may be an object, with reference image(s) of the object stored in the data store(s) 1370 and/or in the distributed ledger 1365 (e.g., using an on-chain pointer to off-chain reference image(s)). The media device 1310 may detect and recognize the object in image(s) captured using the image sensors 1315 by comparing the image(s) captured using the image sensors 1315 to the reference image(s) of the object. The data store(s) 1370 may identify the token 1360 along with the reference image(s) of the object, allowing the media device 1310 to determine the token 1360 upon detecting and/or recognizing the object, after which the media device 1310 proceeds as described above, outputting the digital asset 1340 (e.g., with information 1355 and/or customization 1357).

In some examples, the anchor element 1350 may include a specified area identified in the data store(s) 1370 and/or in the distributed ledger 1365 as associated with the token 1360. Detection by the media device 1310 using the positioning sensors 1320 and/or the image sensor(s) 1315 (e.g., by recognizing image(s) of the environment in the specified area) that the media device 1310 is located in the specified area can cause the media device 1310 to output the digital asset 1340 (e.g., with information 1355 and/or customization 1357) corresponding to the token 1360 corresponding to the anchor element 1350. In some examples, the anchor element 1350 may include a specified location identified in the data store(s) 1370 and/or in the distributed ledger 1365 as associated with the token 1360. Detection by the media device 1310 using the positioning sensors 1320 and/or the image sensor(s) 1315 (e.g., by recognizing image(s) of the environment in the specified area) that the media device 1310 is located within a threshold range of the specified location can cause the media device 1310 to output the digital asset 1340 (e.g., with information 1355 and/or customization 1357) corresponding to the token 1360 corresponding to the anchor element 1350.

Figure 14:
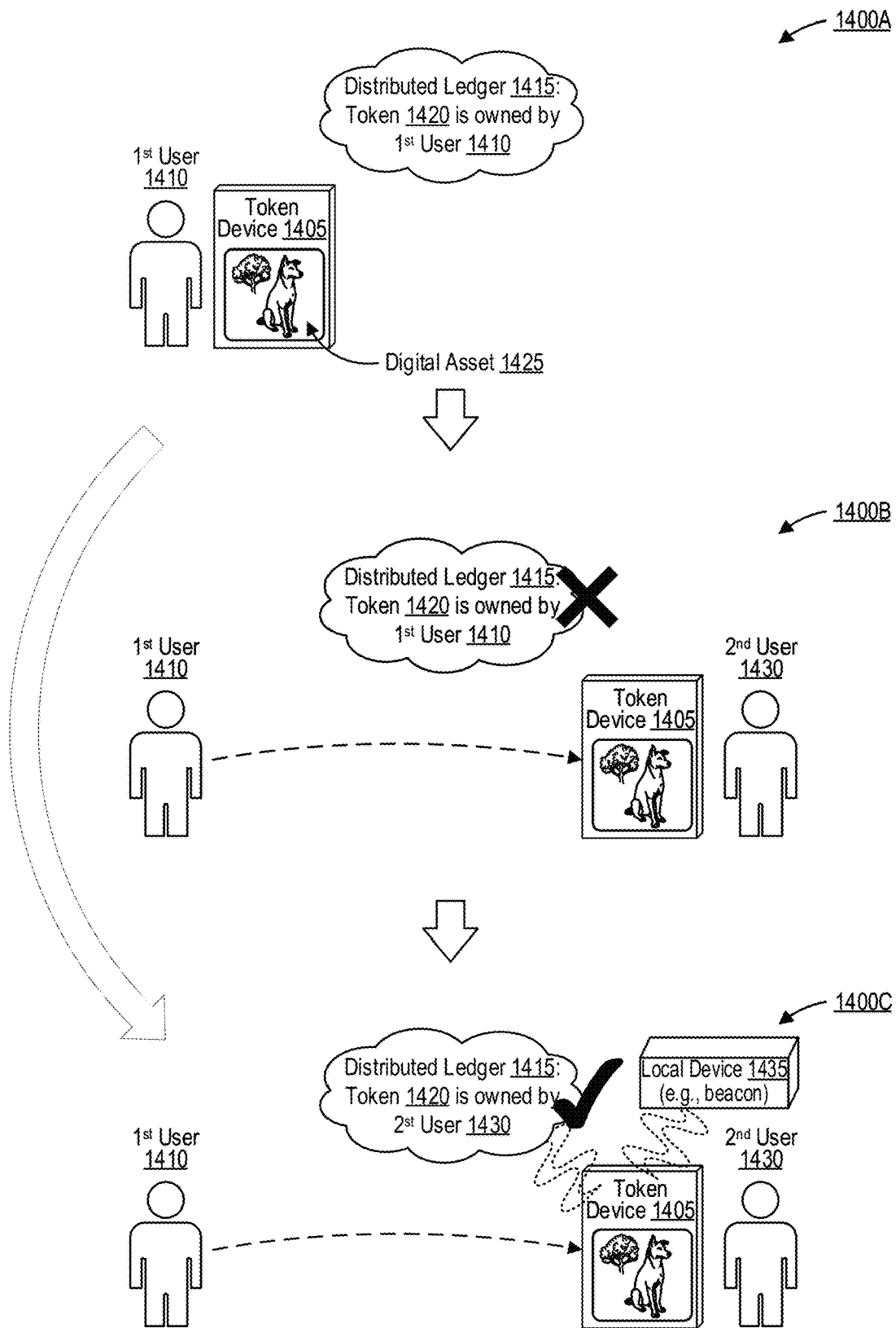
FIG. 14 is a conceptual diagram illustrating a token device that is associated with a token in a distributed ledger, and transfer of the token device from a first user to a second user, in accordance with some examples.

FIG. 14 is a conceptual diagram illustrating a token device 1405 that is associated with a token 1420 in a distributed ledger 1415, and transfer of the token device 1405 from a first user 1410 to a second user 1430. The token device 1405 may be an example of a local device 270, a network device 280, a media device 205, one of the additional devices 297, the data store(s) 298, the anchor element(s) 299, the anchor element 1350, a computing system 1900, or a combination thereof. The token device 1405 is associated with the token 1420, which may be associated with a digital asset 1425. The digital asset 1425 is illustrated in FIG. 14 as including an image of a dog and a tree. The token device 1405 may include output device(s), such as display(s) and/or speaker(s). The token device 1405 may output the digital asset 1425 associated with the token 1420, for example by displaying visual content (e.g., image(s), video(s)) of the digital asset 1425 using the display(s) of the token device, and/or by playing audio content (e.g., sound(s), music) of the digital asset 1425 using speaker(s) of the token device. In FIG. 14, the token device 1405 is illustrated as including a display that displays the image of the dog and the tree that is part of the digital asset 1425. In some examples, the digital asset 1425 may include a video or an animated image, and the token device 1405 can play the video or animated image, for example on loop. In some examples, the token device 1405 can be a physical representation of the token 1420 that the token device 1405 is associated with.

As indicated at the top scenario 1400A of FIG. 14, a distributed ledger 1415 associated with the token 1420 (e.g., blockchain ledger 500 and/or DAG ledger 700) indicates that the token 1420 is owned by the first user 1410. In the middle scenario 1400B and the bottom scenario 1400C of FIG. 14, the first user 1410 is illustrated transferring the token device 1405 to a second user 1430. In the middle scenario 1400B, the distributed ledger 1415 is not updated, leading to a split ownership scenario in which the first user 1410 still owns the token 1420 according to the distributed ledger 1415, but the second user 1430 owns the token device 1405. Since the token device 1405 may be considered a physical representation of the token 1420, this scenario may cause confusion. For instance, the first user 1410 can offer to sell the token 1420 to the second user 1430, but instead only sell the token device 1405 to the second user 1430. If the second user 1430 is not knowledgeable about the token 1420 and the token device 1405, this may result in a negative outcome in which the second user 1430 believes they have purchased the token 1420 and the token device 1405, but has in fact only purchased the token device 1405 without the token 1420.

In the bottom scenario 1400C, a transfer system (e.g., the token device 1405, the media device 205, the network device(s) 280, the local device(s) 270, the additional device(s) 297, the computing system 1900) detects that the token device 1405 has been relocated to an area associated with the second user 1430 (e.g., from another area associated with the first user 1410). The transfer system may detect that the token device 1405 is in the area associated with the second user 1430 based on the token device 1405 coming into communicative range with one or more device(s) associated with the second user 1430, such as a local device 1435, a wireless local area network (WLAN), other token device(s) that the second user 1430 owns and that are associated with token(s) that the second user 1430 owns, or a combination thereof. The transfer system may detect that the token device 1405 is in the area associated with the second user 1430 based on positioning sensor(s) of the token device 1405 indicating that the token device 1405 is in a geographic area that has been previously specified (e.g., in the distributed ledger 1415 and/or in data store(s) 298) as associated with the second user 1430. The transfer system may detect that the token device 1405 is in the area associated with the second user 1430 based on positioning sensor(s) of the token device 1405 indicating that the token device 1405 is within a threshold range of a location of the second user 1430 (e.g., a location of a media device 205 of the second user 1430).

In some examples, the distributed ledger 1415 may store a smart contract associated with the token 1420. The smart contract may be previously agreed-to by the first user 1410. The smart contract may indicate that the token 1420 is to be transferred to another user (e.g., the second user 1430) if the token device 1405 is relocated to an area associated with another user (e.g., the second user 1430). In some examples, upon detection that the token device 1405 is relocated to an area associated with the second user 1430, the transfer system may query a media device 205 associated with the first user 1410 to agree to transfer the token 1420 to the second user 1430, and upon receiving confirmation of agreement from the media device 205 associated with the first user 1410, can proceed with initiating the transfer of the token 1420 from the first user 1410 to the second user 1430 (e.g., by causing the transfer of the token 1420 from the first user 1410 to the second user 1430 to be recorded in the distributed ledger 1415, for instance by generating and/or appending a new block with a payload that records the transfer). In some examples, upon detection that the token device 1405 is relocated to an area associated with the second user 1430, the transfer system may query a media device 205 associated with the second user 1430 to agree to transfer the token 1420 to the second user 1430, and upon receiving confirmation of agreement from the media device 205 associated with the second user 1430, and can proceed with initiating the transfer of the token 1420 from the first user 1410 to the second user 1430 (e.g., by causing the transfer of the token 1420 from the first user 1410 to the second user 1430 to be recorded in the distributed ledger 1415, for instance by generating and/or appending a new block with a payload that records the transfer).

Figure 15A:
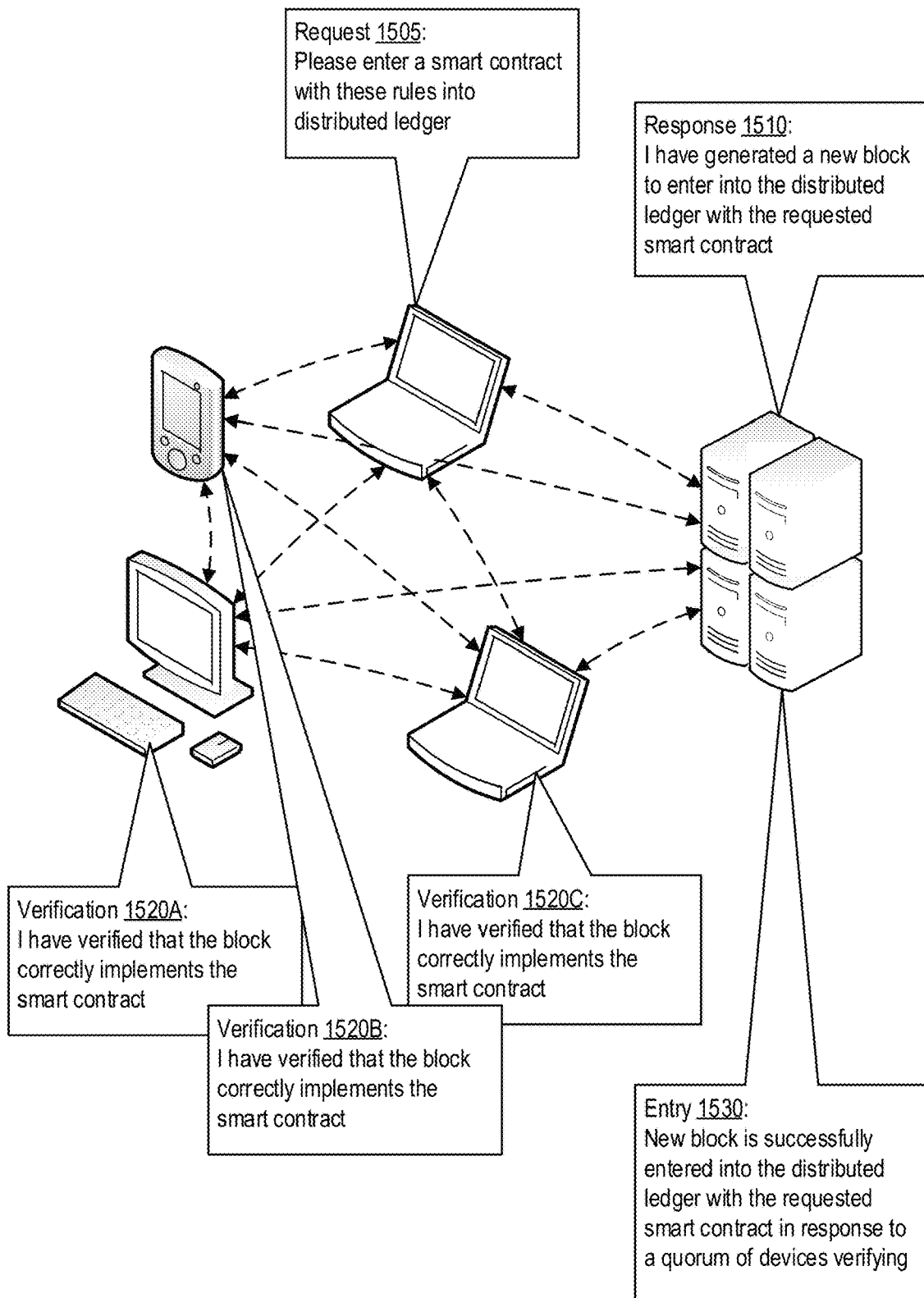
FIG. 15A is a conceptual diagram illustrating generation of a smart contract and entry of the smart contract into a distributed ledger, in accordance with some examples.

FIG. 15A is a conceptual diagram 1500 illustrating generation of a smart contract and entry of the smart contract into a distributed ledger, according to an aspect of the present disclosure. The distributed computing architecture includes multiple computing systems (referred to here as computers), which may be computing systems 1900, that store and modify the distributed ledger. A first computer submits a request 1505 requesting entry of a smart contract with particular rules into distributed ledger. A second computer submits a response 1510 indicating that the second computer has generated a new block to enter into the distributed ledger with the requested smart contract. Third, fourth, and fifth computers submit verification 1520A-1520C indicating that they have verified that the block correctly implements the smart contract, that the code of the smart contract can be executed (e.g., does not include syntax errors or other errors), that all parties involved in the smart contract have submitted agreement to the terms of the smart contract, that on-chain pointers correctly point to valid off-chain smart contract code, and/or that sufficient funds are allocated in order to pay for execution fee charges for the intended payload element. The second computer submits and entry confirmation indicating that the new block is successfully entered into the distributed ledger with the requested smart contract in response to a quorum of devices verifying.

A similar process to the process illustrated in FIG. 15A may be used to enter tokens, with the corresponding verification 1520A-1520C verifying, for instance, that the token refers to a valid type of digital asset, that on-chain pointers correctly point to valid off-chain media or metadata, and/or that sufficient funds are allocated in order to pay for execution fee charges for the intended payload element. A similar process to the process illustrated in FIG. 15A may be used to enter transaction, with the corresponding verification 1520A-1520C verifying, for instance, whether the transferor has a sufficient quantity of an asset (e.g., whether the transferor owns the token to be transferred) for the transaction to take place and/or that sufficient funds are allocated in order to pay for execution fee charges for the intended payload element.

Figure 15B:
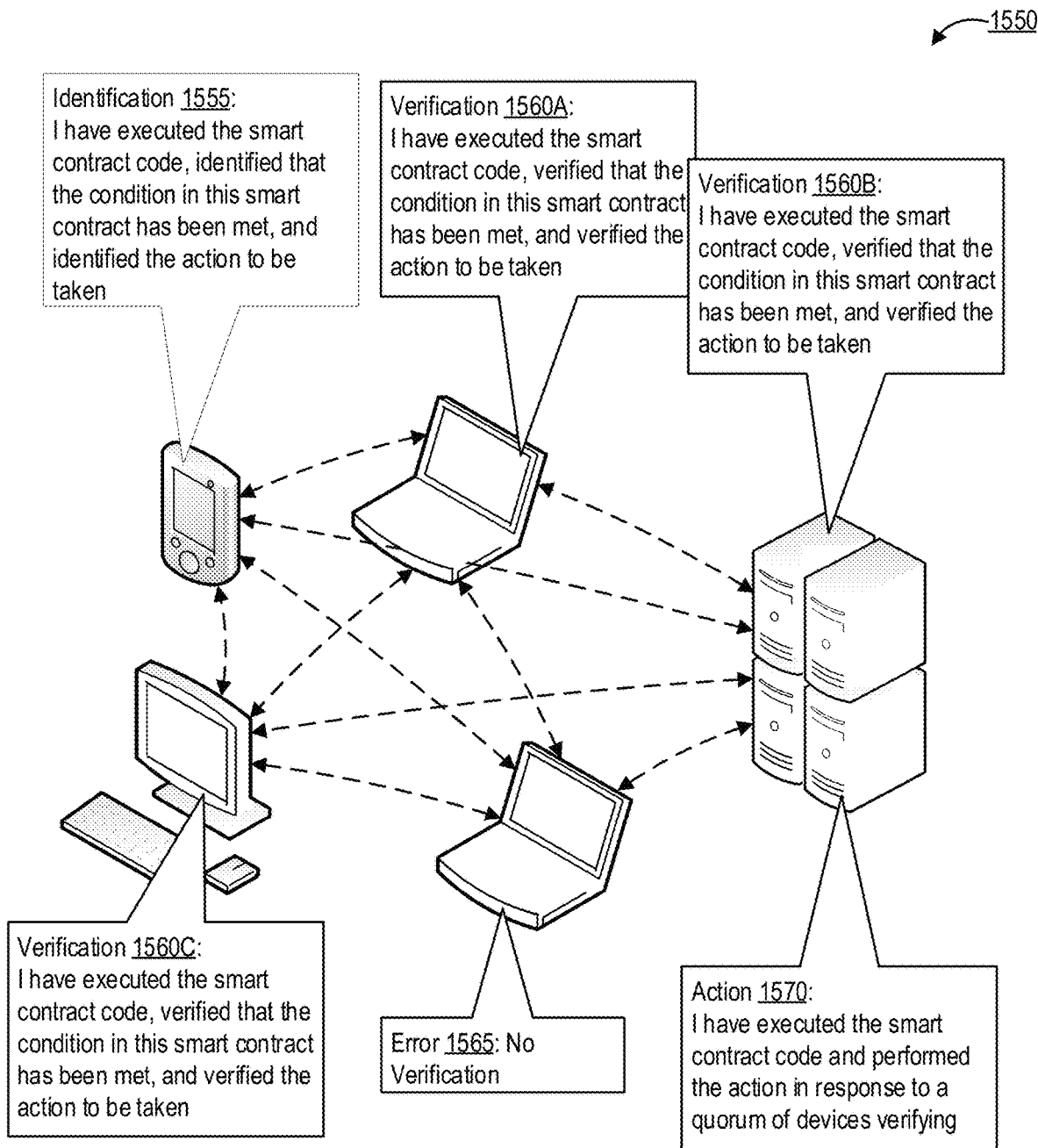
FIG. 15B is a conceptual diagram illustrating execution of a smart contract, according to an aspect of the present disclosure, in accordance with some examples.

FIG. 15B is a conceptual diagram 1550 illustrating execution of a smart contract, according to an aspect of the present disclosure. A first computer submits an identification 1555 that the first computer has executed the smart contract code, identified that the condition in this smart contract has been met, and identified the action to be taken. Second, third, and fourth computers submit verifications 1510A-1510C that identify that the second, third, and fourth computers have executed the smart contract code, verified that the condition in this smart contract has been met, and verified the action to be taken. A fifth computer indicates an error 1515 with no verification. The third computer indicates an action 1520, indicating that the third computer has executed the smart contract code and performed the action in response to a quorum of devices verifying (e.g. the verifications 1510A-1510C).

Figure 16A:
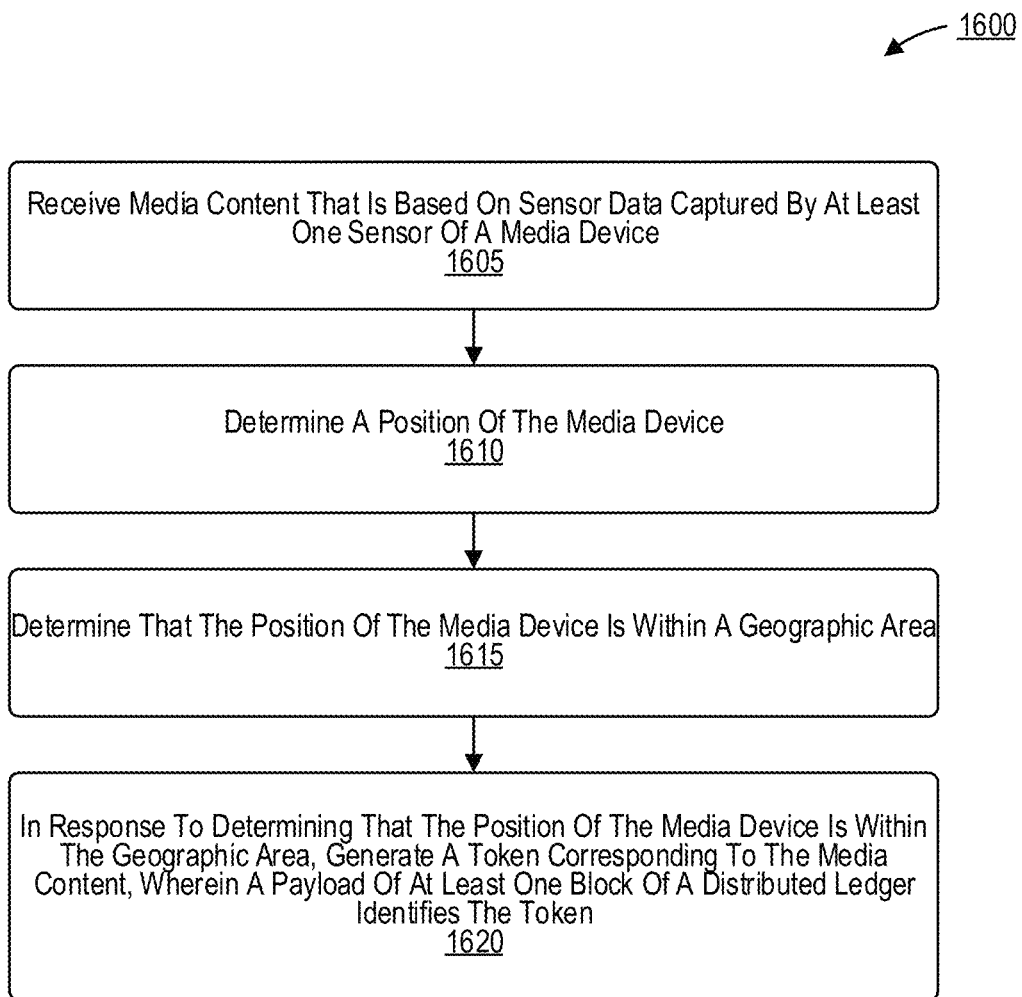
FIG. 16A is a flow diagram illustrating operations for situational token generation, in accordance with some examples.

FIG. 16A is a flow diagram illustrating an example of a process 1600 for situational token generation, in accordance with some examples. The process 1600 may be performed by a digital asset management system. In some examples, the digital asset management system can include the digital asset tracking system 200 of FIG. 2, or a portion thereof. In some examples, the imaging system can include, for example, the image capture and processing system 100, the image capture device 105A, the image processing device 105B, the image processor 150, the ISP 154, the host processor 152, the digital asset tracking system 200, the media device 205, the network device(s) 280, the local device(s) 270, the additional device(s) 297, the data store(s) 298, the anchor element(s) 299, the HMD 310, the mobile handset 410, the media device 810, the local device 830, the media device 910, the local device 930, the media device 1010, the local device 1030, the media device 1110, the local device 1130, the ownership device 1210, the local device 1230, the media device 1310, the distributed ledger 1365, the data store(s) 1370, the token device 1405, one or more of the computing systems of FIG. 15A, one or more of the computing systems of FIG. 15B, the digital asset tracking system that performs the process 1650, the digital asset management system that performs the process 1700, the digital asset management system that performs the process 1800, the computing system 1900, the processor 1910, or a combination thereof.

At operation 1605, the digital asset management system is configured to, and can, receive media content that is based on sensor data captured by at least one sensor of a media device. Examples of the media device can include the image capture and processing system 100, the image capture device 105A, the image processing device 105B, media device 205, the HMD 310, the mobile handset 410, the media device 810, the media device 910, the media device 1010, the media device 1110, the ownership device 1210, the media device 1310, the distributed ledger 1365, the data store(s) 1370, the token device 1405, the computing systems of FIGS. 15A-15B, the computing system 1900, or a combination thereof. Examples of the at least one sensor includes the image sensor 130, the one or more sensors 210, the one or more pose sensors 215, the one or more media sensors 220, the first camera 330A, the second camera 330B, the first camera 430A, the second camera 430B, the third camera 430C, the fourth camera 430D, the image sensors 815, the image sensors 915, the image sensors 1015, the image sensors 1315, the positioning sensors 820, the positioning sensors 920, the positioning sensors 1020, the positioning sensors 1120, the positioning sensors 1220, the positioning sensors 1320, or a combination thereof. Examples of the sensor data can include the sensor data 230, the pose data 225, images captured by the image sensor 130, images processed by the ISP 154, images processed by the host processor 152, images processed by the image processor 152, the stored communications of block 278, or a combination thereof. Examples of the media data can include the media data 250, the sensor data 230, the pose data 225, images captured by the image sensor 130, images processed by the ISP 154, images processed by the host processor 152, images processed by the image processor 152, the stored communications of block 278, the digital asset 605, the digital asset 840, the digital asset 940, the digital asset 1040, the digital asset 1140, the digital asset 1240, the digital asset 1340, the virtual object 1345, the digital asset 1425, or a combination thereof.

In some examples, the digital asset tracking system include one or more sensor connectors coupled to the one or more sensors. The media data may be received using the one or more sensor connectors. The sensor data captured by the one or more sensors may be received using the one or more sensor connectors. The one or more sensor connectors may include one or more of a port, a jack, a wire, an input/output (IO) pin, a conductive trace on a printed circuit board (PCB), any other type of connector discussed herein, or some combination thereof. In some examples, the digital asset tracking system include one or more sensors.

In some examples, the media content includes at least a portion of the sensor data. For instance, the media device 205 can obtain the media data 250 by receiving the sensor data 230 and/or the pose data 225. The digital asset 840 is an example of media data that can be sensor data captured by the image sensor(s) 815 of the media device 810. The digital asset 940 is an example of media data that can be sensor data captured by the image sensor(s) 915 of the media device 910.

In some examples, the media content includes a modified variant of at least a portion of the sensor data. Modifying the sensor data can include processing the sensor data, for example as discussed with respect to the image processing device 105B and/or the media processor 235. In some aspects, the media device generates the media data at least in part by modifying the sensor data to add virtual content to the sensor data. The virtual content may be generated by a virtual content generator 240. The virtual content may be added to the sensor data (e.g., merged with the sensor data) using an image compositor 245. Examples of the virtual content include the virtual object 1045 (the virtual dog) that appears in the digital asset 1040 (an example of the media data) despite not appearing in the sensor data captured by the image sensors 1015, the virtual object 1345 (the virtual dog) that appears in the digital asset 1340 (an example of the media data) despite not appearing in the sensor data captured by the image sensors 1315, or a combination thereof. The digital asset 1140 may also be an example of the media content including modified variant of at least a portion of the sensor data, with the map of the digital asset 1140 being a processed and/or modified form of position data (e.g., collected using the positioning sensors 1120 and/or based on communication(s) between the media device 1110 and the local device 1130).

At operation 1610, the digital asset management system is configured to, and can, determine a position of the media device. In some examples, the digital asset management system can determine the position of the media device based on the sensor data. Examples of the position of the media device include the pose data 225, the sensor data 230, positioning information determined (e.g., by the media device 205 and/or locafexl device 270 and/or the digital asset tracking system) based on the one or more communications 272, stored communications of block 277, stored communications of block 278, positioning information determined using image sensors 815 and/or positioning sensors 820, positioning information determined (e.g., by the media device 810 and/or local device 830 and/or the digital asset tracking system) based on the one or more communications 835, positioning information determined using image sensors 915 and/or positioning sensors 920, positioning information determined (e.g., by the media device 910 and/or local device 930 and/or the digital asset tracking system) based on the one or more communications 935, positioning information determined using image sensors 1015 and/or positioning sensors 1020, positioning information determined (e.g., by the media device 1010 and/or local device 1030 and/or the digital asset tracking system) based on the one or more communications 1035, positioning information determined using positioning sensors 1120, positioning information determined (e.g., by the media device 1110 and/or local device 1130 and/or the digital asset tracking system) based on the one or more communications 1135, positioning information determined using positioning sensors 1220, positioning information determined (e.g., by the ownership device 1210 and/or local device 1230 and/or the digital asset tracking system) based on the one or more communications 1235, positioning information determined using image sensors 1315 and/or positioning sensors 1320, the position of the token device 1405, or a combination thereof.

In some examples, the sensor data includes positioning data that is based on receipt of at least one wireless signal by the at least one sensor. Determining the position of the media device can be based at least in part on the positioning data. In some examples, the at least one wireless signal includes a global navigation satellite system (GNSS) signal (e.g., a GPS signal) from a GNSS satellite (e.g., a GPS satellite), for instance received using a positioning receiver. In some examples, the at least one wireless signal includes a short-range wireless signal (e.g., Bluetooth®, Wi-Fi, cellular, WLAN) from a local device that is within a transmission range of the media device at least during receipt of the at least one wireless signal by the at least one sensor. Examples of the local device can include the image capture and processing system 100, the image capture device 105A, the image processing device 105B, the local device(s) 270, the local device 830, the local device 930, the local device 1030, the local device 1130, the local device 1230, the local device 1435, the computing systems of FIGS. 15A-15B, the computing system 1900, or a combination thereof. Examples of the positioning receiver can include the one or more short-range wireless transceivers 275, the positioning sensors 820, the positioning sensors 920, the positioning sensors 1020, the positioning sensors 1120, the positioning sensors 1220, the positioning sensors 1320, or a combination thereof. Examples of the at least one wireless signal can include signals carrying communications 272 between the media device 205 and the local device 270, signals carrying communications 835 between the mobile device 810 and the local device 830, signals carrying communications 935 between the mobile device 910 and the local device 930, signals carrying communications 1035 between the mobile device 1010 and the local device 1030, signals carrying communications 1135 between the mobile device 1110 and the local device 1130, signals carrying communications 1235 between the mobile device 1210 and the local device 1230, or a combination thereof.

At operation 1615, the digital asset management system is configured to, and can, determine that the position of the media device is within a geographic area. In some examples, the digital asset management system can determine that the position of the media device is within the geographic area based on the sensor data. Examples of the geographic area include a museum (e.g., as in FIGS. 8A-8B and FIGS. 12A-12B), an office (e.g., as in FIGS. 9A-9B), a park (e.g., as in FIGS. 10A-10B and FIG. 13), a trail (e.g., as in FIGS. 11A-11B), an area associated with the first user 1410, an area associated with the second user 1430, an indoor area, an outdoor area, a sports venue, a concert venue, a movie theater, a shopping mall, a transmission range of one or more short-range wireless transceivers 275 of one or more local devices 270, a receipt range of one or more short-range wireless transceivers 275 of one or more local devices 270 (for receiving signals transmitted using the one or more short-range wireless transceivers 260 of the media device), or a combination thereof. Examples of determining that the position of the media device is within the geographic area includes block 290 of the digital asset tracking system 200 of FIG. 2, which may be performed by the network device 280, the media device 205, the local device 270, or a combination thereof.

In some examples, the sensor data includes at least one image captured by at least one image sensor of the at least one sensor of the media device. The media content can be based on the at least one image. Examples of image sensors can include the image sensor 130, the media sensors 220, the one or more media sensors 220, an image sensor of the first camera 330A, an image sensor of the second camera 330B, an image sensor of the first camera 430A, an image sensor of the second camera 430B, an image sensor of the third camera 430C, an image sensor of the fourth camera 430D, the image sensors 815, the image sensors 915, the image sensors 1015, or a combination thereof. Examples of media data that is, includes, or is based on one or more images includes the digital asset 840, the digital asset 940, the digital asset 1040, the digital asset 1240, the digital asset 1340, the digital asset 1425, or a combination thereof.

In some examples, determining the position of the media device includes detecting at least a portion of an environment in the at least one image, and determining the position of the media device based at least in part on detection of at least the portion of the environment in the at least one image. In some examples, determining that the position of the media device is within the geographic area includes detecting at least a portion of an environment in the at least one image, and determining that at least the portion of the environment is located within the geographic area. For example, in the context of FIG. 8A, the digital asset tracking system can verify that the digital asset 840 depicts an object (the Mona Lisa) that is in the geographic area (the Louvre Museum), and can thus verify that the media device 810 is in the geographic area (the Louvre Museum). In the context of FIG. 9A, the digital asset tracking system can verify that the digital asset 940 depicts an object (Bob 945) that is in the geographic area (the park), and can thus verify that the media device 910 is in the geographic area (the park). In the context of FIG. 10A, the digital asset tracking system can verify that the digital asset 1040 depicts objects (the virtual object 1045 and the real objects 1047) that are in the geographic area (the park), and can thus verify that the media device 1010 is in the geographic area (the park). In the context of FIG. 11A, the digital asset tracking system can verify that the digital asset 1140 depicts objects (the hiking trail) that are in the geographic area (Yosemite), and can thus verify that the media device 1110 is in the geographic area (Yosemite). In the context of FIG. 13, the digital asset tracking system can verify that the digital asset 1340 depicts objects (the virtual object 1345 and the real objects 1347) that are in the geographic area (the park), and can thus verify that the media device 1310 is in the geographic area (the park).

In some examples, the digital asset management system is configured to, and can, detect at least a portion of an individual in the at least one image, determine an identity of the individual, and set a parameter of the token (e.g., token ownership 620, token smart contract(s) 645) to indicate that the token is associated with the identity. In the context of FIG. 9A, the digital asset tracking system can identify that image(s) captured by the image sensors 915 (and corresponding to the digital asset 940) include a depiction of an individual having a recognized identity (Bob 945). In some aspects, the digital asset tracking system is configured to, and can, set an ownership of the token to an account associated with the individual having the recognized identity. In the context of FIGS. 9A-9B, the digital asset tracking system can set the ownership of the token 960 to Bob 945.

In some examples, the media content includes a map of the geographic area, as in the map in the digital asset 1140.

In some examples, determining that the position of the media device is within the geographic area is based on at least one communication (e.g., communications 272, communications 835, communications 935, communications 1035, communications 1135, communications 1235, etc.) between the media device and a local device associated with the geographic area. Examples of the local device can include the image capture and processing system 100, the image capture device 105A, the image processing device 105B, the local device(s) 270, the local device 830, the local device 930, the local device 1030, the local device 1130, the local device 1230, the local device 1435, the computing systems of FIGS. 15A-15B, the computing system 1900, or a combination thereof.

At operation 1620, in response to determining that the position of the media device is within the geographic area at operation 1615, the digital asset management system is configured to, and can, generate a token corresponding to the media content. A payload of at least one block of a distributed ledger identifies the token. Examples of the token can include the token 600, the token 860, the token 960, the token 1060, the token 1160, the token 1260, the token 1360, the token 1420, or a combination thereof. Examples of the distributed ledger include the distributed ledger 295, the blockchain ledger 500, the DAG ledger 700, the distributed ledger 1365, the distributed ledger 1415, a distributed ledger corresponding to the smart contract of FIGS. 15A-15B, or a combination thereof. Examples of a block include block A 505, block B 535, block C 565, block 710, block 720, block 730, block 740, block 750, block 760, or a combination thereof. Examples of a payload include the Block A payload 530, the Block B payload 560, and the Block C payload 590. The token can be a non-fungible token (NFT).

In some examples, the digital asset management system is configured to, and can, generate the at least one block in response to determining that the position of the media device is within the geographic area, and cause the at least one block to be appended to the distributed ledger. In some examples, the at least one block includes a hash of at least a portion of a prior block of the distributed ledger (e.g., hash 515/545/575, Merkle root 520/550/580). In some examples, the digital asset management system is configured to, and can, generate the distributed ledger in response to determining that the position of the media device is within the geographic area.

In some examples, the digital asset management system is configured to, and can, transmit a request to generate the at least one block to a computing device in response to determining that the position of the media device is within the geographic area, receive the at least one block, and append the at least one block to the distributed ledger.

In some examples, the digital asset management system is configured to, and can, set a parameter of the token (e.g., token ownership 620, token smart contract(s) 645) to indicate that the token is associated with a user. The media device can be associated with the user. For instance, in the context of FIGS. 8A-8B, the digital asset tracking system can set the parameter of the token 860 to indicate the 805. In the context of FIGS. 9A-9B, the digital asset tracking system can set the parameter of the token 960 to indicate that the token is associated with the user 905. In the context of FIGS. 10A-10B, the digital asset tracking system can set the parameter of the token 1060 to indicate that the token is associated with the user 1005. In the context of FIGS. 11A-11B, the digital asset tracking system can set the parameter of the token 1160 to indicate that the token is associated with the user 1105. In the context of FIGS. 12A-12B, the digital asset tracking system can set the parameter of the token 1260 to indicate that the token is associated with the user 1205. In the context of FIG. 13, the digital asset tracking system can set the parameter of the token 1360 to indicate that the token is associated with the user 1305. In the context of FIG. 14, the digital asset tracking system can set the parameter of the token 1420 to indicate that the token is associated with the first user 1410 and/or to the second user 1430. In some examples, parameter of the token can be stored on-chain, for instance in token ownership 620, on-chain immutable metadata 625, and/or on-chain mutable metadata 630. In some examples, parameter of the token can be stored off-chain, for instance in off-chain metadata 640.

In some examples, the digital asset management system is configured to, and can, determine that the geographic area includes at least a threshold amount of people. Generating the token corresponding to the media content can be performed in response to determining that the geographic area includes at least the threshold amount of people.

In some examples, the digital asset management system that performs the process 1600 can include the media device, the local device, or a combination thereof. In some examples, the digital asset management system that performs the process 1600 is located in the geographic area.

In some examples, the digital asset management system that performs the process 1600 can include at least one of a head-mounted display (HMD) (e.g., HMD 310), a mobile handset (e.g., mobile handset 410), a wireless communication device, or a combination thereof.

In some examples, the digital asset management system includes means for receiving media content that is based on sensor data captured by at least one sensor of a media device; means for determining a position of the media device; means for determining that the position of the media device is within a geographic area; and means for generating a token corresponding to the media content in response to determining that the position of the media device is within the geographic area, wherein a payload of at least one block of a distributed ledger identifies the token.

In some examples, the means for receiving the media content include the image capture and processing system 100, the image sensor 130, the digital asset tracking system 200, the one or more sensors 210, the one or more pose sensors 215, the one or more media sensors 220, the first camera 330A, the second camera 330B, the first camera 430A, the second camera 430B, the third camera 430C, the fourth camera 430D, the image sensors 815, the image sensors 915, the image sensors 1015, the image sensors 1315, the positioning sensors 820, the positioning sensors 920, the positioning sensors 1020, the positioning sensors 1120, the positioning sensors 1220, the positioning sensors 1320, the media device 205, the network device(s) 280, the local device(s) 270, the additional device(s) 297, the data store(s) 298, the anchor element(s) 299, the HMD 310, the mobile handset 410, the media device 810, the local device 830, the media device 910, the local device 930, the media device 1010, the local device 1030, the media device 1110, the local device 1130, the ownership device 1210, the local device 1230, the media device 1310, the distributed ledger 1365, the data store(s) 1370, the token device 1405, one or more of the computing systems of FIG. 15A, one or more of the computing systems of FIG. 15B, the computing system 1900, the input device 1945, or a combination thereof.

In some examples, the means for determining the position of the media device, and/or determining that the position of the media device is within the geographic area, include the image capture and processing system 100, the image sensor 130, the digital asset tracking system 200, the one or more sensors 210, the one or more pose sensors 215, the one or more media sensors 220, the first camera 330A, the second camera 330B, the first camera 430A, the second camera 430B, the third camera 430C, the fourth camera 430D, the image sensors 815, the image sensors 915, the image sensors 1015, the image sensors 1315, the positioning sensors 820, the positioning sensors 920, the positioning sensors 1020, the positioning sensors 1120, the positioning sensors 1220, the positioning sensors 1320, the media device 205, the network device(s) 280, the local device(s) 270, the additional device(s) 297, the data store(s) 298, the anchor element(s) 299, the HMD 310, the mobile handset 410, the media device 810, the local device 830, the media device 910, the local device 930, the media device 1010, the local device 1030, the media device 1110, the local device 1130, the ownership device 1210, the local device 1230, the media device 1310, the distributed ledger 1365, the data store(s) 1370, the token device 1405, one or more of the computing systems of FIG. 15A, one or more of the computing systems of FIG. 15B, the computing system 1900, the communication interface 1940, the input device 1945, or a combination thereof.

In some examples, the means for generating the token include the digital asset tracking system 200, the media device 205, the network device(s) 280, the local device(s) 270, the distributed ledger 295, the additional device(s) 297, the data store(s) 298, the anchor element(s) 299, the HMD 310, the mobile handset 410, the blockchain ledger 500, the token 600, the data structures 650, the DAG ledger 700, the media device 810, the local device 830, the media device 910, the local device 930, the media device 1010, the local device 1030, the media device 1110, the local device 1130, the ownership device 1210, the local device 1230, the media device 1310, the anchor element 1350, the distributed ledger 1365, the data store(s) 1370, the token device 1405, one or more of the computing systems of FIG. 15A, one or more of the computing systems of FIG. 15B, the computing system 1900, the output device 1935, the communication interface 1940, or a combination thereof.

Figure 16B:
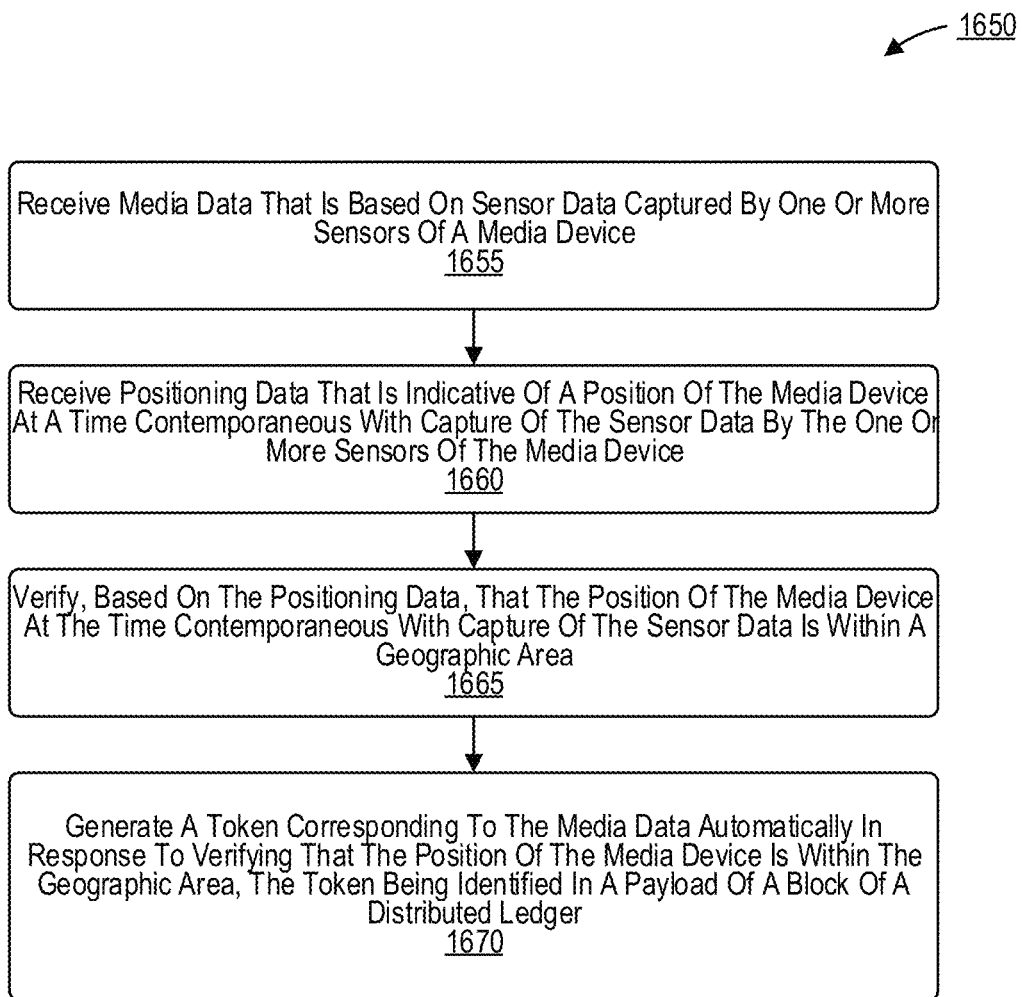
FIG. 16B is a flow diagram illustrating operations for tracking a digital asset associated with a location, in accordance with some examples.

FIG. 16B is a flow diagram illustrating an example of a process 1650 for tracking a digital asset associated with a location, in accordance with some examples. The process 1650 may be performed by a digital asset tracking system. In some examples, the digital asset tracking system can include the digital asset tracking system 200 of FIG. 2, or a portion thereof. In some examples, the imaging system can include, for example, the image capture and processing system 100, the image capture device 105A, the image processing device 105B, the image processor 150, the ISP 154, the host processor 152, the digital asset tracking system 200, the media device 205, the network device(s) 280, the local device(s) 270, the additional device(s) 297, the HMD 310, the mobile handset 410, the media device 810, the local device 830, the media device 910, the local device 930, the media device 1010, the local device 1030, the media device 1110, the local device 1130, the ownership device 1210, the local device 1230, one or more of the computing systems of FIG. 15A, one or more of the computing systems of FIG. 15B, the computing system 1900, the processor 1910, or a combination thereof.

At operation 1655, the digital asset tracking system is configured to, and can, receive from a media device, media data that is based on sensor data that is captured by one or more sensors of the media device. Examples of the media device can include the image capture and processing system 100, the image capture device 105A, the image processing device 105B, media device 205, the HMD 310, the mobile handset 410, the media device 810, the media device 910, the media device 1010, the media device 1110, the ownership device 1210, the media device 1310, the distributed ledger 1365, the data store(s) 1370, the token device 1405, the computing systems of FIGS. 15A-15B, the computing system 1900, or a combination thereof. Examples of the one or more sensors include the image sensor 130, the one or more sensors 210, the one or more pose sensors 215, the one or more media sensors 220, the first camera 330A, the second camera 330B, the first camera 430A, the second camera 430B, the third camera 430C, the fourth camera 430D, the image sensors 815, the image sensors 915, the image sensors 1015, the image sensors 1315, the positioning sensors 820, the positioning sensors 920, the positioning sensors 1020, the positioning sensors 1120, the positioning sensors 1220, the positioning sensors 1320, or a combination thereof. Examples of the sensor data can include the sensor data 230, the pose data 225, images captured by the image sensor 130, images processed by the ISP 154, images processed by the host processor 152, images processed by the image processor 152, the stored communications of block 278, or a combination thereof. Examples of the media data can include the media data 250, the sensor data 230, the pose data 225, images captured by the image sensor 130, images processed by the ISP 154, images processed by the host processor 152, images processed by the image processor 152, the stored communications of block 278, the digital asset 605, the digital asset 840, the digital asset 940, the digital asset 1040, the digital asset 1140, the digital asset 1240, the digital asset 1340, the virtual object 1345, the digital asset 1425, or a combination thereof.

In some examples, the digital asset tracking system include one or more sensor connectors coupled to the one or more sensors. The media data may be received using the one or more sensor connectors. The sensor data captured by the one or more sensors may be received using the one or more sensor connectors. The one or more sensor connectors may include one or more of a port, a jack, a wire, an input/output (IO) pin, a conductive trace on a printed circuit board (PCB), any other type of connector discussed herein, or some combination thereof. In some examples, the digital asset tracking system include one or more sensors.

The media data can be the sensor data. The media data can include the sensor data. For instance, the media device 205 can obtain the media data 250 by receiving the sensor data 230 and/or the pose data 225. The digital asset 840 is an example of media data that can be sensor data captured by the image sensor(s) 815 of the media device 810. The digital asset 940 is an example of media data that can be sensor data captured by the image sensor(s) 915 of the media device 910.

The media device generates the media data at least in part by modifying the sensor data. Modifying the sensor data can include processing the sensor data, for example as discussed with respect to the image processing device 105B and/or the media processor 235. In some aspects, the media device generates the media data at least in part by modifying the sensor data to add virtual content to the sensor data. The virtual content may be generated by a virtual content generator 240. The virtual content may be added to the sensor data (e.g., merged with the sensor data) using an image compositor 245. Examples of the virtual content include the virtual object 1045 (the virtual dog), which appears in the digital asset 1040 (an example of the media data) despite not appearing in the sensor data captured by the image sensors 1015.

The sensor data can include one or more images captured by one or more image sensors of the one or more sensors of the media device. The media data can be based on at least one of the one or more images. Examples of image sensors can include the image sensor 130, the media sensors 220, the one or more media sensors 220, an image sensor of the first camera 330A, an image sensor of the second camera 330B, an image sensor of the first camera 430A, an image sensor of the second camera 430B, an image sensor of the third camera 430C, an image sensor of the fourth camera 430D, the image sensors 815, the image sensors 915, the image sensors 1015, or a combination thereof. Examples of media data that is, includes, or is based on one or more images includes the digital asset 840, the digital asset 940, the digital asset 1040, the digital asset 1240, the digital asset 1340, the digital asset 1425, or a combination thereof.

At operation 1660, the digital asset tracking system is configured to, and can, receive positioning data that is indicative of a position of the media device at a time contemporaneous with capture of the sensor data by the one or more sensors of the media device. Examples of the positioning data can include the pose data 225, the sensor data 230, positioning information determined (e.g., by the media device 205 and/or local device 270 and/or the digital asset tracking system) based on the one or more communications 272, stored communications of block 277, stored communications of block 278, positioning information determined using image sensors 815 and/or positioning sensors 820, positioning information determined (e.g., by the media device 810 and/or local device 830 and/or the digital asset tracking system) based on the one or more communications 835, positioning information determined using image sensors 915 and/or positioning sensors 920, positioning information determined (e.g., by the media device 910 and/or local device 930 and/or the digital asset tracking system) based on the one or more communications 935, positioning information determined using image sensors 1015 and/or positioning sensors 1020, positioning information determined (e.g., by the media device 1010 and/or local device 1030 and/or the digital asset tracking system) based on the one or more communications 1035, positioning information determined using positioning sensors 1120, positioning information determined (e.g., by the media device 1110 and/or local device 1130 and/or the digital asset tracking system) based on the one or more communications 1135, positioning information determined using positioning sensors 1220, positioning information determined (e.g., by the ownership device 1210 and/or local device 1230 and/or the digital asset tracking system) based on the one or more communications 1235, positioning information determined using image sensors 1315 and/or positioning sensors 1320, the position of the token device 1405, or a combination thereof.

The sensor data can include the positioning data, the positioning data determined based on receipt of one or more positioning signals by a positioning receiver of the one or more sensors of the media device. For example, at least some of the positioning data can include pose data 225 from one or more pose sensors 215 and/or positioning information that the media device 205 determines based on the communications 272. The media data can include a map generated by the media device based on the positioning data. The media device can generates the media data at least in part by generating a map based on the positioning data and/or the sensor data. An example of such a map includes the map in the digital asset 1140, which the media device 1110 generates based on positioning sensor data from the positioning sensors 1120.

The sensor data can include secondary positioning data determined based on receipt of one or more positioning signals by a positioning receiver of the one or more sensors of the media device. Examples of the one or more positioning signals can include GNSS signals, such as GPS signals. Examples of the positioning receiver can include a GNSS receiver, such as a GPS receiver. Examples of the one or more positioning signals can include signals carrying communications 272 between the media device 205 and the local device 270, signals carrying communications 835 between the mobile device 810 and the local device 830, signals carrying communications 935 between the mobile device 910 and the local device 930, signals carrying communications 1035 between the mobile device 1010 and the local device 1030, signals carrying communications 1135 between the mobile device 1110 and the local device 1130, signals carrying communications 1235 between the mobile device 1210 and the local device 1230, or a combination thereof. The media data can include a map generated by the media device based on the positioning data. The media device can generates the media data at least in part by generating a map based on the positioning data and/or the sensor data. An example of such a map includes the map in the digital asset 1140, which the media device 1110 generates based on positioning sensor data from the positioning sensors 1120. Examples of the positioning receiver can include the short-range wireless transceiver 260, the short-range wireless transceiver 275, or a combination thereof.

To receive the positioning data, the digital asset tracking system can receive the positioning data from the media device. The positioning data can be based on receipt of one or more positioning signals by a positioning receiver of the one or more sensors of the media device. For example, at least some of the positioning data can include pose data 225 from one or more pose sensors 215 and/or positioning information that the media device 205 determines based on the communications 272. Examples of the positioning receiver can include a GNSS receiver, such as a GPS receiver. Examples of the one or more positioning signals can include GNSS signals, such as GPS signals. Examples of the positioning receiver may include the positioning sensors 820, the positioning sensors 920, the positioning sensors 1020, the positioning sensors 1120, the positioning sensors 1220, or a combination thereof. Examples of the positioning receiver can include the one or more short-range wireless transceivers 260, the positioning sensors 820, the positioning sensors 920, the positioning sensors 1020, the positioning sensors 1120, the positioning sensors 1220, the positioning sensors 1320, or a combination thereof. Examples of the one or more positioning signals can include signals carrying communications 272 between the media device 205 and the local device 270, signals carrying communications 835 between the mobile device 810 and the local device 830, signals carrying communications 935 between the mobile device 910 and the local device 930, signals carrying communications 1035 between the mobile device 1010 and the local device 1030, signals carrying communications 1135 between the mobile device 1110 and the local device 1130, signals carrying communications 1235 between the mobile device 1210 and the local device 1230, or a combination thereof.

To receive the positioning data, the digital asset tracking system can receive the positioning data from a local device distinct from the media device. The positioning data can be based on receipt of one or more positioning signals by a positioning receiver of the local device. Examples of the local device can include the image capture and processing system 100, the image capture device 105A, the image processing device 105B, the local device(s) 270, the local device 830, the local device 930, the local device 1030, the local device 1130, the local device 1230, the local device 1435, the computing systems of FIGS. 15A-15B, the computing system 1900, or a combination thereof. Examples of the positioning receiver can include the one or more short-range wireless transceivers 275. Examples of the one or more positioning signals can include signals carrying communications 272 between the media device 205 and the local device 270, signals carrying communications 835 between the mobile device 810 and the local device 830, signals carrying communications 935 between the mobile device 910 and the local device 930, signals carrying communications 1035 between the mobile device 1010 and the local device 1030, signals carrying communications 1135 between the mobile device 1110 and the local device 1130, signals carrying communications 1235 between the mobile device 1210 and the local device 1230, or a combination thereof.

The positioning receiver can be a short-range wireless communication receiver configured to receive one or more short-range wireless communication signals. Examples of the short-range wireless communication receiver include the one or more short-range wireless transceivers 260. The one or more short-range wireless communication signals can be transmitted by a local device in the geographic area. Examples of the local device can include the image capture and processing system 100, the image capture device 105A, the image processing device 105B, the local device(s) 270, the local device 830, the local device 930, the local device 1030, the local device 1130, the local device 1230, the computing systems of FIGS. 15A-15B, the computing system 1900, or a combination thereof. Examples of the one or more short-range wireless communication signals can include signals carrying communications 272 between the media device 205 and the local device 270, signals carrying communications 835 between the mobile device 810 and the local device 830, signals carrying communications 935 between the mobile device 910 and the local device 930, signals carrying communications 1035 between the mobile device 1010 and the local device 1030, signals carrying communications 1135 between the mobile device 1110 and the local device 1130, signals carrying communications 1235 between the mobile device 1210 and the local device 1230, or a combination thereof. The geographic area can correspond to a transmission range of the one or more short-range wireless communication signals by the local device. In some examples, the positioning receiver can be a global navigation satellite system (GNSS) receiver configured to receive one or more GNSS signals from one or more satellites.

In some aspects, the digital asset tracking system includes the local device. In some aspects, the digital asset tracking system includes the media device.

At operation 1665, the digital asset tracking system is configured to, and can, verify, based on the positioning data, that the position of the media device at the time contemporaneous with capture of the sensor data is within a geographic area. Examples of verification that the position of the media device at the time contemporaneous with capture of the sensor data is within a geographic area includes block 290 of the digital asset tracking system 200 of FIG. 2, which may be performed by the network device 280, the media device 205, the local device 270, or a combination thereof. Examples of the geographic area include a museum, a sports venue, a concert venue, a movie theater, a shopping mall, a transmission range of one or more short-range wireless transceivers 275 of one or more local devices 270, a receipt range of one or more short-range wireless transceivers 275 of one or more local devices 270 (for receiving signals transmitted using the one or more short-range wireless transceivers 260 of the media device), or a combination thereof.

To verify that the position of the media device at the time contemporaneous with capture of the sensor data is within the geographic area, the digital asset tracking system can verify content of one or more communications between the media device and a local device associated with the geographic area. To verify that the position of the media device at the time contemporaneous with capture of the sensor data is within the geographic area, the digital asset tracking system can verify timing of transmission and/or receipt of one or more communications between the media device and a local device associated with the geographic area. To verify that the position of the media device at the time contemporaneous with capture of the sensor data is within the geographic area, the digital asset tracking system can verify transmission frequency and/or receipt frequency of one or more communications between the media device and a local device associated with the geographic area. Examples of the local device can include the image capture and processing system 100, the image capture device 105A, the image processing device 105B, the local device(s) 270, the local device 830, the local device 930, the local device 1030, the local device 1130, the local device 1230, the computing systems of FIGS. 15A-15B, the computing system 1900, or a combination thereof. Properties of the one or more communications, such as content, timing of transmission, timing of receipt, transmission frequency, and/or receipt frequency, can be stored at the local device in the stored communications of block 277 and/or at the media device 205 in the stored communications of block 278. Examples of the one or more communications can include signals carrying communications 272 between the media device 205 and the local device 270, signals carrying communications 835 between the mobile device 810 and the local device 830, signals carrying communications 935 between the mobile device 910 and the local device 930, signals carrying communications 1035 between the mobile device 1010 and the local device 1030, signals carrying communications 1135 between the mobile device 1110 and the local device 1130, signals carrying communications 1235 between the mobile device 1210 and the local device 1230, or a combination thereof.

To verify that the position of the media device at the time contemporaneous with capture of the sensor data is within the geographic area, the digital asset tracking system can verify that the sensor data (and/or the media data) depicts an object that is visible within the geographic area. For example, in the context of FIG. 8A, the digital asset tracking system can verify that the digital asset 840 depicts an object (the Mona Lisa) that is in the geographic area (the Louvre Museum), and can thus verify that the media device 810 is in the geographic area (the Louvre Museum). In the context of FIG. 9A, the digital asset tracking system can verify that the digital asset 940 depicts an object (Bob 945) that is in the geographic area (the park), and can thus verify that the media device 910 is in the geographic area (the park). In the context of FIG. 10A, the digital asset tracking system can verify that the digital asset 1040 depicts objects (the virtual object 1045 and the real objects 1047) that are in the geographic area (the park), and can thus verify that the media device 1010 is in the geographic area (the park). In the context of FIG. 11A, the digital asset tracking system can verify that the digital asset 1140 depicts objects (the hiking trail) that are in the geographic area (Yosemite), and can thus verify that the media device 1110 is in the geographic area (Yosemite). In the context of FIG. 13, the digital asset tracking system can verify that the digital asset 1340 depicts objects (the virtual object 1345 and the real objects 1347) that are in the geographic area (the park), and can thus verify that the media device 1310 is in the geographic area (the park).

At operation 1670, the digital asset tracking system is configured to, and can, generate a token corresponding to the media data automatically in response to verifying that the position of the media device is within the geographic area, the token being identified in a payload of a block of a distributed ledger. Examples of the token can include the token 600, the token 860, the token 960, the token 1060, the token 1160, the token 1260, the token 1360, the token 1420, or a combination thereof. Examples of the distributed ledger include the distributed ledger 295, the blockchain ledger 500, the DAG ledger 700, the distributed ledger 1365, the distributed ledger 1415, a distributed ledger corresponding to the smart contract of FIGS. 15A-15B, or a combination thereof. Examples of a block include block A 505, block B 535, block C 565, block 710, block 720, block 730, block 740, block 750, block 760, or a combination thereof. Examples of a payload include the Block A payload 530, the Block B payload 560, and the Block C payload 590. The token can be a non-fungible token (NFT).

In some aspects, the digital asset tracking system is configured to, and can, generate the block for the distributed ledger automatically in response to verifying that the position of the media device is within the geographic area. In some aspects, the digital asset tracking system is configured to, and can, append the block to a plurality of blocks of the distributed ledger. In some aspects, the digital asset tracking system is configured to, and can, transmit the block to a plurality of computing devices so that the plurality of computing devices can append the block to their respective copies of the distributed ledger. Examples of the plurality of computing devices can include the additional devices 297, the computing systems of FIGS. 15A-15B, computing systems 1900, or a combination thereof.

In some aspects, the digital asset tracking system is configured to, and can, transmit a request to generate the block for the distributed ledger to a block generation computing device automatically in response to verifying that the position of the media device is within the geographic area. In some aspects, the digital asset tracking system is configured to, and can, receive the block from the block generation computing device. In some aspects, the digital asset tracking system is configured to, and can, append the block to a plurality of blocks of the distributed ledger. Examples of the block generation computing device can include one of the additional devices 297, one of the computing systems of FIGS. 15A-15B, a computing system 1900, or a combination thereof.

The block can include a hash of at least a portion of a prior block of the distributed ledger. Examples of the hash include the hash 515, the hash 545, and the hash 575. The block can include a Merkle root of a plurality of elements of the payload of the block. Examples of the Merkle root include the Merkle root 520, the Merkle root 550, and the Merkle root 580. The token can correspond to at least one of the plurality of elements of the payload of the block. In some aspects, the digital asset tracking system is configured to, and can, generate the distributed ledger automatically in response to verifying that the position of the media device is within the geographic area.

In some aspects, the digital asset tracking system is configured to, and can, set an ownership of the token to an account associated with a user associated with the media device. For instance, in the context of FIGS. 8A-8B, the digital asset tracking system can set the ownership of the token 860 to the user 805. In the context of FIGS. 9A-9B, the digital asset tracking system can set the ownership of the token 960 to the user 905. In the context of FIGS. 10A-10B, the digital asset tracking system can set the ownership of the token 1060 to the user 1005. In the context of FIGS. 11A-11B, the digital asset tracking system can set the ownership of the token 1160 to the user 1105. In the context of FIGS. 12A-12B, the digital asset tracking system can set the ownership of the token 1260 to the user 1205. In the context of FIG. 13, the digital asset tracking system can set the ownership of the token 1360 to the user 1305. In the context of FIG. 13, the digital asset tracking system can set the ownership of the token 1420 to the first user 1410 and/or to the second user 1430. In some examples, ownership of the token can be stored on-chain, for instance in token ownership 620, on-chain immutable metadata 625, and/or on-chain mutable metadata 630. In some examples, ownership of the token can be stored off-chain, for instance in off-chain metadata 640.

In some aspects, the digital asset tracking system is configured to, and can, identify that the sensor data includes a representation of an individual having a recognized identity. In the context of FIG. 9A, the digital asset tracking system can identify that image(s) captured by the image sensors 915 (and corresponding to the digital asset 940) include a depiction of an individual having a recognized identity (Bob 945). In some aspects, the digital asset tracking system is configured to, and can, set an ownership of the token to an account associated with the individual having the recognized identity. In the context of FIGS. 9A-9B, the digital asset tracking system can set the ownership of the token 960 to Bob 945.

In some aspects, the media device includes a head-mounted display, such as the HMD 310. In some aspects, the media device includes a mobile handset, such as the mobile handset 410, the media device 810, the media device 910, the media device 1010, the media device 1110, the ownership device 1210, or a combination thereof. In some aspects, the media device includes a wearable device. In some aspects, the media device is in the geographic area.

In some aspects, the digital asset tracking system includes a head-mounted display, such as the HMD 310. In some aspects, the digital asset tracking system includes a mobile handset, such as the mobile handset 410, the media device 810, the media device 910, the media device 1010, the media device 1110, the ownership device 1210, or a combination thereof. In some aspects, the digital asset tracking system includes a wearable device. In some aspects, the digital asset tracking system includes a server. In some aspects, the digital asset tracking system is in the geographic area.

In some aspects, the digital asset tracking system can include: means for receiving media data that is based on sensor data captured by one or more sensors of a media device. In some aspects, the digital asset tracking system can include: means for receiving positioning data that is indicative of a position of the media device at a time contemporaneous with capture of the sensor data by the one or more sensors of the media device. In some aspects, the digital asset tracking system can include: means for verifying, based on the positioning data, that the position of the media device at the time contemporaneous with capture of the sensor data is within a geographic area. In some aspects, the digital asset tracking system can include: means for generating a token corresponding to the media data automatically in response to verifying that the position of the media device is within the geographic area, the token being identified in a payload of a block of a distributed ledger.

In some examples, the means for receiving the media data include the network device(s) 280. In some examples, the means for receiving the media data include the media device 205, the media device 810, the media device 910, the media device 1010, the media device 1110, the ownership device 1210, or a combination thereof. In some examples, the means for receiving the media data include the local device(s) 270, the local device 830, the local device 930, the local device 1030, the local device 1130, the local device 1230, or a combination thereof. In some examples, the means for receiving the media data include the HMD 310. In some examples, the means for receiving the media data include the media processor 235. In some examples, the means for receiving the media data include the mobile handset 410. In some examples, the means for receiving the media data include the image sensor 130. In some examples, the means for receiving the media data include the image capture device 105A, the image processing device 105B, the image capture and processing system 100, or a combination thereof. In some examples, the means for receiving the media data include receipt of the media data at a network transceiver (such as network transceiver 285) from a network transceiver (such as network transceiver 265) of the media device 205 via the communications 282. In some examples, the means for receiving the media data include capture of sensor data (such as the pose data 225 and/or the sensor data 230) by one or more sensors 210 of the media device 205. In some examples, the means for receiving the media data include generating and/or obtaining media data 250 at the media device 205. In some examples, the means for receiving the media data include capture of sensor data (such as the pose data 225 and/or the sensor data 230) by one or more sensors 210 of the media device 205. In some examples, the means for receiving the media data include generating and/or obtaining media data 250 at the media device 205. In some examples, the means for receiving the media data include the digital asset 605. In some examples, the means for receiving the media data include the digital asset 840, the digital asset 940, the digital asset 1040, the digital asset 1140, the digital asset 1240, or a combination thereof. In some examples, the means for receiving the media data include the image sensors 815, the image sensors 915, the image sensors 1015, or a combination thereof. In some examples, the means for receiving the media data include digital asset tracking system that performs the process 0016. In some examples, the means for receiving the media data include the first camera 330A and/or the second camera 330B. In some examples, the means for receiving the media data include the first camera 430A, the second camera 430B, the third camera 430C, the fourth camera 430D, or a combination thereof.

In some examples, the means for receiving the positioning data include the network device(s) 280. In some examples, the means for receiving the positioning data include the media device 205, the media device 810, the media device 910, the media device 1010, the media device 1110, the ownership device 1210, or a combination thereof. In some examples, the means for receiving the positioning data include the local device(s) 270, the local device 830, the local device 930, the local device 1030, the local device 1130, the local device 1230, or a combination thereof. In some examples, the means for receiving the positioning data include the HMD 310. In some examples, the means for receiving the positioning data include the mobile handset 410. In some examples, the means for receiving the positioning data include receipt of the pose data at a network transceiver (such as network transceiver 285) from a network transceiver (such as network transceiver 265) of the media device 205 via the communications 282 (e.g., as the pose data 225 and/or as part of the media data 250 and/or as part of information about the communications 272). In some examples, the means for receiving the positioning data include capture of the pose data 225 and/or the sensor data 230 by one or more sensors 210 of the media device 205. In some examples, the means for receiving the positioning data include receiving stored copies of the communications 272 (e.g., stored communications of block 277 and/or stored communications of block 278). In some examples, the means for receiving the positioning data include generating and/or obtaining media data 250 at the media device 205 (e.g., where the media data is at least partially based on and/or includes the pose data 225). In some examples, the means for receiving the media data include receipt of the media data at a network transceiver (such as network transceiver 285) from a network transceiver (such as network transceiver 265) of the media device 205 via the communications 282. In some examples, the means for receiving the positioning data include the positioning sensors 820, the positioning sensors 920, the positioning sensors 1020, the positioning sensors 1120, the positioning sensors 1220, or a combination thereof. In some examples, the means for receiving the positioning data include digital asset tracking system that performs the process 1650. In some examples, the means for receiving the positioning data include receiving data from the media device 205 and/or from the local device 270 about the communications 272, receiving data from the media device 810 and/or from the local device 830 about the communications 835, receiving data from the media device 910 and/or from the local device 930 about the communications 935, receiving data from the media device 1010 and/or from the local device 1030 about the communications 1035, receiving data from the media device 1110 and/or from the local device 1130 about the communications 1135, receiving data from the ownership device 1210 and/or from the local device 1230 about the communications 1235, or a combination thereof. In some examples, the means for receiving the positioning data include the first camera 330A and/or the second camera 330B. In some examples, the means for receiving the positioning data include the first camera 430A, the second camera 430B, the third camera 430C, the fourth camera 430D, or a combination thereof.

In some examples, the means for verifying the position of the media device include the network device(s) 280. In some examples, the means for verifying the position of the media device include the media device 205, the media device 810, the media device 910, the media device 1010, the media device 1110, the ownership device 1210, or a combination thereof. In some examples, the means for verifying the position of the media device include the local device(s) 270, the local device 830, the local device 930, the local device 1030, the local device 1130, the local device 1230, or a combination thereof. In some examples, the means for verifying the position of the media device include the HMD 310. In some examples, the means for verifying the position of the media device include the mobile handset 410. In some examples, the means for verifying the position of the media device include the media device 205. In some examples, the means for verifying the position of the media device include the local device(s) 270. In some examples, the means for verifying the position of the media device include verification that the pose of the media device 205 is in a geographic area associated with the local device 270 (block 290 In some examples, the means for verifying the position of the media device include receipt of the positioning data at a network transceiver (such as network transceiver 285) from a network transceiver (such as network transceiver 265) of the media device 205 via the communications 282 and comparison of the positioning data to the geographic area. In some examples, the means for verifying the position of the media device include the token smart contracts 645. In some examples, the means for verifying the position of the media device include the smart contract(s) of FIGS. 15A-15B. In some examples, the means for verifying the position of the media device include digital asset tracking system that performs the process 1650.

In some examples, the means for generating the token corresponding to the media data include the network device(s) 280. In some examples, the means for generating the token corresponding to the media data include the media device 205, the media device 810, the media device 910, the media device 1010, the media device 1110, the ownership device 1210, or a combination thereof. In some examples, the means for generating the token corresponding to the media data include the local device(s) 270, the local device 830, the local device 930, the local device 1030, the local device 1130, the local device 1230, or a combination thereof. In some examples, the means for generating the token corresponding to the media data include the HMD 310. In some examples, the means for generating the token corresponding to the media data include the mobile handset 410. In some examples, the means for generating the token corresponding to the media data include the distributed ledger 295, the blockchain ledger 500, the DAG ledger 700, a distributed ledger corresponding to the smart contract of FIGS. 15A-15B, or a combination thereof. In some examples, the means for generating the token corresponding to the media data include the token 600. In some examples, the means for generating the token corresponding to the media data include the token 860, the token 960, the token 1060, the token 1160, the token 1260, or a combination thereof. In some examples, the means for generating the token corresponding to the media data include the token smart contracts 645. In some examples, the means for generating the token corresponding to the media data include the smart contract(s) of FIGS. 15A-15B. In some examples, the means for generating the token corresponding to the media data include the computing systems of FIGS. 15A-15B. In some examples, the means for generating the token corresponding to the media data include the computing system of 1900. In some examples, the means for generating the token corresponding to the media data include digital asset tracking system that performs the process 1650.

Figure 17:
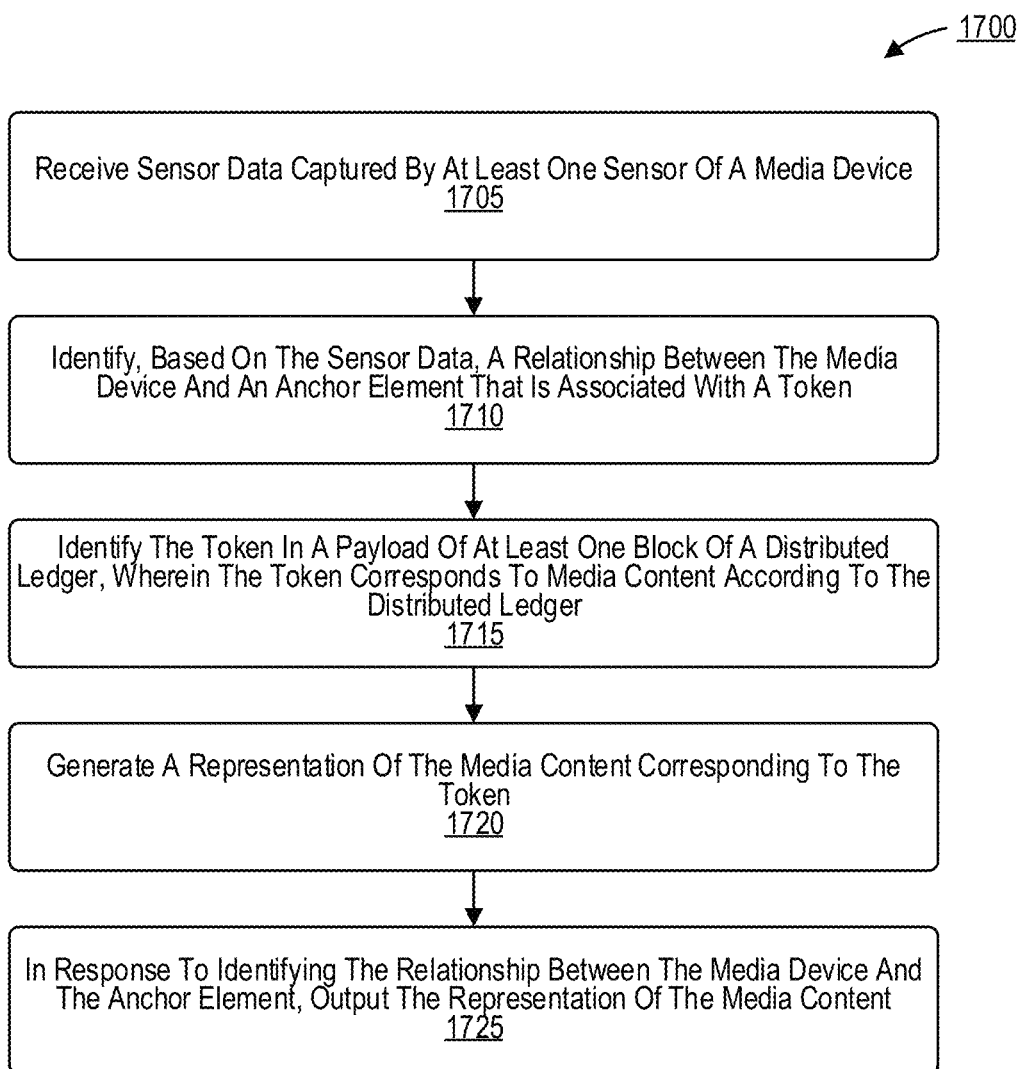
FIG. 17 is a flow diagram illustrating a process for situational token-associated media output, in accordance with some examples.

FIG. 17 is a flow diagram illustrating a process 1700 for situational token-associated media output. The process 1700 may be performed by a digital asset management system. In some examples, the digital asset management system can include the digital asset tracking system 200 of FIG. 2, or a portion thereof. In some examples, the imaging system can include, for example, the image capture and processing system 100, the image capture device 105A, the image processing device 105B, the image processor 150, the ISP 154, the host processor 152, the digital asset tracking system 200, the media device 205, the network device(s) 280, the local device(s) 270, the additional device(s) 297, the data store(s) 298, the anchor element(s) 299, the HMD 310, the mobile handset 410, the media device 810, the local device 830, the media device 910, the local device 930, the media device 1010, the local device 1030, the media device 1110, the local device 1130, the ownership device 1210, the local device 1230, the media device 1310, the distributed ledger 1365, the data store(s) 1370, the token device 1405, one or more of the computing systems of FIG. 15A, one or more of the computing systems of FIG. 15B, the digital asset management system that performs the process 1600, the digital asset tracking system that performs the process 1650, the digital asset management system that performs the process 1800, the computing system 1900, the processor 1910, or a combination thereof.

At operation 1705, the digital asset management system is configured to, and can, receive sensor data captured by at least one sensor of a media device. Examples of the media device can include the image capture and processing system 100, the image capture device 105A, the image processing device 105B, media device 205, the HMD 310, the mobile handset 410, the media device 810, the media device 910, the media device 1010, the media device 1110, the ownership device 1210, the media device 1310, the distributed ledger 1365, the data store(s) 1370, the token device 1405, the computing systems of FIGS. 15A-15B, the computing system 1900, or a combination thereof. Examples of the at least one sensor includes the image sensor 130, the one or more sensors 210, the one or more pose sensors 215, the one or more media sensors 220, the first camera 330A, the second camera 330B, the first camera 430A, the second camera 430B, the third camera 430C, the fourth camera 430D, the image sensors 815, the image sensors 915, the image sensors 1015, the image sensors 1315, the positioning sensors 820, the positioning sensors 920, the positioning sensors 1020, the positioning sensors 1120, the positioning sensors 1220, the positioning sensors 1320, or a combination thereof. Examples of the sensor data can include the sensor data 230, the pose data 225, images captured by the image sensor 130, images processed by the ISP 154, images processed by the host processor 152, images processed by the image processor 152, the stored communications of block 278, or a combination thereof.

In some examples, the digital asset tracking system include one or more sensor connectors coupled to the one or more sensors. The media data may be received using the one or more sensor connectors. The sensor data captured by the one or more sensors may be received using the one or more sensor connectors. The one or more sensor connectors may include one or more of a port, a jack, a wire, an input/output (TO) pin, a conductive trace on a printed circuit board (PCB), any other type of connector discussed herein, or some combination thereof. In some examples, the digital asset tracking system include one or more sensors.

At operation 1710, the digital asset management system is configured to, and can, identify, based on the sensor data, a relationship between the media device and an anchor element that is associated with a token. In some examples, the relationship between the media device and the anchor element can include an interaction between the media device and the anchor element. Examples of the anchor element include the anchor element(s) 299, the anchor element 1350, optical glyph(s), specified area(s), specified location(s), specified sound(s), and the like.

In some examples, the sensor data includes image data captured by at least one image sensor of the at least one sensor of the media device. The anchor element can include an object. Identifying the relationship between the media device and the anchor element can include identifying that the image data depicts the object. For instance, in some examples, the object includes an optical glyph, and information indicative of the token is optically encoded based on the optical glyph, as illustrated in the anchor element 1350. Examples of the optical glyph include quick response (QR) codes, bar codes, Aztec codes, dot codes, data matrices, shotcodes, or combinations thereof. In some examples, the reference image data depicting the object is stored in a data store (e.g., data store(s) 298, data structure(s) 650, data store(s) 1370), and identifying that the image data depicts the object includes comparing the image data to the reference image data.

In some examples, the sensor data includes position data indicative of a position of the media device. Examples of the position data can include the pose data 225, the sensor data 230, positioning information determined (e.g., by the media device 205 and/or locafexl device 270 and/or the digital asset tracking system) based on the one or more communications 272, stored communications of block 277, stored communications of block 278, positioning information determined using image sensors 815 and/or positioning sensors 820, positioning information determined (e.g., by the media device 810 and/or local device 830 and/or the digital asset tracking system) based on the one or more communications 835, positioning information determined using image sensors 915 and/or positioning sensors 920, positioning information determined (e.g., by the media device 910 and/or local device 930 and/or the digital asset tracking system) based on the one or more communications 935, positioning information determined using image sensors 1015 and/or positioning sensors 1020, positioning information determined (e.g., by the media device 1010 and/or local device 1030 and/or the digital asset tracking system) based on the one or more communications 1035, positioning information determined using positioning sensors 1120, positioning information determined (e.g., by the media device 1110 and/or local device 1130 and/or the digital asset tracking system) based on the one or more communications 1135, positioning information determined using positioning sensors 1220, positioning information determined (e.g., by the ownership device 1210 and/or local device 1230 and/or the digital asset tracking system) based on the one or more communications 1235, positioning information determined using image sensors 1315 and/or positioning sensors 1320, the position of the token device 1405, or a combination thereof.

In some examples, the anchor element includes an area, and identifying the relationship between the media device and the anchor element includes identifying that the position of the media device is within the area. In some examples, the anchor element includes a location, and identifying the relationship between the media device and the anchor element includes identifying that the position of the media device is within a threshold range of the location. In some examples, the area, and/or the threshold range of the location, includes an area within a communication range of a local device. Examples of the local device can include the image capture and processing system 100, the image capture device 105A, the image processing device 105B, the local device(s) 270, the local device 830, the local device 930, the local device 1030, the local device 1130, the local device 1230, the local device 1435, the computing systems of FIGS. 15A-15B, the computing system 1900, or a combination thereof.

In some examples, the sensor data includes audio data captured by at least one microphone (e.g., sensors 210) of the at least one sensor of the media device. In some examples, the anchor element includes a sound, and identifying the relationship between the media device and the anchor element includes identifying that the audio data includes the sound. For instance, if a particular song, or other sound, is playing in an area, the relationship between the media device and the anchor element can be identified by detecting the sound from the microphone recording by the media device.

At operation 1715, the digital asset management system is configured to, and can, identify the token in a payload of at least one block of a distributed ledger, wherein the token corresponds to media content according to the distributed ledger. For instance, in the context of FIG. 13, in response to identifying the relationship between the media device 1310 and the anchor element 1350 (e.g., the media device 1310 having scanned the QR code of the anchor element 1350), the digital asset management system can identify the token 1360 in the distributed ledger 1365, and the token 1360 can correspond to a digital asset 1340 (e.g., the media content).

Examples of the token can include the token 600, the token 860, the token 960, the token 1060, the token 1160, the token 1260, the token 1360, the token 1420, or a combination thereof. Examples of the distributed ledger include the distributed ledger 295, the blockchain ledger 500, the DAG ledger 700, the distributed ledger 1365, the distributed ledger 1415, a distributed ledger corresponding to the smart contract of FIGS. 15A-15B, or a combination thereof. Examples of a block include block A 505, block B 535, block C 565, block 710, block 720, block 730, block 740, block 750, block 760, or a combination thereof. Examples of a payload include the Block A payload 530, the Block B payload 560, and the Block C payload 590. The token can be a non-fungible token (NFT).

At operation 1720, the digital asset management system is configured to, and can, generate a representation of the media content corresponding to the token. At operation 1725, in response to identifying the relationship between the media device and the anchor element at operation 1720, the digital asset management system is configured to, and can, output the representation of the media content. For instance, in the context of FIG. 13, the representation of the media content corresponding to the token can include the digital asset 1340, the virtual object 1345, the information 1355 about the token 1360 associated with the digital asset 1340, one or more customization(s) 1357, or a combination thereof.

In some examples, outputting the representation of the media content includes causing a display (e.g., an output device 1935) to display at least a portion of the media content. In some examples, outputting the representation of the media content includes transmitting the representation of the media content to a recipient device (e.g., using a communication interface 1940). Examples of the recipient device can include any of the examples of the media device listed herein.

In some examples, the digital asset management system is configured to, and can, identify a media device pose of the media device based on the sensor data. The digital asset management system can determine a media content pose for the media content based on the media device pose of the media device. In some examples, outputting the representation of the media content includes outputting the representation of the media content posed according to the media content pose. Examples of the media content pose include the customization 1357 and/or any other modifications, customizations, and/or personalizations to the digital asset 1340.

In some examples, the digital asset management system is configured to, and can, identify, based on the distributed ledger, that a parameter (e.g., token ownership 620, token smart contract(s) 645) of the token indicates that the token is associated with a first user. The digital asset management system can determine a visual effect for the media content based on parameter of the token indicating that the token is associated with the first user. The digital asset management system can apply the visual effect to the media content. In some examples, outputting the representation of the media content includes outputting the representation of the media content with the visual effect applied. Examples of the visual effect include the customization 1357 and/or any other modifications, customizations, and/or personalizations to the digital asset 1340.

In some examples, the digital asset management system is configured to, and can, determine, based on a data store, that the first user and a second user are associated according to a relationship type. The media device is associated with the second user. The visual effect for the media content can correspond to the relationship type. For instance, the visual effect can indicate whether the first user and the second user are family, friends, spouses, significant others, co-workers, contacts, acquaintances, employer/employee, contractor/contractee, mentor/mentee, girlfriend/boyfriend, partners, or another relationship type.

In some examples, the digital asset management system is configured to, and can, determine that the media device is associated with the first user. The visual effect for the media content corresponds the first user. For instance, the visual effect can indicate to the first user that the media content is the first user's own media content, and/or is associated with the first user's own token.

In some examples, the digital asset management system is configured to, and can, determine, based on a data store, that the first user is a famous person. The visual effect for the media content corresponds the first user being the famous person. In some examples, different categories of famous person can have different visual effects, for instance to differentiate politicians, sports stars, musicians, movie stars, TV stars, famous scientists, and the like.

In some examples, the digital asset management system is configured to, and can, determine, based on a data store, a rating associated with the media content. The visual effect for the media content can correspond the rating. The rating can be a selected number, relative to a maximum possible number. For instance, the rating can be 3 out of 5, or 9 out of 10, or some other rating. Different ratings can have different visual effects. In some examples, a maximum rating (e.g., 5 out of 5, 10 out of 10, etc.) can have a specified visual effect.

In some examples, the digital asset management system is configured to, and can, determine that the token is identified in a data store. The visual effect for the media content corresponds to the data store. For instance, the data store can include a record for the token and/or the media content. The record can identify and/or store the visual effect. Examples of the data store include the data store(s) 298, the data structure(s) 650, and/or the data store(s) 1370.

In some examples, the digital asset management system is configured to, and can, retrieve information about the token from the distributed ledger, and output the information about the token. Examples of the information about the token includes the information 1355 about the token 1360. In some examples, outputting the information about the token includes causing a display to display at least a portion of the information, for instance as illustrated in FIG. 13 with the information 1355 displayed on the media device 1310 with the digital asset 1340. In some examples, the information identifies the distributed ledger. In some examples, the digital asset management system is configured to, and can, identify, based on the distributed ledger, that a parameter of the token (e.g., token ownership 620, token smart contract(s) 645) indicates that the token is associated with a first user. The information can identify the first user.

For instance, in the context of FIGS. 8A-8B, the digital asset tracking system can set the parameter of the token 860 to indicate the 805. In the context of FIGS. 9A-9B, the digital asset tracking system can set the parameter of the token 960 to indicate that the token is associated with the user 905. In the context of FIGS. 10A-10B, the digital asset tracking system can set the parameter of the token 1060 to indicate that the token is associated with the user 1005. In the context of FIGS. 11A-11B, the digital asset tracking system can set the parameter of the token 1160 to indicate that the token is associated with the user 1105. In the context of FIGS. 12A-12B, the digital asset tracking system can set the parameter of the token 1260 to indicate that the token is associated with the user 1205. In the context of FIG. 13, the digital asset tracking system can set the parameter of the token 1360 to indicate that the token is associated with the user 1305. In the context of FIG. 14, the digital asset tracking system can set the parameter of the token 1420 to indicate that the token is associated with the first user 1410 and/or to the second user 1430. In some examples, parameter of the token can be stored on-chain, for instance in token ownership 620, on-chain immutable metadata 625, and/or on-chain mutable metadata 630. In some examples, parameter of the token can be stored off-chain, for instance in off-chain metadata 640.

In some examples, the digital asset management system is configured to, and can, identify, based on the distributed ledger, that a parameter (e.g., token smart contract(s) 645) of the token indicates that the token is associated with a smart contract. The information can identify the smart contract. In some examples, the digital asset management system is configured to, and can, identify, based on the distributed ledger, that a parameter (e.g., token unit quantity 615) of the token indicates an amount of instances of the token, wherein the information identifies the amount of instances of the token.

In some examples, the digital asset management system is configured to, and can, identify a transfer platform that is configured for token transfer (e.g., configured for the token to be bought, sold, rented, licensed, or some combination thereof). The digital asset management system can output an interface element (e.g., a button, a menu, or another user interface element) corresponding to the media content. The interface element can be configured to initiate a transfer of the token using the transfer platform (e.g., to sell the token, to buy the token, the rent the token, to lease the token, and/or to license the token) upon interaction with the interface element (e.g., by a user of the digital asset management system through an input device 1945).

In some examples, the digital asset management system that performs the process 1700 can include at least one of a head-mounted display (HMD) (e.g., HMD 310), a mobile handset (e.g., mobile handset 410), a wireless communication device, or a combination thereof.

In some examples, the digital asset management system includes means for receiving sensor data captured by at least one sensor of a media device; means for identifying, based on the sensor data, a relationship between the media device and an anchor element that is associated with a token; means for identifying the token in a payload of at least one block of a distributed ledger, wherein the token corresponds to media content according to the distributed ledger; means for generating a representation of the media content corresponding to the token; and means for outputting the representation of the media content in response to identifying the relationship between the media device and the anchor element.

In some examples, the means for receiving sensor data include the image capture and processing system 100, the image sensor 130, the digital asset tracking system 200, the one or more sensors 210, the one or more pose sensors 215, the one or more media sensors 220, the first camera 330A, the second camera 330B, the first camera 430A, the second camera 430B, the third camera 430C, the fourth camera 430D, the image sensors 815, the image sensors 915, the image sensors 1015, the image sensors 1315, the positioning sensors 820, the positioning sensors 920, the positioning sensors 1020, the positioning sensors 1120, the positioning sensors 1220, the positioning sensors 1320, the media device 205, the network device(s) 280, the local device(s) 270, the additional device(s) 297, the data store(s) 298, the anchor element(s) 299, the HMD 310, the mobile handset 410, the media device 810, the local device 830, the media device 910, the local device 930, the media device 1010, the local device 1030, the media device 1110, the local device 1130, the ownership device 1210, the local device 1230, the media device 1310, the distributed ledger 1365, the data store(s) 1370, the token device 1405, one or more of the computing systems of FIG. 15A, one or more of the computing systems of FIG. 15B, the computing system 1900, the input device 1945, or a combination thereof.

In some examples, the means for identifying the relationship and/or identifying the token include the digital asset tracking system 200, the media device 205, the network device(s) 280, the local device(s) 270, the additional device(s) 297, the data store(s) 298, the anchor element(s) 299, the HMD 310, the mobile handset 410, the blockchain ledger 500, the token 600, the data structures 650, the DAG ledger 700, the media device 810, the local device 830, the media device 910, the local device 930, the media device 1010, the local device 1030, the media device 1110, the local device 1130, the ownership device 1210, the local device 1230, the media device 1310, the anchor element 1350, the distributed ledger 1365, the data store(s) 1370, the token device 1405, the distributed ledger 1415, the token 1420, the local device 1435, one or more of the computing systems of FIG. 15A, one or more of the computing systems of FIG. 15B, the computing system 1900, or a combination thereof.

In some examples, the means for generating the representation of the media content and/or outputting the representation of the media content include the digital asset tracking system 200, the media device 205, the media processor 235, the network device(s) 280, the local device(s) 270, the additional device(s) 297, the data store(s) 298, the anchor element(s) 299, the HMD 310, the display(s) 340, the mobile handset 410, the display 440, the media device 810, the local device 830, the media device 910, the local device 930, the media device 1010, the local device 1030, the media device 1110, the local device 1130, the ownership device 1210, the local device 1230, the media device 1310, the anchor element 1350, the distributed ledger 1365, the data store(s) 1370, the token device 1405, one or more of the computing systems of FIG. 15A, one or more of the computing systems of FIG. 15B, the computing system 1900, the output device 1935, the communication interface 1940, or a combination thereof.

Figure 18:
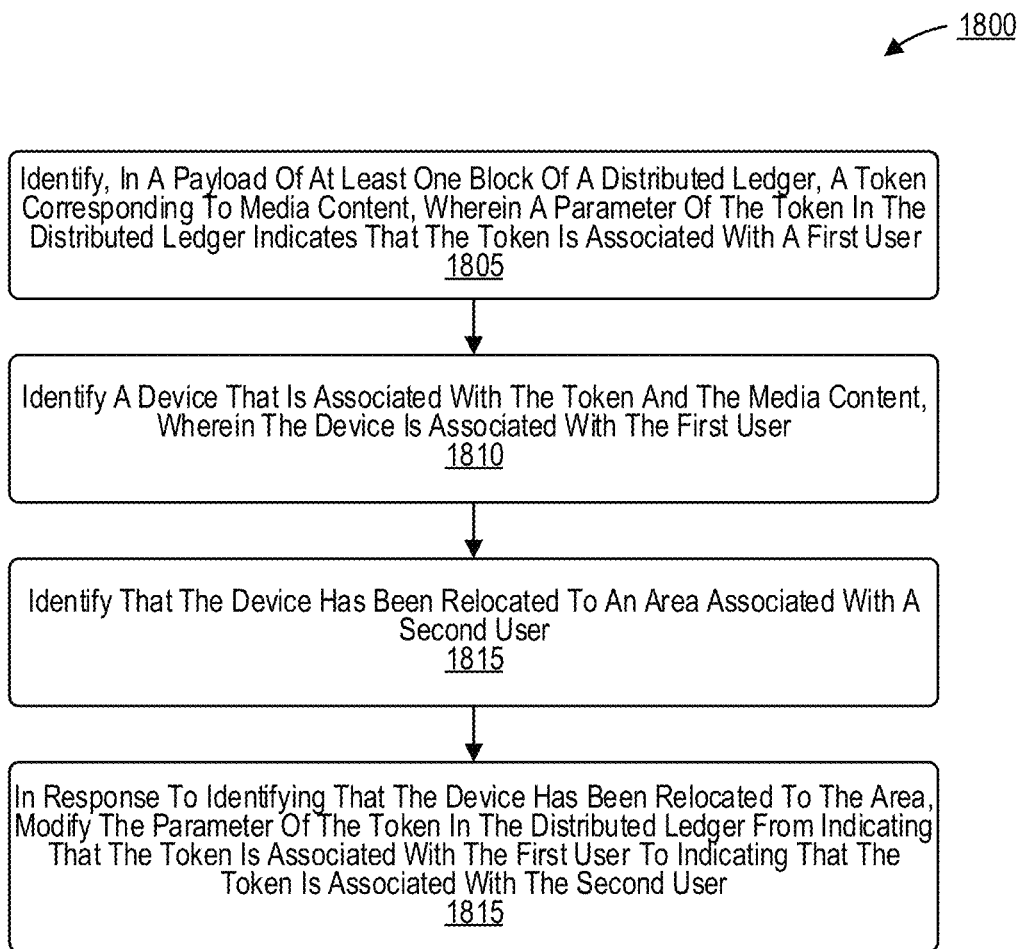
FIG. 18 is a flow diagram illustrating a process for token device transfer management, in accordance with some examples.

FIG. 18 is a flow diagram illustrating a process 1800 for token device transfer management. The process 1800 may be performed by a digital asset management system. In some examples, the digital asset management system can include the digital asset tracking system 200 of FIG. 2, or a portion thereof. In some examples, the imaging system can include, for example, the image capture and processing system 100, the image capture device 105A, the image processing device 105B, the image processor 150, the ISP 154, the host processor 152, the digital asset tracking system 200, the media device 205, the network device(s) 280, the local device(s) 270, the additional device(s) 297, the data store(s) 298, the anchor element(s) 299, the HMD 310, the mobile handset 410, the media device 810, the local device 830, the media device 910, the local device 930, the media device 1010, the local device 1030, the media device 1110, the local device 1130, the ownership device 1210, the local device 1230, the media device 1310, the distributed ledger 1365, the data store(s) 1370, the token device 1405, one or more of the computing systems of FIG. 15A, one or more of the computing systems of FIG. 15B, the digital asset management system that performs the process 1600, the digital asset tracking system that performs the process 1650, the digital asset management system that performs the process 1700, the computing system 1900, the processor 1910, or a combination thereof.

At operation 1805, the digital asset management system is configured to, and can, identify, in a payload of at least one block of a distributed ledger, a token corresponding to media content. A parameter of the token in the distributed ledger indicates that the token is associated with a first user. Examples of the token can include the token 600, the token 860, the token 960, the token 1060, the token 1160, the token 1260, the token 1360, the token 1420, or a combination thereof. Examples of the distributed ledger include the distributed ledger 295, the blockchain ledger 500, the DAG ledger 700, the distributed ledger 1365, the distributed ledger 1415, a distributed ledger corresponding to the smart contract of FIGS. 15A-15B, or a combination thereof. Examples of a block include block A 505, block B 535, block C 565, block 710, block 720, block 730, block 740, block 750, block 760, or a combination thereof. Examples of a payload include the Block A payload 530, the Block B payload 560, and the Block C payload 590. The token can be a non-fungible token (NFT).

At operation 1810, the digital asset management system is configured to, and can, identify a device that is associated with the token and the media content. The device is associated with the first user. Examples of the device include the image capture and processing system 100, the image capture device 105A, the image processing device 105B, media device 205, the HMD 310, the mobile handset 410, the media device 810, the media device 910, the media device 1010, the media device 1110, the ownership device 1210, the media device 1310, the distributed ledger 1365, the data store(s) 1370, the token device 1405, the computing systems of FIGS. 15A-15B, the computing system 1900, or a combination thereof. Examples of the first user include the user 320, the user 805, the user 905, the user 1005, the user 1105, the user 1205, the user 1305, the first user 1410, and/or the second user 1430.

In some examples, the device is configured to present the media content. For instance, the device can be configured to display the media content, for instance as illustrated with respect to the token device 1405 displaying the digital asset 1425 corresponding to the token 1420.

In some examples, an identifier of the device is stored in the distributed ledger (e.g., distributed ledger 295, the blockchain ledger 500, the DAG ledger 700, the distributed ledger 1365, the distributed ledger 1415, a distributed ledger corresponding to the smart contract of FIGS. 15A-15B, or a combination thereof) and/or in a data store (e.g., data store(s) 298, the data structure(s) 650, and/or the data store(s) 1370), and identifying the device is based on the identifier. For instance, the In some examples, the device includes an interactive element that is indicative of the token, and identifying the token in operation 1805 is based on an interaction with the interactive element. In some examples, the interaction includes an optical glyph, and an identifier of the token is optically encoded based on the optical glyph. In some examples, the optical glyph includes one or more QR codes, bar codes, Aztec codes, dot codes, data matrices, shotcodes, or combinations thereof. Interaction with an interactive element that includes an optical glyph can include scanning the optical glyph to decode information (e.g. a uniform resource locator (URL) and/or uniform resource identifier (URI)) optically encoded therein. The interactive element can include a short-range wireless communication transceiver, such as a transceiver for near-field communication (NFC), radio frequency identification (RFID), Bluetooth®, WLAN, PAN, or some combination thereof. Interaction with an interactive element that includes a short-range wireless communication transceiver can include communicating with the short-range wireless communication transceiver (e.g., sending and/or receiving one or more wireless signals to and/or from the short-range wireless communication transceiver).

In some examples, the digital asset management system is configured to, and can, receive image data, detect that the device is represented in the image data. In some examples, the digital asset management system can identify the token in operation 1805 based on detecting that the device is represented in the image data. For instance, in some examples, the digital asset management system may detect and/or recognize the device in the image data based on comparison(s) to reference image data depicting the device and/or the media content. In some examples, the digital asset management system may detect and/or recognize an element on the device, such as an optical glyph, by scanning the optical glyph to decode information (e.g. a uniform resource locator (URL) and/or uniform resource identifier (URI)) optically encoded therein.

At operation 1815, the digital asset management system is configured to, and can, identify that the device has been relocated to an area associated with a second user. Examples of the second user include the user 320, the user 805, the user 905, the user 1005, the user 1105, the user 1205, the user 1305, the first user 1410, and/or the second user 1430. In an illustrative example, the first user of operation 1810 is the first user 1410 of FIG. 14, and the second user of operation 1815 is the second user 1430 of FIG. 14. In another illustrative example, the first user of operation 1810 is the second user 1430 of FIG. 14, and the second user of operation 1815 is the first user 1410 of FIG. 14.

In some examples, identifying that the device has been relocated to the area associated with the second user includes identifying that one or more additional devices located in the area are associated with the second user. For instance, other devices (e.g., other token devices, media devices, and/or computing systems) in the area associated with the second user can include information indicating that these devices belong to the second user and/or are associated with the second user. The device may communicate with these one or more additional devices to obtain this information, and the digital asset management system can identify the relocation based on these communications.

In some examples, identifying that the device has been relocated to the area associated with the second user includes identifying that a wireless local area network (WLAN) in the area is associated with the second user. For instance, the device may include a wireless network transceiver that may search for and/or connect to WLAN networks, and that may be able to locate and/or connect to the WLAN that is associated with the second user in the area that that is associated with the second user, and the digital asset management system can identify the relocation based on the device detecting and/or connecting to this WLAN.

In some examples, identifying that the device has been relocated to the area associated with the second user includes determining that position data from at least one position sensor of the device indicates that the device is located in the area, and wherein the area is a geographic area.

In some examples, identifying that the device has been relocated to the area associated with the second user includes determining that position data from at least one position sensor of the device indicates that the device is located within a range of a location of the second user, wherein the area associated with the second user is within the range of the location of the second user. For instance, the device may include a position sensor (e.g., the positioning sensors 820, the positioning sensors 920, the positioning sensors 1020, the positioning sensors 1120, the positioning sensors 1220, the positioning sensors 1320, or a combination thereof) such as a GNSS positioning receiver. The position sensor of the device can identify a position of the device, and the digital asset management system can identify the relocation based on whether or not the position of the device is in a predetermined geographic area associated with the second user.

In some examples, identifying that the device has been relocated to the area associated with the second user includes identifying that the device has been relocated from a first area associated with the first user. For instance, when the token device 1405 is relocated to an area associated with the second user 1430, the token device 1405 is also relocated from an area associated with the first user 1410. The detection that the device has been relocated from a first area associated with the first user can be based on any of the types of detections listed above with respect to detecting that the device has been relocated to the area associated with the second user. For instance, the digital asset management system can identify the relocation from the first area based on the device no longer being able to communicate with other device(s) associated with the first user in the first area, based on the device no longer being able to detect and/or connect to a WLAN associated with the first user and/or in the first area, based on a position sensor of the user indicating a position that is no longer within a predetermined geographic area associated with the first user, or a combination thereof.

At operation 1820, in response to identifying that the device has been relocated to the area at operation 1815, the digital asset management system is configured to, and can, cause the parameter (e.g., token ownership 620, token smart contract(s) 645) of the token in the distributed ledger to be modified from indicating that the token is associated with the first user to indicating that the token is associated with the second user. For instance, the digital asset management system is can modify the parameter from indicating that the token is associated with the first user 1410 to indicating that the token is associated with the second user 1430.

In some examples, causing the parameter of the token in the distributed ledger to be modified includes causing a new block to be appended to the distributed ledger. The parameter of the token in the distributed ledger can be modified based on a payload of the new block. In some examples, causing the new block to be appended to the distributed ledger includes generating the new block.

In some examples, the digital asset management system is configured to, and can, send, to a first user device associated with the first user, a request for authorization to modify the parameter of the token in the distributed ledger from indicating that the token is associated with the first user to indicating that the token is associated with the second user. The digital asset management system can receive the authorization from the first user device. In some examples, the digital asset management system causes the parameter to change in operation 1820 in response to receiving this authorization from the first user device.

In some examples, the digital asset management system is configured to, and can, send, to a second user device associated with the second user, a request for authorization to modify the parameter of the token in the distributed ledger from indicating that the token is associated with the first user to indicating that the token is associated with the second user. The digital asset management system can receive the authorization from the second user device. In some examples, the digital asset management system causes the parameter to change in operation 1820 in response to receiving this authorization from the second user device.

In some examples, the digital asset management system is configured to, and can, identify, in the distributed ledger, a smart contract associated with the token. The smart contract indicates that the parameter of the token is to be modified responsive a condition. Causing the parameter of the token in the distributed ledger to be modified as in operation 1820 can include executing the smart contract in response to identifying the condition. Identifying the condition is based on identifying that the device has been relocated to the area associated with the second user. Examples of the smart contract include the token smart contract(s) 645, the smart contract of FIGS. 15A-15B, or a combination thereof. The smart contract can be indicated in the distributed ledger. Examples of the condition include the condition of FIG. 15B.

In some examples, the digital asset management system that performs the process 1800 can include at least one of a head-mounted display (HMD) (e.g., HMD 310), a mobile handset (e.g., mobile handset 410), a wireless communication device, or a combination thereof.

In some examples, the digital asset management system includes means for identifying, in a payload of at least one block of a distributed ledger, a token corresponding to media content, wherein a parameter of the token in the distributed ledger indicates that the token is associated with a first user; identifying a device that is associated with the token and the media content, wherein the device is associated with the first user; identifying that the device has been relocated to an area associated with a second user; and means for causing, in response to identifying that the device has been relocated to the area, the parameter of the token in the distributed ledger to be modified from indicating that the token is associated with the first user to indicating that the token is associated with the second user.

In some examples, the means for identifying the token, and/or for causing the parameter of the token to be modified, include the digital asset tracking system 200, the media device 205, the network device(s) 280, the local device(s) 270, the additional device(s) 297, the data store(s) 298, the anchor element(s) 299, the HMD 310, the mobile handset 410, the blockchain ledger 500, the token 600, the data structures 650, the DAG ledger 700, the media device 810, the local device 830, the media device 910, the local device 930, the media device 1010, the local device 1030, the media device 1110, the local device 1130, the ownership device 1210, the local device 1230, the media device 1310, the anchor element 1350, the distributed ledger 1365, the data store(s) 1370, the token device 1405, the distributed ledger 1415, the token 1420, the local device 1435, one or more of the computing systems of FIG. 15A, one or more of the computing systems of FIG. 15B, the computing system 1900, or a combination thereof.

In some examples, the means for identifying the device, and/or for identifying that the device has been relocated to the area associated with the second user, include the digital asset tracking system 200, the media device 205, the network device(s) 280, the local device(s) 270, the additional device(s) 297, the data store(s) 298, the anchor element(s) 299, the HMD 310, the mobile handset 410, the blockchain ledger 500, the token 600, the data structures 650, the DAG ledger 700, the media device 810, the local device 830, the media device 910, the local device 930, the media device 1010, the local device 1030, the media device 1110, the local device 1130, the ownership device 1210, the local device 1230, the media device 1310, the anchor element 1350, the distributed ledger 1365, the data store(s) 1370, the token device 1405, the distributed ledger 1415, the token 1420, the local device 1435, one or more of the computing systems of FIG. 15A, one or more of the computing systems of FIG. 15B, the computing system 1900, or a combination thereof.

In some examples, the processes described herein (e.g., process 1650 and/or other process described herein) may be performed by a computing device or apparatus. In some examples, the process 1650 can be performed by the digital asset tracking system 200 of FIG. 2. In some examples, the process 1650 can be performed by the media device 205, the network device 280, the local device 270, or a combination thereof. In another example, the process 1650 can be performed by a computing device with the computing system 1900 shown in FIG. 19.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the process 1600. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 1650 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1650 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 19:
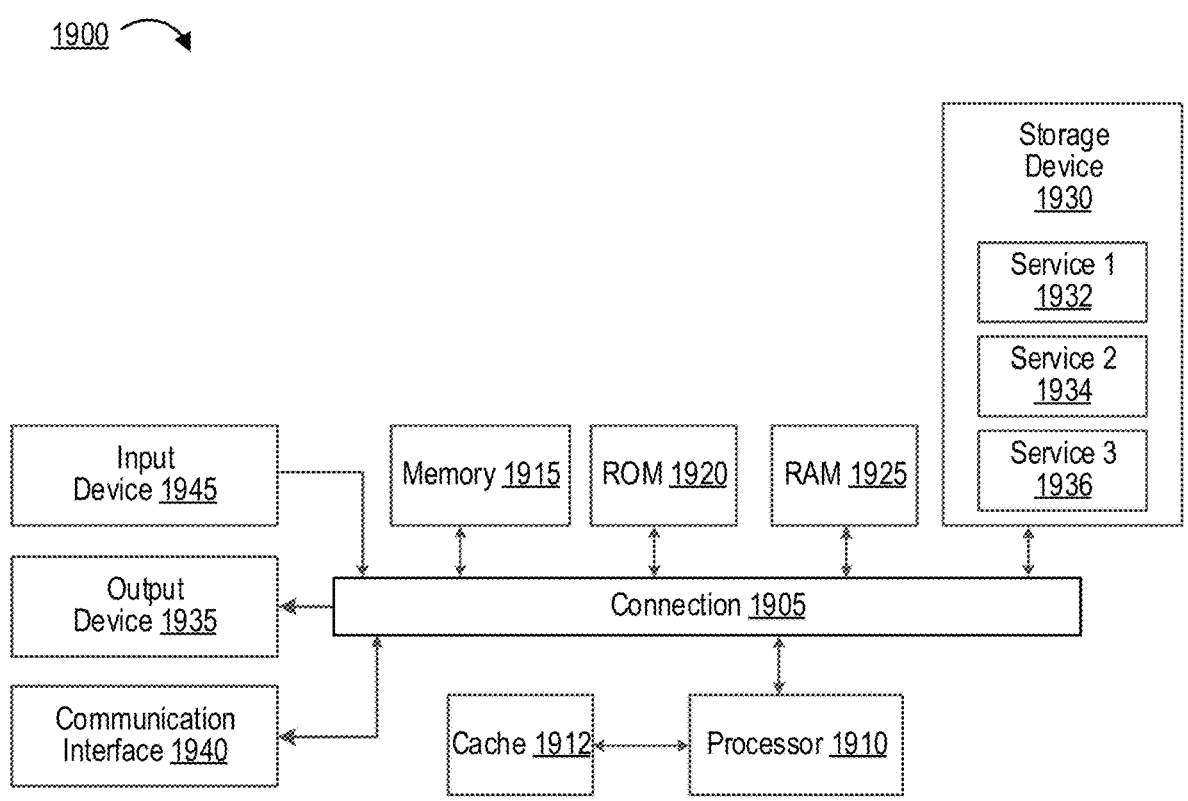
FIG. 19 is a diagram illustrating an example of a computing system for implementing certain aspects described herein.

FIG. 19 is a diagram illustrating an example of a system for implementing certain aspects of the present technology. In particular, FIG. 19 illustrates an example of computing system 1900, which can be for example any computing device making up internal computing system, a remote computing system, a camera, or any component thereof in which the components of the system are in communication with each other using connection 1905. Connection 1905 can be a physical connection using a bus, or a direct connection into processor 1910, such as in a chipset architecture. Connection 1905 can also be a virtual connection, networked connection, or logical connection.

In some embodiments, computing system 1900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1900 includes at least one processing unit (CPU or processor) 1910 and connection 1905 that couples various system components including system memory 1915, such as read-only memory (ROM) 1920 and random access memory (RAM) 1925 to processor 1910. Computing system 1900 can include a cache 1912 of high-speed memory connected directly with, in close proximity to, or integrated as part of processor 1910.

Processor 1910 can include any general purpose processor and a hardware service or software service, such as services 1932, 1934, and 1936 stored in storage device 1930, configured to control processor 1910 as well as a special-purpose processor where software instructions are incorporated into the actual processor design. Processor 1910 may essentially be a completely self-contained computing system, containing multiple cores or processors, a bus, memory controller, cache, etc. A multi-core processor may be symmetric or asymmetric.

To enable user interaction, computing system 1900 includes an input device 1945, which can represent any number of input mechanisms, such as a microphone for speech, a touch-sensitive screen for gesture or graphical input, keyboard, mouse, motion input, speech, etc. Computing system 1900 can also include output device 1935, which can be one or more of a number of output mechanisms. In some instances, multimodal systems can enable a user to provide multiple types of input/output to communicate with computing system 1900. Computing system 1900 can include communications interface 1940, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1940 may also include one or more Global Navigation Satellite System (GNSS) receivers or transceivers that are used to determine a location of the computing system 1900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based Bei-Dou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 1930 can include software services, servers, services, etc., that when the code that defines such software is executed by the processor 1910, it causes the system to perform a function. In some embodiments, a hardware service that performs a particular function can include the software component stored in a computer-readable medium in connection with the necessary hardware components, such as processor 1910, connection 1905, output device 1935, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to (" ") and greater than or equal to (" ") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1A. An apparatus for token generation, the apparatus comprising: at least one memory; and at least one processor coupled to the at least one memory, the at least one processor configured to: receive media content that is based on sensor data captured by at least one sensor of a media device; determine a position of the media device; determine that the position of the media device is within a geographic area; and in response to determining that the position of the media device is within the geographic area, generate a token corresponding to the media content, wherein a payload of at least one block of a distributed ledger identifies the token.

Aspect 2A. The apparatus of Aspect 1A, wherein the media content includes at least a portion of the sensor data.

Aspect 3A. The apparatus of any of Aspects 1A to 2A, wherein the media content includes a modified variant of at least a portion of the sensor data.

Aspect 4A. The apparatus of any of Aspects 1A to 3A, wherein the sensor data includes at least one image captured by at least one image sensor of the at least one sensor of the media device, and wherein the media content is based on at least one of the at least one image.

Aspect 5A. The apparatus of any of Aspects 1A to 4A, wherein, to determine the position of the media device, the at least one processor is configured to: detect at least a portion of an environment in the at least one image, and determine the position of the media device based at least in part on detection of at least the portion of the environment in the at least one image.

Aspect 6A. The apparatus of any of Aspects 1A to 5A, wherein, to determine that the position of the media device is within the geographic area, the at least one processor is configured to: detect at least a portion of an environment in the at least one image, and determine that at least the portion of the environment is located within the geographic area.

Aspect 7A. The apparatus of any of Aspects 1A to 6A, wherein the at least one processor is configured to: detect at least a portion of an individual in the at least one image;

determine an identity of the individual; and set a parameter of the token to indicate that the token is associated with the identity.

Aspect 8A. The apparatus of any of Aspects 1A to 7A, wherein the sensor data includes positioning data that is based on receipt of at least one wireless signal by the at least one sensor, wherein, to determine the position of the media device, the at least one processor is configured to determine the position of the media device at least in part based on the positioning data.

Aspect 9A. The apparatus of any of Aspects 1A to 8A, wherein the at least one wireless signal includes a short-range wireless signal from a local device that is within a transmission range of the media device at least during receipt of the at least one wireless signal by the at least one sensor.

Aspect 10A. The apparatus of any of Aspects 1A to 9A, wherein the at least one wireless signal includes a global navigation satellite system (GNSS) signal from a GNSS satellite.

Aspect 11A. The apparatus of any of Aspects 1A to 10A, wherein the media content includes a map of the geographic area.

Aspect 12A. The apparatus of any of Aspects 1A to 11A, wherein, to determine that the position of the media device is within the geographic area, the at least one processor is configured to determine that the position of the media device is within the geographic area based on at least one communication between the media device and a local device associated with the geographic area.

Aspect 13A. The apparatus of any of Aspects 1A to 12A, wherein the apparatus includes the local device.

Aspect 14A. The apparatus of any of Aspects 1A to 13A, wherein the apparatus includes the media device.

Aspect 15A. The apparatus of any of Aspects 1A to 14A, wherein the apparatus is in the geographic area.

Aspect 16A. The apparatus of any of Aspects 1A to 15A, wherein the at least one processor is configured to: in response to determining that the position of the media device is within the geographic area, generate the at least one block; and cause the at least one block to be appended to the distributed ledger.

Aspect 17A. The apparatus of any of Aspects 1A to 16A, wherein the at least one block includes a hash of at least a portion of a prior block of the distributed ledger.

Aspect 18A. The apparatus of any of Aspects 1A to 17A, wherein the at least one processor is configured to: in response to determining that the position of the media device is within the geographic area, generate the distributed ledger.

Aspect 19A. The apparatus of any of Aspects 1A to 18A, wherein the at least one processor is configured to: in response to determining that the position of the media device is within the geographic area, transmit a request to generate the at least one block to a computing device; receive the at least one block; and append the at least one block to the distributed ledger.

Aspect 20A. The apparatus of any of Aspects 1A to 19A, wherein the at least one processor is configured to: set a parameter of the token to indicate that the token is associated with a user, wherein the media device is associated with the user.

Aspect 21A. The apparatus of any of Aspects 1A to 20A, wherein the at least one processor is configured to: determine, based on the sensor data, that the geographic area includes at least a threshold amount of people, wherein the at least one processor is configured to generate the token corresponding to the media content in response to determining that the geographic area includes at least the threshold amount of people.

Aspect 22A. The apparatus of any of Aspects 1A to 21A, wherein the apparatus includes at least one of a head-mounted display (HMD), a mobile handset, or a wireless communication device.

Aspect 23A. A method of token generation, the method comprising: receiving media content that is based on sensor data captured by at least one sensor of a media device; determining a position of the media device; determining that the position of the media device is within a geographic area; and in response to determining that the position of the media device is within the geographic area, generating a token corresponding to the media content, wherein a payload of at least one block of a distributed ledger identifies the token.

Aspect 24A. The method of Aspect 23A, wherein the media content includes at least a portion of the sensor data.

Aspect 25A. The method of any of Aspects 23A to 24A, wherein the media content includes a modified variant of at least a portion of the sensor data.

Aspect 26A. The method of any of Aspects 23A to 25A, wherein the sensor data includes at least one image captured by at least one image sensor of the at least one sensor of the media device, and wherein the media content is based on at least one of the at least one image.

Aspect 27A. The method of any of Aspects 23A to 26A, wherein determining the position of the media device includes: detecting at least a portion of an environment in the at least one image, and determining the position of the media device based at least in part on detection of at least the portion of the environment in the at least one image.

Aspect 28A. The method of any of Aspects 23A to 27A, wherein determining that the position of the media device is within the geographic area includes: detecting at least a portion of an environment in the at least one image, and determining that at least the portion of the environment is located within the geographic area.

Aspect 29A. The method of any of Aspects 23A to 28A, further comprising: detecting at least a portion of an individual in the at least one image; determining an identity of the individual; and setting a parameter of the token to indicate that the token is associated with the identity.

Aspect 30A. The method of any of Aspects 23A to 29A, wherein the sensor data includes positioning data that is based on receipt of at least one wireless signal by the at least one sensor, and wherein determining the position of the media device includes determine the position of the media device at least in part based on the positioning data.

Aspect 31A. The method of any of Aspects 23A to 30A, wherein the at least one wireless signal includes a short-range wireless signal from a local device that is within a transmission range of the media device at least during receipt of the at least one wireless signal by the at least one sensor.

Aspect 32A. The method of any of Aspects 23A to 31A, wherein the at least one wireless signal includes a global navigation satellite system (GNSS) signal from a GNSS satellite.

Aspect 33A. The method of any of Aspects 23A to 32A, wherein the media content includes a map of the geographic area.

Aspect 34A. The method of any of Aspects 23A to 33A, wherein determining that the position of the media device is within the geographic area includes determining that the position of the media device is within the geographic area based on at least one communication between the media device and a local device associated with the geographic area.

Aspect 35A. The method of any of Aspects 23A to 34A, wherein the method is performed using an apparatus that includes the local device.

Aspect 36A. The method of any of Aspects 23A to 35A, wherein the method is performed using an apparatus that includes the media device.

Aspect 37A. The method of any of Aspects 23A to 36A, wherein the method is performed using an apparatus that is in the geographic area.

Aspect 38A. The method of any of Aspects 23A to 37A, further comprising: in response to determining that the position of the media device is within the geographic area, generating the at least one block; and causing the at least one block to be appended to the distributed ledger.

Aspect 39A. The method of any of Aspects 23A to 38A, wherein the at least one block includes a hash of at least a portion of a prior block of the distributed ledger.

Aspect 40A. The method of any of Aspects 23A to 39A, further comprising: in response to determining that the position of the media device is within the geographic area, generating the distributed ledger.

Aspect 41A. The method of any of Aspects 23A to 40A, further comprising: in response to determining that the position of the media device is within the geographic area, transmitting a request to generate the at least one block to a computing device; receiving the at least one block; and appending the at least one block to the distributed ledger.

Aspect 42A. The method of any of Aspects 23A to 41A, further comprising: setting a parameter of the token to indicate that the token is associated with a user, wherein the media device is associated with the user.

Aspect 43A. The method of any of Aspects 23A to 42A, further comprising: determining that the geographic area includes at least a threshold amount of people, wherein generating the token corresponding to the media content is performed in response to determining that the geographic area includes at least the threshold amount of people.

Aspect 44A. The method of any of Aspects 23A to 43A, wherein the method is performed using an apparatus that includes at least one of a head-mounted display (HMD), a mobile handset, or a wireless communication device.

Aspect 45A. A non-transitory computer-readable medium having stored thereon instructions that, when executed by one or more processors, cause the one or more processors to: receive media content that is based on sensor data captured by at least one sensor of a media device; determine a position of the media device; determine that the position of the media device is within a geographic area; and in response to determining that the position of the media device is within the geographic area, generate a token corresponding to the media content, wherein a payload of at least one block of a distributed ledger identifies the token.

Aspect 46A. The non-transitory computer-readable medium of Aspect 45A, further comprising operations according to any of Aspects 2A to 22A, and/or any of Aspects 24A to 44A.

Aspect 47A. An apparatus for token generation, the apparatus comprising: means for receiving media content that is based on sensor data captured by at least one sensor of a media device; means for determining a position of the media device; means for determining that the position of the media device is within a geographic area; and means for generating a token corresponding to the media content in response to determining that the position of the media device is within the geographic area, wherein a payload of at least one block of a distributed ledger identifies the token.

Aspect 48A. The apparatus of claim 47A, further comprising means for performing operations according to any of Aspects 2A to 22A, and/or any of Aspects 24A to 44A.

Aspect 1B. An apparatus for situational token-associated media output, the apparatus comprising: at least one memory; and at least one processor coupled to the at least one memory, the at least one processor configured to: receive sensor data captured by at least one sensor of a media device; identify, based on the sensor data, a relationship between the media device and an anchor element that is associated with a token; identify the token in a payload of at least one block of a distributed ledger, wherein the token corresponds to media content according to the distributed ledger; generate a representation of the media content corresponding to the token; and in response to identifying the relationship between the media device and the anchor element, output the representation of the media content.

Aspect 2B. The apparatus of Aspect 1B, wherein the sensor data includes image data captured by at least one image sensor of the at least one sensor of the media device, wherein the anchor element includes an object, and wherein, to identify the relationship between the media device and the anchor element, the at least one processor is configured to identify that the image data depicts the object.

Aspect 3B. The apparatus of any of Aspects 1B to 2B, wherein the object includes an optical glyph, wherein information indicative of the token is optically encoded based on the optical glyph.

Aspect 4B. The apparatus of any of Aspects 1B to 3B, wherein reference image data depicting the object is stored in a data store, and wherein, to identify that the image data depicts the object, the at least one processor is configured to compare the image data to the reference image data.

Aspect 5B. The apparatus of any of Aspects 1B to 4B, wherein the sensor data includes position data indicative of a position of the media device, wherein the anchor element includes an area, and wherein, to identify the relationship between the media device and the anchor element, the at least one processor is configured to identify that the position of the media device is within the area.

Aspect 6B. The apparatus of any of Aspects 1B to 5B, wherein the sensor data includes position data indicative of a position of the media device, wherein the anchor element includes a location, and wherein, to identify the relationship between the media device and the anchor element, the at least one processor is configured to identify that the position of the media device is within a threshold range of the location.

Aspect 7B. The apparatus of any of Aspects 1B to 6B, wherein the sensor data includes audio data captured by at least one microphone of the at least one sensor of the media device, wherein the anchor element includes a sound, and wherein, to identify the relationship between the media device and the anchor element, the at least one processor is configured to identify that the audio data includes the sound.

Aspect 8B. The apparatus of any of Aspects 1B to 7B, wherein, to output the representation of the media content, the at least one processor is configured to cause a display to display at least a portion of the media content.

Aspect 9B. The apparatus of any of Aspects 1B to 8B, wherein the at least one processor is configured to: identify a media device pose of the media device based on the sensor data; and determine a media content pose for the media content based on the media device pose of the media device, wherein, to cause the display to display at least the portion of the media content, the at least one processor is configured to output the representation of the media content posed according to the media content pose.

Aspect 10B. The apparatus of any of Aspects 1B to 9, wherein the at least one processor is configured to: identify, based on the distributed ledger, that a parameter of the token indicates that the token is associated with a first user; determine a visual effect for the media content based on parameter of the token indicating that the token is associated with the first user; and apply the visual effect to the media content, wherein, to output the representation of the media content, the at least one processor is configured to output the representation of the media content with the visual effect applied.

Aspect 11B. The apparatus of any of Aspects 1B to 10B, wherein the at least one processor is configured to: determine, based on a data store, that the first user and a second user are associated according to a relationship type, wherein the media device is associated with the second user, and wherein the visual effect for the media content corresponds to the relationship type.

Aspect 12B. The apparatus of any of Aspects 1B to 11B, wherein the at least one processor is configured to: determine that the media device is associated with the first user, and wherein the visual effect for the media content corresponds the first user.

Aspect 13B. The apparatus of any of Aspects 1B to 12B, wherein the at least one processor is configured to: determine, based on a data store, that the first user is a famous person, and wherein the visual effect for the media content corresponds the first user being the famous person.

Aspect 14B. The apparatus of any of Aspects 1B to 13B, wherein the at least one processor is configured to: determine, based on a data store, a rating associated with the media content, and wherein the visual effect for the media content corresponds the rating.

Aspect 15B. The apparatus of any of Aspects 1B to 14B, wherein the at least one processor is configured to: determine that the token is identified in a data store, and wherein the visual effect for the media content corresponds to the data store.

Aspect 16B. The apparatus of any of Aspects 1B to 15B, wherein the at least one processor is configured to: retrieve information about the token from the distributed ledger; and output the information about the token.

Aspect 17B. The apparatus of any of Aspects 1B to 16B, wherein, to output the information about the token, the at least one processor is configured to cause a display to display at least a portion of the information.

Aspect 18B. The apparatus of any of Aspects 1B to 17B, wherein the at least one processor is configured to: identify, based on the distributed ledger, that a parameter of the token indicates that the token is associated with a first user, wherein the information identifies the first user.

Aspect 19B. The apparatus of any of Aspects 1B to 18B, wherein the information identifies the distributed ledger.

Aspect 20B. The apparatus of any of Aspects 1B to 19B, wherein the at least one processor is configured to: identify, based on the distributed ledger, that a parameter of the token indicates that the token is associated with a smart contract, wherein the information identifies the smart contract.

Aspect 21B. The apparatus of any of Aspects 1B to 20B, wherein the at least one processor is configured to: identify, based on the distributed ledger, that a parameter of the token indicates an amount of instances of the token, wherein the information identifies the amount of instances of the token.

Aspect 22B. The apparatus of any of Aspects 1B to 21B, wherein the at least one processor is configured to: identify a transfer platform that is configured for token transfer; and output an interface element corresponding to the media content, wherein the interface element is configured to initiate a transfer of the token using the transfer platform upon interaction with the interface element.

Aspect 23B. The apparatus of any of Aspects 1B to 22B, wherein the apparatus includes at least one of a head-mounted display (HMD), a mobile handset, or a wireless communication device.

Aspect 24B. A method of situational token-associated media output, the method comprising: receiving sensor data captured by at least one sensor of a media device; identifying, based on the sensor data, a relationship between the media device and an anchor element that is associated with a token; identifying the token in a payload of at least one block of a distributed ledger, wherein the token corresponds to media content according to the distributed ledger; generating a representation of the media content corresponding to the token; and in response to identifying the relationship between the media device and the anchor element, outputting the representation of the media content.

Aspect 25B. The method of Aspect 24B, wherein the sensor data includes image data captured by at least one image sensor of the at least one sensor of the media device, wherein the anchor element includes an object, and wherein identifying the relationship between the media device and the anchor element includes identifying that the image data depicts the object.

Aspect 26B. The method of any of Aspects 24B to 25B, wherein the object includes an optical glyph, wherein information indicative of the token is optically encoded based on the optical glyph.

Aspect 27B. The method of any of Aspects 24B to 26B, wherein reference image data depicting the object is stored in a data store, and wherein identifying that the image data depicts the object includes comparing the image data to the reference image data.

Aspect 28B. The method of any of Aspects 24B to 27B, wherein the sensor data includes position data indicative of a position of the media device, wherein the anchor element includes an area, and wherein identifying the relationship between the media device and the anchor element includes identifying that the position of the media device is within the area.

Aspect 29B. The method of any of Aspects 24B to 28B, wherein the sensor data includes position data indicative of a position of the media device, wherein the anchor element includes a location, and wherein identifying the relationship between the media device and the anchor element includes identifying that the position of the media device is within a threshold range of the location.

Aspect 30B. The method of any of Aspects 24B to 29B, wherein the sensor data includes audio data captured by at least one microphone of the at least one sensor of the media device, wherein the anchor element includes a sound, and wherein identifying the relationship between the media device and the anchor element includes identifying that the audio data includes the sound.

Aspect 31B. The method of any of Aspects 24B to 30B, wherein outputting the representation of the media content includes causing a display to display at least a portion of the media content.

Aspect 32B. The method of any of Aspects 24B to 31B, further comprising: identifying a media device pose of the media device based on the sensor data; and determining a media content pose for the media content based on the media device pose of the media device, wherein outputting the representation of the media content includes outputting the representation of the media content posed according to the media content pose.

Aspect 33B. The method of any of Aspects 24B to 32B, further comprising: identifying, based on the distributed ledger, that a parameter of the token indicates that the token is associated with a first user; determining a visual effect for the media content based on parameter of the token indicating that the token is associated with the first user; and applying the visual effect to the media content, wherein outputting the representation of the media content includes outputting the representation of the media content with the visual effect applied.

Aspect 34B. The method of any of Aspects 24B to 33B, further comprising: determining, based on a data store, that the first user and a second user are associated according to a relationship type, wherein the media device is associated with the second user, and wherein the visual effect for the media content corresponds to the relationship type.

Aspect 35B. The method of any of Aspects 24B to 34B, further comprising: determine that the media device is associated with the first user, and wherein the visual effect for the media content corresponds the first user.

Aspect 36B. The method of any of Aspects 24B to 35B, further comprising: determining, based on a data store, that the first user is a famous person, and wherein the visual effect for the media content corresponds the first user being the famous person.

Aspect 37B. The method of any of Aspects 24B to 36B, further comprising: determining, based on a data store, a rating associated with the media content, and wherein the visual effect for the media content corresponds the rating.

Aspect 38B. The method of any of Aspects 24B to 37B, further comprising: determining that the token is identified in a data store, and wherein the visual effect for the media content corresponds to the data store.

Aspect 39B. The method of any of Aspects 24B to 38B, further comprising: retrieving information about the token from the distributed ledger; and outputting the information about the token.

Aspect 40B. The method of any of Aspects 24B to 39B, wherein outputting the information about the token includes causing a display to display at least a portion of the information.

Aspect 41B. The method of any of Aspects 24B to 40B, further comprising: identifying, based on the distributed ledger, that a parameter of the token indicates that the token is associated with a first user, wherein the information identifies the first user.

Aspect 42B. The method of any of Aspects 24B to 41B, wherein the information identifies the distributed ledger.

Aspect 43B. The method of any of Aspects 24B to 42B, further comprising: identifying, based on the distributed ledger, that a parameter of the token indicates that the token is associated with a smart contract, wherein the information identifies the smart contract.

Aspect 44B. The method of any of Aspects 24B to 43B, further comprising: identifying, based on the distributed ledger, that a parameter of the token indicates an amount of instances of the token, wherein the information identifies the amount of instances of the token.

Aspect 45B. The method of any of Aspects 24B to 44B, further comprising: identifying a transfer platform that is configured for token transfer; and outputting an interface element corresponding to the media content, wherein the interface element is configured to initiate a transfer of the token using the transfer platform upon interaction with the interface element.

Aspect 46B. The method of any of Aspects 24B to 45B, wherein the method is performed using an apparatus that includes at least one of a head-mounted display (HMD), a mobile handset, or a wireless communication device.

Aspect 47B. A non-transitory computer-readable medium having stored thereon instructions that, when executed by one or more processors, cause the one or more processors to: receive sensor data captured by at least one sensor of a media device; identify, based on the sensor data, a relationship between the media device and an anchor element that is associated with a token; identify the token in a payload of at least one block of a distributed ledger, wherein the token corresponds to media content according to the distributed ledger; generate a representation of the media content corresponding to the token; and in response to identifying the relationship between the media device and the anchor element, output the representation of the media content.

Aspect 48B. The non-transitory computer-readable medium of Aspect 47B, further comprising operations according to any of Aspects 2B to 24B, and/or any of Aspects 25B to 46A.

Aspect 49B. An apparatus for situational token-associated media output, the apparatus comprising: means for receiving sensor data captured by at least one sensor of a media device; means for identifying, based on the sensor data, a relationship between the media device and an anchor element that is associated with a token; means for identifying the token in a payload of at least one block of a distributed ledger, wherein the token corresponds to media content according to the distributed ledger; means for generating a representation of the media content corresponding to the token; and means for outputting the representation of the media content in response to identifying the relationship between the media device and the anchor element.

Aspect 50B. The apparatus of Aspect 49B, further comprising means for performing operations according to any of Aspects 2B to 24B, and/or any of Aspects 25B to 46A.

Aspect 1C. An apparatus for situational token-associated media output, the apparatus comprising: at least one memory; and at least one processor coupled to the at least one memory, the at least one processor configured to: receive sensor data captured by at least one sensor of a media device; identify, based on the sensor data, a relationship between the media device and an anchor element that is associated with a token; identify the token in a payload of at least one block of a distributed ledger, wherein the token corresponds to media content according to the distributed ledger; generate a representation of the media content corresponding to the token; and in response to identifying the relationship between the media device and the anchor element, output the representation of the media content.

Aspect 2C. The apparatus of Aspect 1C, wherein the sensor data includes image data captured by at least one image sensor of the at least one sensor of the media device, wherein the anchor element includes an object, and wherein, to identify the relationship between the media device and the anchor element, the at least one processor is configured to identify that the image data depicts the object.

Aspect 3C. The apparatus of any of Aspects 1C to 2C, wherein the object includes an optical glyph, wherein information indicative of the token is optically encoded based on the optical glyph.

Aspect 4C. The apparatus of any of Aspects 1C to 3C, wherein reference image data depicting the object is stored in a data store, and wherein, to identify that the image data depicts the object, the at least one processor is configured to compare the image data to the reference image data.

Aspect 5C. The apparatus of any of Aspects 1C to 4C, wherein the sensor data includes position data indicative of a position of the media device, wherein the anchor element includes an area, and wherein, to identify the relationship between the media device and the anchor element, the at least one processor is configured to identify that the position of the media device is within the area.

Aspect 6C. The apparatus of any of Aspects 1C to 5C, wherein the sensor data includes position data indicative of a position of the media device, wherein the anchor element includes a location, and wherein, to identify the relationship between the media device and the anchor element, the at least one processor is configured to identify that the position of the media device is within a threshold range of the location.

Aspect 7C. The apparatus of any of Aspects 1C to 6C, wherein the sensor data includes audio data captured by at least one microphone of the at least one sensor of the media device, wherein the anchor element includes a sound, and wherein, to identify the relationship between the media device and the anchor element, the at least one processor is configured to identify that the audio data includes the sound.

Aspect 8C. The apparatus of any of Aspects 1C to 7C, wherein, to output the representation of the media content, the at least one processor is configured to cause a display to display at least a portion of the media content.

Aspect 9C. The apparatus of any of Aspects 1C to 8C, wherein the at least one processor is configured to: identify a media device pose of the media device based on the sensor data; and determine a media content pose for the media content based on the media device pose of the media device, wherein, to cause the display to display at least the portion of the media content, the at least one processor is configured to output the representation of the media content posed according to the media content pose.

Aspect 10C. The apparatus of any of Aspects 1C to 9C, wherein the at least one processor is configured to: identify, based on the distributed ledger, that a parameter of the token indicates that the token is associated with a first user; determine a visual effect for the media content based on parameter of the token indicating that the token is associated with the first user; and apply the visual effect to the media content, wherein, to output the representation of the media content, the at least one processor is configured to output the representation of the media content with the visual effect applied.

Aspect 11C. The apparatus of any of Aspects 1C to 10C, wherein the at least one processor is configured to: determine, based on a data store, that the first user and a second user are associated according to a relationship type, wherein the media device is associated with the second user, and wherein the visual effect for the media content corresponds to the relationship type.

Aspect 12C. The apparatus of any of Aspects 1C to 11C, wherein the at least one processor is configured to: determine that the media device is associated with the first user, and wherein the visual effect for the media content corresponds the first user.

Aspect 13C. The apparatus of any of Aspects 1C to 12C, wherein the at least one processor is configured to: determine, based on a data store, that the first user is a famous person, and wherein the visual effect for the media content corresponds the first user being the famous person.

Aspect 14C. The apparatus of any of Aspects 1C to 13C, wherein the at least one processor is configured to: determine, based on a data store, a rating associated with the media content, and wherein the visual effect for the media content corresponds the rating.

Aspect 15C. The apparatus of any of Aspects 1C to 14C, wherein the at least one processor is configured to: determine that the token is identified in a data store, and wherein the visual effect for the media content corresponds to the data store.

Aspect 16C. The apparatus of any of Aspects 1C to 15C, wherein the at least one processor is configured to: retrieve information about the token from the distributed ledger; and output the information about the token.

Aspect 17C. The apparatus of any of Aspects 1C to 16C, wherein, to output the information about the token, the at least one processor is configured to cause a display to display at least a portion of the information.

Aspect 18C. The apparatus of any of Aspects 1C to 17C, wherein the at least one processor is configured to: identify, based on the distributed ledger, that a parameter of the token indicates that the token is associated with a first user, wherein the information identifies the first user.

Aspect 19C. The apparatus of any of Aspects 1C to 18C, wherein the information identifies the distributed ledger.

Aspect 20C. The apparatus of any of Aspects 1C to 19C, wherein the at least one processor is configured to: identify, based on the distributed ledger, that a parameter of the token indicates that the token is associated with a smart contract, wherein the information identifies the smart contract.

Aspect 21C. The apparatus of any of Aspects 1C to 20C, wherein the at least one processor is configured to: identify, based on the distributed ledger, that a parameter of the token indicates an amount of instances of the token, wherein the information identifies the amount of instances of the token.

Aspect 22C. The apparatus of any of Aspects 1C to 21C, wherein the at least one processor is configured to: identify a transfer platform that is configured for token transfer; and output an interface element corresponding to the media content, wherein the interface element is configured to initiate a transfer of the token using the transfer platform upon interaction with the interface element.

Aspect 23C. The apparatus of any of Aspects 1C to 22C, wherein the apparatus includes at least one of a head-mounted display (HMD), a mobile handset, or a wireless communication device.

Aspect 24C. A method of situational token-associated media output, the method comprising: receiving sensor data captured by at least one sensor of a media device; identifying, based on the sensor data, a relationship between the media device and an anchor element that is associated with a token; identifying the token in a payload of at least one block of a distributed ledger, wherein the token corresponds to media content according to the distributed ledger; generating a representation of the media content corresponding to the token; and in response to identifying the relationship between the media device and the anchor element, outputting the representation of the media content.

Aspect 25C. The method of Aspect 24C, wherein the sensor data includes image data captured by at least one image sensor of the at least one sensor of the media device, wherein the anchor element includes an object, and wherein identifying the relationship between the media device and the anchor element includes identifying that the image data depicts the object.

Aspect 26C. The method of any of Aspects 24C to 25C, wherein the object includes an optical glyph, wherein information indicative of the token is optically encoded based on the optical glyph.

Aspect 27C. The method of any of Aspects 24C to 26C, wherein reference image data depicting the object is stored in a data store, and wherein identifying that the image data depicts the object includes comparing the image data to the reference image data.

Aspect 28C. The method of any of Aspects 24C to 27C, wherein the sensor data includes position data indicative of a position of the media device, wherein the anchor element includes an area, and wherein identifying the relationship between the media device and the anchor element includes identifying that the position of the media device is within the area.

Aspect 29C. The method of any of Aspects 24C to 28C, wherein the sensor data includes position data indicative of a position of the media device, wherein the anchor element includes a location, and wherein identifying the relationship between the media device and the anchor element includes identifying that the position of the media device is within a threshold range of the location.

Aspect 30C. The method of any of Aspects 24C to 29C, wherein the sensor data includes audio data captured by at least one microphone of the at least one sensor of the media device, wherein the anchor element includes a sound, and wherein identifying the relationship between the media device and the anchor element includes identifying that the audio data includes the sound.

Aspect 31C. The method of any of Aspects 24C to 30C, wherein outputting the representation of the media content includes causing a display to display at least a portion of the media content.

Aspect 32C. The method of any of Aspects 24C to 31C, further comprising: identifying a media device pose of the media device based on the sensor data; and determining a media content pose for the media content based on the media device pose of the media device, wherein outputting the representation of the media content includes outputting the representation of the media content posed according to the media content pose.

Aspect 33C. The method of any of Aspects 24C to 32C, further comprising: identifying, based on the distributed ledger, that a parameter of the token indicates that the token is associated with a first user; determining a visual effect for the media content based on parameter of the token indicating that the token is associated with the first user; and applying the visual effect to the media content, wherein outputting the representation of the media content includes outputting the representation of the media content with the visual effect applied.

Aspect 34C. The method of any of Aspects 24C to 33C, further comprising: determining, based on a data store, that the first user and a second user are associated according to a relationship type, wherein the media device is associated with the second user, and wherein the visual effect for the media content corresponds to the relationship type.

Aspect 35C. The method of any of Aspects 24C to 34C, further comprising: determine that the media device is associated with the first user, and wherein the visual effect for the media content corresponds the first user.

Aspect 36C. The method of any of Aspects 24C to 35C, further comprising: determining, based on a data store, that the first user is a famous person, and wherein the visual effect for the media content corresponds the first user being the famous person.

Aspect 37C. The method of any of Aspects 24C to 36C, further comprising: determining, based on a data store, a rating associated with the media content, and wherein the visual effect for the media content corresponds the rating.

Aspect 38C. The method of any of Aspects 24C to 37C, further comprising: determining that the token is identified in a data store, and wherein the visual effect for the media content corresponds to the data store.

Aspect 39C. The method of any of Aspects 24C to 38C, further comprising: retrieving information about the token from the distributed ledger; and outputting the information about the token.

Aspect 40C. The method of any of Aspects 24C to 39C, wherein outputting the information about the token includes causing a display to display at least a portion of the information.

Aspect 41C. The method of any of Aspects 24C to 40C, further comprising: identifying, based on the distributed ledger, that a parameter of the token indicates that the token is associated with a first user, wherein the information identifies the first user.

Aspect 42C. The method of any of Aspects 24C to 41C, wherein the information identifies the distributed ledger.

Aspect 43C. The method of any of Aspects 24C to 42C, further comprising: identifying, based on the distributed ledger, that a parameter of the token indicates that the token is associated with a smart contract, wherein the information identifies the smart contract.

Aspect 44C. The method of any of Aspects 24C to 43C, further comprising: identifying, based on the distributed ledger, that a parameter of the token indicates an amount of instances of the token, wherein the information identifies the amount of instances of the token.

Aspect 45C. The method of any of Aspects 24C to 44C, further comprising: identifying a transfer platform that is configured for token transfer; and outputting an interface element corresponding to the media content, wherein the interface element is configured to initiate a transfer of the token using the transfer platform upon interaction with the interface element.

Aspect 46C. The method of any of Aspects 24C to 45C, wherein the method is performed using an apparatus that includes at least one of a head-mounted display (HMD), a mobile handset, or a wireless communication device.

Aspect 47C. A non-transitory computer-readable medium having stored thereon instructions that, when executed by one or more processors, cause the one or more processors to: receive sensor data captured by at least one sensor of a media device; identify, based on the sensor data, a relationship between the media device and an anchor element that is associated with a token; identify the token in a payload of at least one block of a distributed ledger, wherein the token corresponds to media content according to the distributed ledger; generate a representation of the media content corresponding to the token; and in response to identifying the relationship between the media device and the anchor element, output the representation of the media content.

Aspect 48C. The non-transitory computer-readable medium of Aspect 47C, further comprising operations according to any of Aspects 2C to 23C, and/or any of Aspects 25C to 46C.

Aspect 49C. An apparatus for situational token-associated media output, the apparatus comprising: means for receiving sensor data captured by at least one sensor of a media device; means for identifying, based on the sensor data, a relationship between the media device and an anchor element that is associated with a token; means for identifying the token in a payload of at least one block of a distributed ledger, wherein the token corresponds to media content according to the distributed ledger; means for generating a representation of the media content corresponding to the token; and means for outputting the representation of the media content in response to identifying the relationship between the media device and the anchor element.

Aspect 50C. The apparatus of Aspect 49C, further comprising means for performing operations according to any of Aspects 2C to 23C, and/or any of Aspects 25C to 46C.

Aspect 1D: An apparatus for processing image data, the apparatus comprising: a memory; and one or more processors coupled to the memory, the one or more processors configured to: receive media data that is based on sensor data captured by one or more sensors of a media device; receive positioning data that is indicative of a position of the media device at a time contemporaneous with capture of the sensor data by the one or more sensors of the media device; verify, based on the positioning data, that the position of the media device at the time contemporaneous with capture of the sensor data is within a geographic area; and generate a token corresponding to the media data automatically in response to verifying that the position of the media device is within the geographic area, the token being identified in a payload of a block of a distributed ledger.

Aspect 2D. The apparatus of Aspect 1D, wherein the media data is the sensor data.

Aspect 3D. The apparatus of any of Aspects 1D to 2D, wherein the media device generates the media data at least in part by modifying the sensor data to add virtual content to the sensor data.

Aspect 4D. The apparatus of any of Aspects 1D to 3D, wherein the sensor data includes one or more images captured by one or more image sensors of the one or more sensors of the media device, and wherein the media data is based on at least one of the one or more images.

Aspect 5D. The apparatus of any of Aspects 1D to 4D, wherein the sensor data includes the positioning data, the positioning data determined based on receipt of one or more positioning signals by a positioning receiver of the one or more sensors of the media device, and wherein the media data includes a map generated by the media device based on the positioning data.

Aspect 6D. The apparatus of any of Aspects 1D to 5D, wherein the sensor data includes secondary positioning data determined based on receipt of one or more positioning signals by a positioning receiver of the one or more sensors of the media device, and wherein the media data is a map generated by the media device based on the secondary positioning data.

Aspect 7D. The apparatus of any of Aspects 1D to 6D, wherein the one or more processors are configured to: generate the block for the distributed ledger automatically in response to verifying that the position of the media device is within the geographic area; and append the block to a plurality of blocks of the distributed ledger.

Aspect 8D. The apparatus of any of Aspects 1D to 7D, wherein the block includes a hash of at least a portion of a prior block of the distributed ledger.

Aspect 9D. The apparatus of any of Aspects 1D to 8D, wherein the block includes a Merkle root of a plurality of elements of the payload of the block, and wherein the token corresponds to at least one of the plurality of elements of the payload of the block.

Aspect 10D. The apparatus of any of Aspects 1D to 9D, wherein the one or more processors are configured to: generate the distributed ledger automatically in response to verifying that the position of the media device is within the geographic area.

Aspect 11D. The apparatus of any of Aspects 1D to 10D, the one or more processors configured to: transmit a request to generate the block for the distributed ledger to a block generation computing device automatically in response to verifying that the position of the media device is within the geographic area; receive the block from the block generation computing device; and append the block to a plurality of blocks of the distributed ledger.

Aspect 12D. The apparatus of any of Aspects 1D to 11D, wherein, to receive the positioning data, the one or more processors are configured to receive the positioning data from the media device, the positioning data being based on receipt of one or more positioning signals by a positioning receiver of the one or more sensors of the media device.

Aspect 13D. The apparatus of any of Aspects 1D to 12D, wherein, to receive the positioning data, the one or more processors are configured to receive the positioning data from a local device distinct from the media device, the positioning data being based on receipt of one or more positioning signals by a positioning receiver of the local device.

Aspect 14D. The apparatus of any of Aspects 5D, 6D, 12D, or 13D, wherein the positioning receiver is a short-range wireless communication receiver configured to receive one or more short-range wireless communication signals.

Aspect 15D. The apparatus of Aspect 14D, wherein the one or more short-range wireless communication signals are transmitted by a local device in the geographic area, and wherein the geographic area corresponds to a transmission range of the one or more short-range wireless communication signals by the local device.

Aspect 16D. The apparatus of any of Aspects 5D, 6D, or 12D to 15D, wherein the positioning receiver is a global navigation satellite system receiver configured to receive one or more GNSS signals from one or more satellites.

Aspect 17D. The apparatus of any of Aspects 1D to 16D, wherein the apparatus includes the local device.

Aspect 18D. The apparatus of any of Aspects 12D to 17D, wherein, to verify that the position of the media device at the time contemporaneous with capture of the sensor data is within the geographic area, the one or more processors are configured to verify content of one or more communications between the media device and a local device associated with the geographic area.

Aspect 19D. The apparatus of any of Aspects 1D to 18D, wherein the apparatus includes the media device.

Aspect 20D. The apparatus of any of Aspects 1D to 19D, wherein, to verify that the position of the media device at the time contemporaneous with capture of the sensor data is within the geographic area, the one or more processors are configured to verify that the sensor data depicts an object that is visible within the geographic area.

Aspect 21D. The apparatus of any of Aspects 1D to 20D, wherein the one or more processors are configured to: set an ownership of the token to an account associated with a user associated with the media device.

Aspect 22D. The apparatus of any of Aspects 1D to 21D, wherein the one or more processors are configured to: identify that the sensor data includes a representation of an individual having a recognized identity; and set an ownership of the token to an account associated with the individual having the recognized identity.

Aspect 23D. The apparatus of any of Aspects 1D to 22D, wherein the media device includes a head-mounted display.

Aspect 24D. The apparatus of any of Aspects 1D to 23D, wherein the media device includes a mobile handset.

Aspect 25D. The apparatus of any of Aspects 1D to 24D, wherein the media device includes a wearable device.

Aspect 26D. The apparatus of any of Aspects 1D to 25D, wherein the apparatus includes a head-mounted display.

Aspect 27D. The apparatus of any of Aspects 1D to 26D, wherein the apparatus includes a mobile handset.

Aspect 28D. The apparatus of any of Aspects 1D to 27D, wherein the apparatus includes a wearable device.

Aspect 29D. The apparatus of any of Aspects 1D to 28D, wherein the apparatus includes a server.

Aspect 30D. The apparatus of any of Aspects 1D to 29D, wherein the apparatus is in the geographic area.

Aspect 31D. A method for processing image data, the method comprising: receiving media data that is based on sensor data captured by one or more sensors of a media device; receiving positioning data that is indicative of a position of the media device at a time contemporaneous with capture of the sensor data by the one or more sensors of the media device; verifying, based on the positioning data, that the position of the media device at the time contemporaneous with capture of the sensor data is within a geographic area; and generating a token corresponding to the media data automatically in response to verifying that the position of the media device is within the geographic area, the token being identified in a payload of a block of a distributed ledger.

Aspect 32D. The method of Aspect 31D, wherein the media data is the sensor data.

Aspect 33D. The method of any of Aspects 31D to 32D, wherein the media device generates the media data at least in part by modifying the sensor data to add virtual content to the sensor data.

Aspect 34D. The method of any of Aspects 31D to 33D, wherein the sensor data includes one or more images captured by one or more image sensors of the one or more sensors of the media device, and wherein the media data is based on at least one of the one or more images.

Aspect 35D. The method of any of Aspects 31D to 34D, wherein the sensor data includes the positioning data, the positioning data determined based on receipt of one or more positioning signals by a positioning receiver of the one or more sensors of the media device, and wherein the media data includes a map generated by the media device based on the positioning data.

Aspect 36D. The method of any of Aspects 31D to 35D, 36D, 42D, or 43D, wherein the positioning receiver is a short-range wireless communication receiver configured to receive one or more short-range wireless communication signals.

Aspect 37D. The method of any of Aspects 31D to 36D, wherein the one or more short-range wireless communication signals are transmitted by a local device in the geographic area, and wherein the geographic area corresponds to a transmission range of the one or more short-range wireless communication signals by the local device.

Aspect 38D. The method of any of Aspects 31D to 37D, 36D, or 42D to 45D, wherein the positioning receiver is a global navigation satellite system receiver configured to receive one or more GNSS signals from one or more satellites.

Aspect 39D. The method of any of Aspects 31D to 38D, wherein the sensor data includes secondary positioning data determined based on receipt of one or more positioning signals by a positioning receiver of the one or more sensors of the media device, and wherein the media data is a map generated by the media device based on the secondary positioning data.

Aspect 40D. The method of any of Aspects 31D to 39D, further comprising: generating the block for the distributed ledger automatically in response to verifying that the position of the media device is within the geographic area; and appending the block to a plurality of blocks of the distributed ledger.

Aspect 41D. The method of any of Aspects 31D to 40D, wherein the block includes a hash of at least a portion of a prior block of the distributed ledger.

Aspect 42D. The method of any of Aspects 31D to 41D, wherein the block includes a Merkle root of a plurality of elements of the payload of the block, and wherein the token corresponds to at least one of the plurality of elements of the payload of the block.

Aspect 43D. The method of any of Aspects 31D to 42D, further comprising: generating the distributed ledger automatically in response to verifying that the position of the media device is within the geographic area.

Aspect 44D. The method of any of Aspects 35D, 36D, 42D, or 43D, further comprising: transmitting a request to generate the block for the distributed ledger to a block generation computing device automatically in response to verifying that the position of the media device is within the geographic area; receiving the block from the block generation computing device; and appending the block to a plurality of blocks of the distributed ledger.

Aspect 45D. The method of Aspect 44D, wherein receiving the positioning data includes receiving the positioning data from the media device, the positioning data being based on receipt of one or more positioning signals by a positioning receiver of the one or more sensors of the media device.

Aspect 46D. The method of any of Aspects 35D, 36D, or 42D to 45D, wherein the method is performed by an apparatus that includes the local device.

Aspect 47D. The method of any of Aspects 31D to 46D, wherein receiving the positioning data includes receiving the positioning data from a local device distinct from the media device, the positioning data being based on receipt of one or more positioning signals by a positioning receiver of the local device.

Aspect 48D. The method of any of Aspects 42D to 47D, wherein verifying that the position of the media device at the time contemporaneous with capture of the sensor data is within the geographic area includes verifying content of one or more communications between the media device and a local device associated with the geographic area.

Aspect 49D. The method of any of Aspects 31D to 48D, wherein the method is performed by an apparatus that includes the media device.

Aspect 50D. The method of any of Aspects 31D to 49D, wherein verifying that the position of the media device at the time contemporaneous with capture of the sensor data is within the geographic area includes verifying that the sensor data depicts an object that is visible within the geographic area.

Aspect 51D. The method of any of Aspects 31D to 50D, further comprising: setting an ownership of the token to an account associated with a user associated with the media device.

Aspect 52D. The method of any of Aspects 31D to 51D, further comprising: identifying that the sensor data includes a representation of an individual having a recognized identity; and setting an ownership of the token to an account associated with the individual having the recognized identity.

Aspect 53D. The method of any of Aspects 31D to 52D, wherein the media device includes a head-mounted display.

Aspect 54D. The method of any of Aspects 31D to 53D, wherein the media device includes a mobile handset.

Aspect 55D. The method of any of Aspects 31D to 54D, wherein the media device includes a wearable device.

Aspect 56D. The method of any of Aspects 31D to 55D, wherein the method is performed by an apparatus that includes a head-mounted display.

Aspect 57D. The method of any of Aspects 31D to 56D, wherein the method is performed by an apparatus that includes a mobile handset.

Aspect 58D. The method of any of Aspects 31D to 57D, wherein the method is performed by an apparatus that includes a wearable device.

Aspect 59D. The method of any of Aspects 31D to 58D, wherein the method is performed by an apparatus that includes a server.

Aspect 60D. The method of any of Aspects 31D to 59D, wherein the method is performed by an apparatus that is in the geographic area.

Aspect 61D. An apparatus for processing image data, the apparatus comprising: means for performing the method of any of Aspects 31D to 60D.

Aspect 62D. A non-transitory computer readable storage medium having embodied thereon a program, wherein the program is executable by a processor to perform a method of processing image data, the method comprising: any of the methods of Aspects 31D to 60D.

What is claimed is:

1. An apparatus for situational token-associated media output, the apparatus comprising:
    at least one memory; and
    at least one processor coupled to the at least one memory, the at least one processor configured to:
        receive sensor data captured by at least one sensor of a media device while the media device is in a geographic area;
        analyze the sensor data to detect a representation of an anchor element in the sensor data, wherein the anchor element is associated with a token;
        receive an indication of a transfer of at least one wireless signal between the media device and a local device, wherein the local device is in the geographic area, wherein the local device is distinct from the anchor element, and wherein the geographic area is associated with a signal range associated with the at least one wireless signal;
        identify the token in a payload of at least one block of a distributed ledger, wherein the token corresponds to media content according to the distributed ledger;
        generate a representation of the media content corresponding to the token; and
        automatically in response to detecting the representation of the anchor element in the sensor data and receiving the indication, output the representation of the media content.

2. The apparatus of claim 1, wherein the sensor data includes image data captured by at least one image sensor of the at least one sensor of the media device, wherein the anchor element includes an object, and wherein, to detect the representation of the anchor element in the sensor data, the at least one processor is configured to detect a depiction of the object in the image data.

3. The apparatus of claim 2, wherein the object includes an optical glyph, wherein information indicative of the token is optically encoded based on the optical glyph.

4. The apparatus of claim 2, wherein reference image data depicting the object is stored in a data store, and wherein, to identify that the image data depicts the object, the at least one processor is configured to compare the image data to the reference image data.

5. The apparatus of claim 1, wherein the at least one processor is configured to identify that a position of the media device is within the geographic area based on at least one of the sensor data or the indication.

6. The apparatus of claim 1, wherein the at least one processor is configured to identify that a position of the media device is within a threshold range of a geographic location based on at least one of the sensor data or the indication, wherein the geographic location is within the geographic area.

7. The apparatus of claim 1, wherein the sensor data includes audio data captured by at least one microphone of the at least one sensor of the media device, wherein the anchor element includes a sound, and wherein, to detect the representation of the anchor element in the sensor data, the at least one processor is configured to identify that the audio data includes the sound.

8. The apparatus of claim 1, wherein, to output the representation of the media content, the at least one processor is configured to cause a display to display at least a portion of the media content.

9. The apparatus of claim 8, wherein the at least one processor is configured to:
    identify a media device pose of the media device based on the sensor data; and
    determine a media content pose for the media content based on the media device pose of the media device, wherein, to cause the display to display at least the portion of the media content, the at least one processor is configured to output the representation of the media content posed according to the media content pose.

10. The apparatus of claim 1, wherein the at least one processor is configured to:
    identify, based on the distributed ledger, that a parameter of the token indicates that the token is associated with a first user;
    determine a visual effect for the media content based on the parameter of the token indicating that the token is associated with the first user; and
    apply the visual effect to the media content, wherein, to output the representation of the media content, the at least one processor is configured to output the representation of the media content with the visual effect applied.

11. The apparatus of claim 10, wherein the at least one processor is configured to:
    determine, based on a data store, that the first user and a second user are associated according to a relationship type, wherein the media device is associated with the second user, and wherein the visual effect for the media content corresponds to the relationship type.

12. The apparatus of claim 10, wherein the at least one processor is configured to:
    determine that the media device is associated with the first user, and wherein the visual effect for the media content corresponds the first user.

13. The apparatus of claim 10, wherein the at least one processor is configured to:
determine, based on a data store, that the first user is a predetermined person, and wherein the visual effect for the media content corresponds to the first user being the predetermined person.

14. The apparatus of claim 10, wherein the at least one processor is configured to:
determine, based on a data store, a rating associated with the media content, and wherein the visual effect for the media content corresponds the rating.

15. The apparatus of claim 10, wherein the at least one processor is configured to:
determine that the token is identified in a data store, and wherein the visual effect for the media content corresponds to the data store.

16. The apparatus of claim 1, wherein the at least one processor is configured to:
retrieve information about the token from the distributed ledger; and
output the information about the token.

17. The apparatus of claim 16, wherein, to output the information about the token, the at least one processor is configured to cause a display to display at least a portion of the information.

18. The apparatus of claim 16, wherein the at least one processor is configured to:
identify, based on the distributed ledger, that a parameter of the token indicates that the token is associated with a first user, wherein the information identifies the first user.

19. The apparatus of claim 16, wherein the information identifies the distributed ledger.

20. The apparatus of claim 16, wherein the at least one processor is configured to:
identify, based on the distributed ledger, that a parameter of the token indicates that the token is associated with a smart contract, wherein the information identifies the smart contract.

21. The apparatus of claim 16, wherein the at least one processor is configured to:
identify, based on the distributed ledger, that a parameter of the token indicates an amount of instances of the token, wherein the information identifies the amount of instances of the token.

22. The apparatus of claim 1, wherein the at least one processor is configured to:
identify a transfer platform that is configured for token transfer; and
output an interface element corresponding to the media content, wherein the interface element is configured to initiate a transfer of the token using the transfer platform upon interaction with the interface element.

23. The apparatus of claim 1, wherein the apparatus includes at least one of a head-mounted display (HMD), a mobile handset, or a wireless communication device.

24. A method of situational token-associated media output, the method comprising:
receiving sensor data captured by at least one sensor of a media device while the media device is in a geographic area;
analyzing the sensor data to detect a representation of an anchor element in the sensor data, wherein the anchor element is associated with a token;
receiving an indication of a transfer of at least one wireless signal between the media device and a local device, wherein the local device is in the geographic area, wherein the local device is distinct from the anchor element, and wherein the geographic area is associated with a signal range associated with the at least one wireless signal;
identifying the token in a payload of at least one block of a distributed ledger, wherein the token corresponds to media content according to the distributed ledger;
generating a representation of the media content corresponding to the token; and
automatically in response to detecting the representation of the anchor element in the sensor data and receiving the indication, outputting the representation of the media content.

25. The method of claim 24, wherein the sensor data includes image data captured by at least one image sensor of the at least one sensor of the media device, wherein the anchor element includes an object, and wherein detecting the representation of the anchor element in the sensor data includes detecting a depiction of the object in the image data.

26. The method of claim 24, further comprising:
identifying that a position of the media device is within the geographic area based on at least one of the sensor data or the indication.

27. The method of claim 24, further comprising:
identifying that a position of the media device is within a threshold range of a geographic location based on at least one of the sensor data or the indication, wherein the geographic location is within the geographic area.

28. The method of claim 24, wherein the sensor data includes audio data captured by at least one microphone of the at least one sensor of the media device, wherein the anchor element includes a sound, and wherein detecting the representation of the anchor element in the sensor data includes identifying that the audio data includes the sound.

29. The method of claim 24, further comprising:
identifying, based on the distributed ledger, that a parameter of the token indicates that the token is associated with a first user;
determining a visual effect for the media content based on the parameter of the token indicating that the token is associated with the first user; and
applying the visual effect to the media content, wherein outputting the representation of the media content includes outputting the representation of the media content with the visual effect applied.

30. The method of claim 24, further comprising:
retrieving information about the token from the distributed ledger; and
outputting the information about the token.

* * * * *